US010469412B2

(12) United States Patent
Yu et al.

(10) Patent No.: US 10,469,412 B2
(45) Date of Patent: Nov. 5, 2019

(54) ANSWER MESSAGE RECOMMENDATION METHOD AND DEVICE THEREFOR

(71) Applicant: SAMSUNG ELECTRONICS CO., LTD., Suwon-si, Gyeonggi-do (KR)

(72) Inventors: Seung-hak Yu, Yongin-si (KR); Eun-jeong Ko, Seoul (KR); Deok-ho Kim, Seoul (KR); Hae-jun Lee, Suwon-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/756,208

(22) PCT Filed: Sep. 1, 2016

(86) PCT No.: PCT/KR2016/009796
§ 371 (c)(1),
(2) Date: Feb. 28, 2018

(87) PCT Pub. No.: WO2017/039355
PCT Pub. Date: Mar. 9, 2017

(65) Prior Publication Data
US 2018/0278553 A1 Sep. 27, 2018

(30) Foreign Application Priority Data

Sep. 1, 2015 (KR) .................. 10-2015-0123491
Aug. 16, 2016 (KR) .................. 10-2016-0103550

(51) Int. Cl.
G06F 17/00 (2019.01)
H04L 12/58 (2006.01)
(Continued)

(52) U.S. Cl.
CPC ............ H04L 51/02 (2013.01); G06F 3/0481 (2013.01); G06F 3/0482 (2013.01);
(Continued)

(58) Field of Classification Search
CPC ............ G06F 17/2785; G06F 16/3329; G06F 16/243; G06F 16/248; G06F 17/2881; G06F 17/271
See application file for complete search history.

(56) References Cited

U.S. PATENT DOCUMENTS 8,370,358 B2   2/2013   Lin et al.
8,661,053 B2   2/2014   Flynn et al.
(Continued)

FOREIGN PATENT DOCUMENTS

CN          103079008      5/2013
KR      10-2011-0002929    1/2011
(Continued)

OTHER PUBLICATIONS

Extended Search Report dated Jun. 29, 2018 in counterpart European Patent Application No. 16842321.8.
(Continued)

Primary Examiner — Laurie A Ries
(74) Attorney, Agent, or Firm — Nixon & Vanderhye, P.C.

(57) ABSTRACT

Provided are a device for transmitting an answer message including a display configured to display information, a communicator configured to receive a question message from another device, a processor configured to control the display to display graphics representing a plurality of pieces of recommendation information which are includable in an answer message for the received question message and relations between the plurality of pieces of recommendation information, and a user input unit configured to receive a user input that selects at least one of the plurality of pieces of recommendation information, wherein the communicator is further configured to transmit an answer message includ-
(Continued)

ing the selected recommendation information to the another device according to the user input.

17 Claims, 43 Drawing Sheets

(51) Int. Cl.
  *G06F 3/0488* (2013.01)
  *G06F 17/22* (2006.01)
  *G06F 17/27* (2006.01)
  *G06F 17/28* (2006.01)
  *G06F 3/0481* (2013.01)
  *H04W 4/12* (2009.01)
  *G06F 3/0482* (2013.01)

(52) U.S. Cl.
  CPC ........ *G06F 3/0488* (2013.01); *G06F 17/2241* (2013.01); *G06F 17/278* (2013.01); *G06F 17/2785* (2013.01); *G06F 17/2881* (2013.01); *H04W 4/12* (2013.01); *G06F 17/271* (2013.01)

(56) References Cited

U.S. PATENT DOCUMENTS

| | | | |
|---|---|---|---|
| 8,670,979 B2 | 3/2014 | Gruber et al. | |
| 8,719,249 B2 | 5/2014 | Bennett et al. | |
| 8,726,169 B2* | 5/2014 | Payne | G06F 3/0481 715/705 |
| 8,817,968 B1* | 8/2014 | Boutcher | H04W 4/14 379/265.01 |
| 9,008,433 B2 | 4/2015 | Fork et al. | |
| 9,471,623 B2* | 10/2016 | Kozloski | G06F 16/24522 |
| 2006/0277165 A1* | 12/2006 | Yoshimura | G06F 16/3329 |
| 2007/0016614 A1* | 1/2007 | Novy | G06F 17/2229 |
| 2007/0094221 A1* | 4/2007 | Au | G06F 17/2785 706/55 |
| 2008/0162469 A1 | 7/2008 | Terayoko et al. | |
| 2010/0332218 A1* | 12/2010 | Liu | H04M 1/72552 704/9 |
| 2011/0040553 A1* | 2/2011 | Sasivarman | G06F 17/2785 704/9 |
| 2012/0315880 A1* | 12/2012 | Peitrow | H04M 1/642 455/412.1 |
| 2013/0246290 A1* | 9/2013 | Courson | G06Q 50/18 705/311 |
| 2013/0262107 A1* | 10/2013 | Bernard | G06F 17/2785 704/235 |
| 2013/0282814 A1* | 10/2013 | Marcucci | H04W 4/21 709/204 |
| 2013/0290905 A1* | 10/2013 | LuVogt | G06N 3/006 715/835 |
| 2013/0297317 A1* | 11/2013 | Lee | H04M 1/72552 704/270.1 |
| 2013/0317808 A1* | 11/2013 | Kruel | H04L 51/32 704/9 |
| 2014/0030688 A1* | 1/2014 | Lolli | G09B 7/00 434/350 |
| 2014/0057239 A1* | 2/2014 | Vehovsky | G09B 5/06 434/322 |
| 2014/0115078 A1 | 4/2014 | Bhatia | |
| 2014/0149446 A1* | 5/2014 | Kuchmann-Beauger | G06F 16/242 707/763 |
| 2014/0310306 A1* | 10/2014 | Sawczuk | G06F 16/3344 707/769 |
| 2014/0344749 A1* | 11/2014 | Choi | G06F 3/04817 715/780 |
| 2015/0032724 A1* | 1/2015 | Thirugnanasundaram | G06F 17/30654 707/722 |
| 2015/0113435 A1* | 4/2015 | Phillips | H04L 51/02 715/752 |
| 2015/0161632 A1* | 6/2015 | Humay | G06Q 30/0203 705/7.32 |
| 2015/0186504 A1* | 7/2015 | Gorman | G06F 16/24522 707/752 |
| 2015/0350118 A1* | 12/2015 | Yang | H04L 51/02 715/752 |
| 2016/0078471 A1* | 3/2016 | Hamedi | G06F 16/24578 705/14.41 |
| 2016/0170949 A1* | 6/2016 | Allen | G06F 16/9027 715/230 |
| 2016/0179934 A1* | 6/2016 | Stubley | G06N 5/00 707/722 |
| 2016/0306800 A1* | 10/2016 | Son | H04L 51/02 |
| 2016/0328406 A1* | 11/2016 | Convertino | G06F 3/04842 |

FOREIGN PATENT DOCUMENTS

| | | |
|---|---|---|
| KR | 10-1348670 | 2/2014 |
| KR | 10-2014-0026932 | 3/2014 |
| KR | 10-2014-0122801 | 10/2014 |
| KR | 10-2015-0015058 | 2/2015 |
| KR | 10-2015-0055448 | 5/2015 |
| KR | 10-2016-0123949 | 10/2016 |
| WO | WO 2015/073565 | 5/2015 |
| WO | WO 2015/102125 | 7/2015 |

OTHER PUBLICATIONS

International Search Report for PCT/KR2016/009796 dated Dec. 7, 2016, 2 pages.
Written Opinion of the ISA and its English Translation for PCT/KR2016/009796 dated Dec. 7, 2016, 11 pages.
Communication pursuant to Article 94(3) EPC dated Feb. 8, 2019 in counterpart European Patent Application No. 16842321.8.

* cited by examiner

CHICKEN
HONGDAE AREA
OUTCHICKEN
CHIPS
SPICY CHICKEN
BEER
DINE-TOGETHER
FRIED CHICKEN
JUNE 1, 2015
MONDAY NIGHT
SOCIAL CLUB
10 PEOPLE DINE-TOGETHER
REVISIT (c)

FIG. 9A
(a) 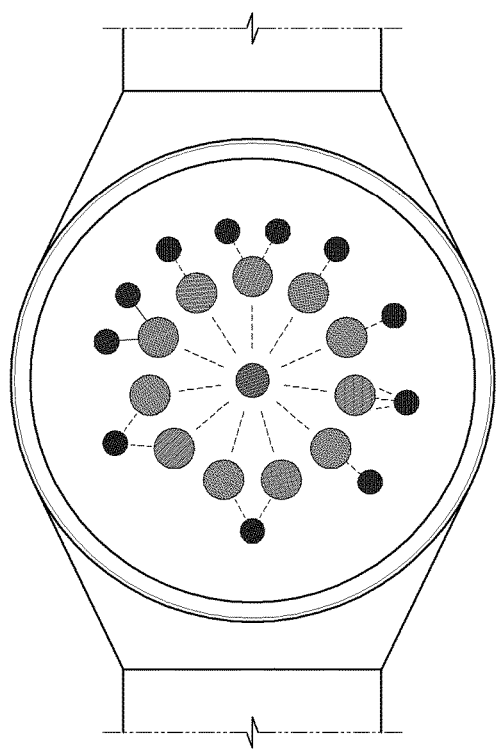  (b) 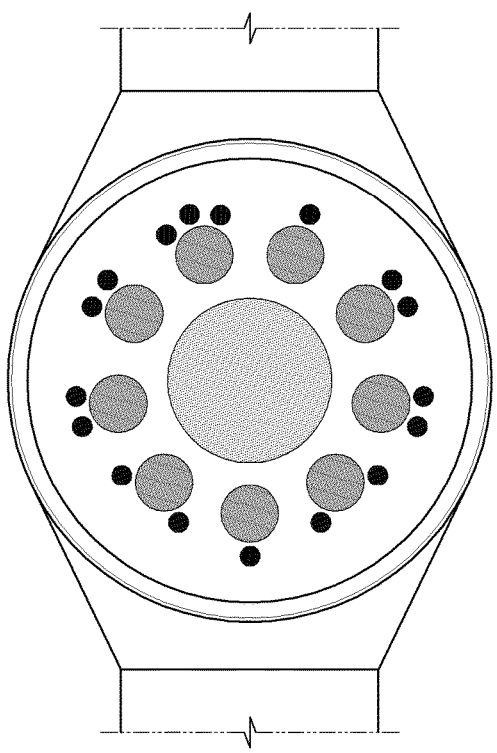

(c)

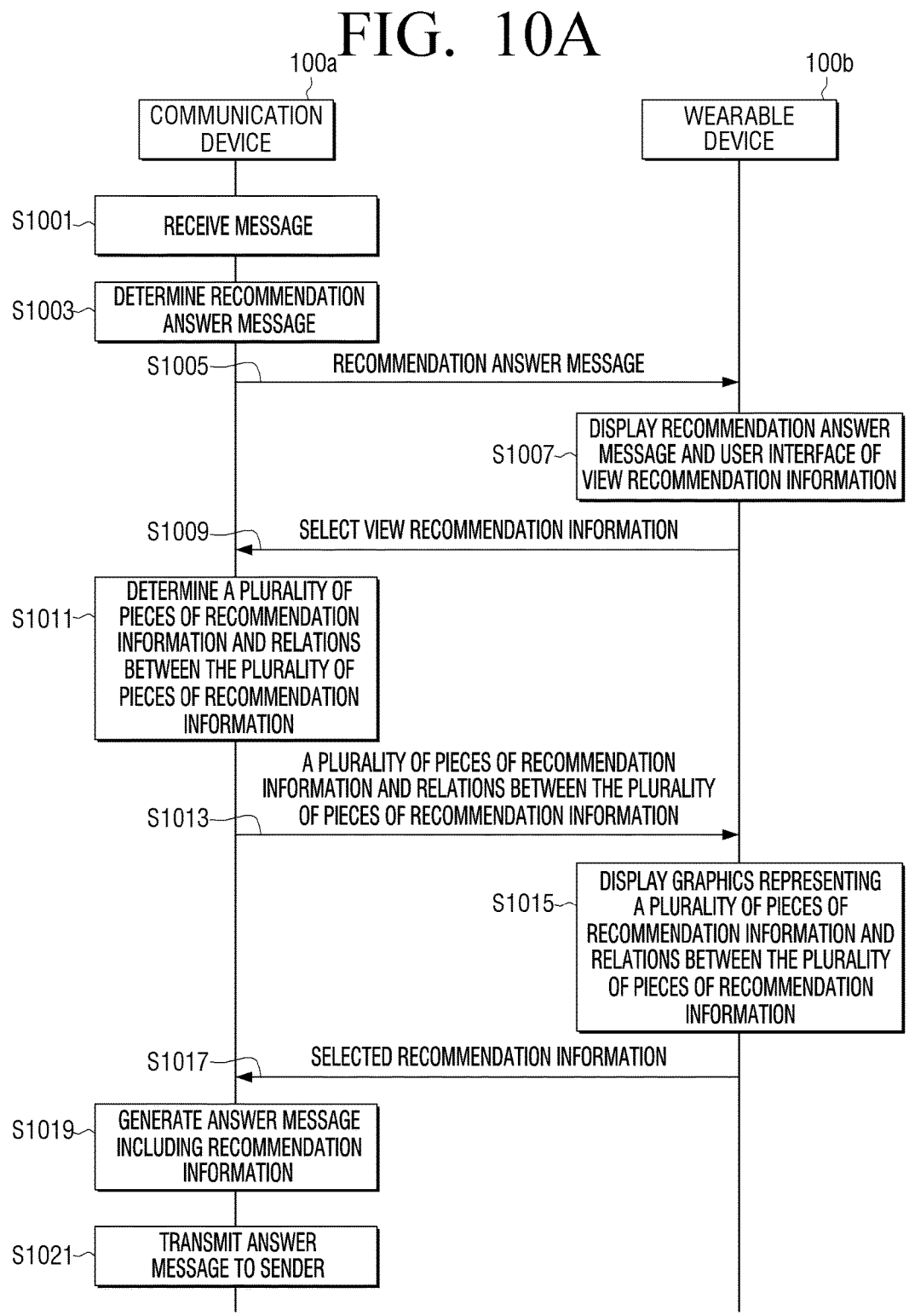

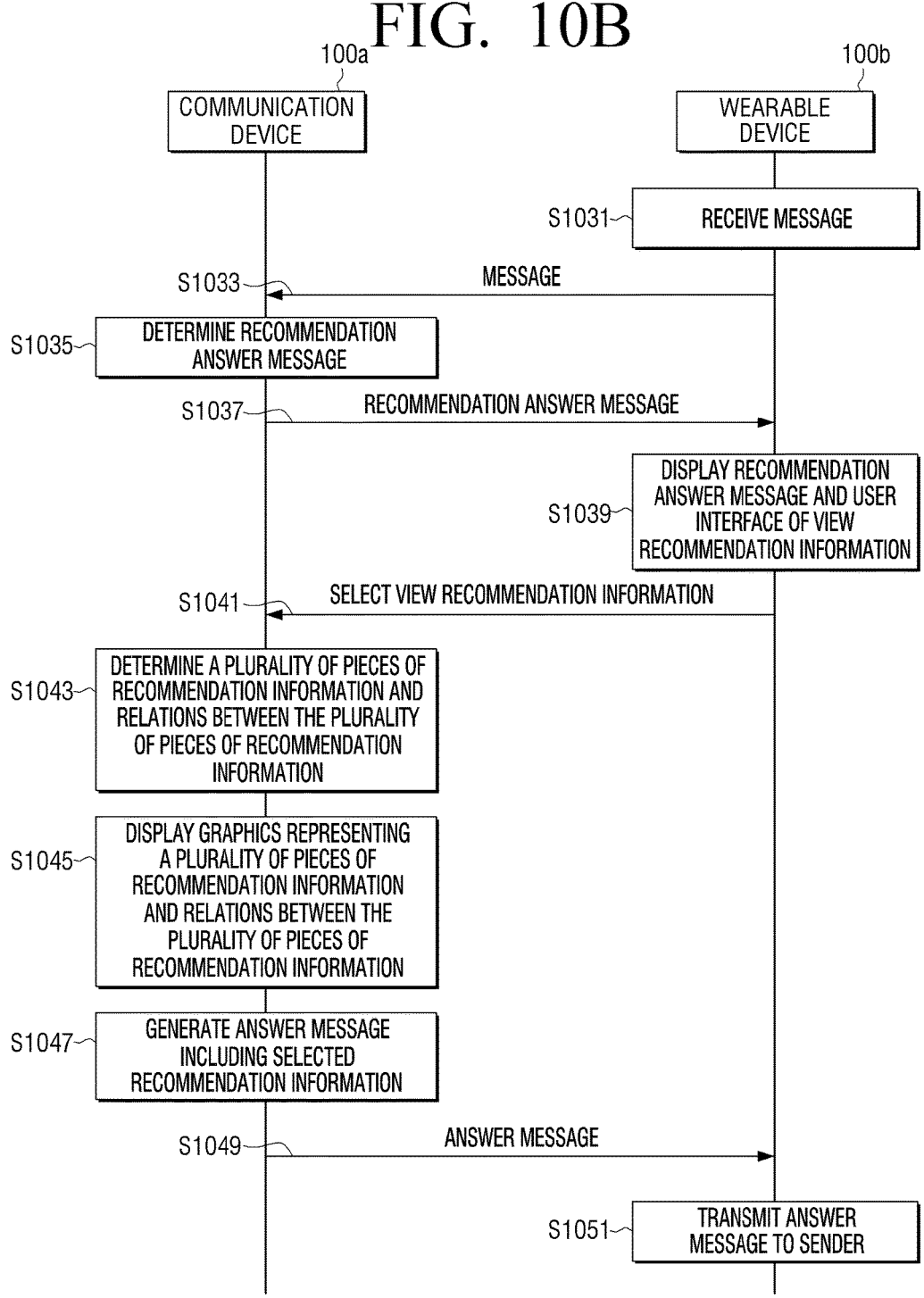

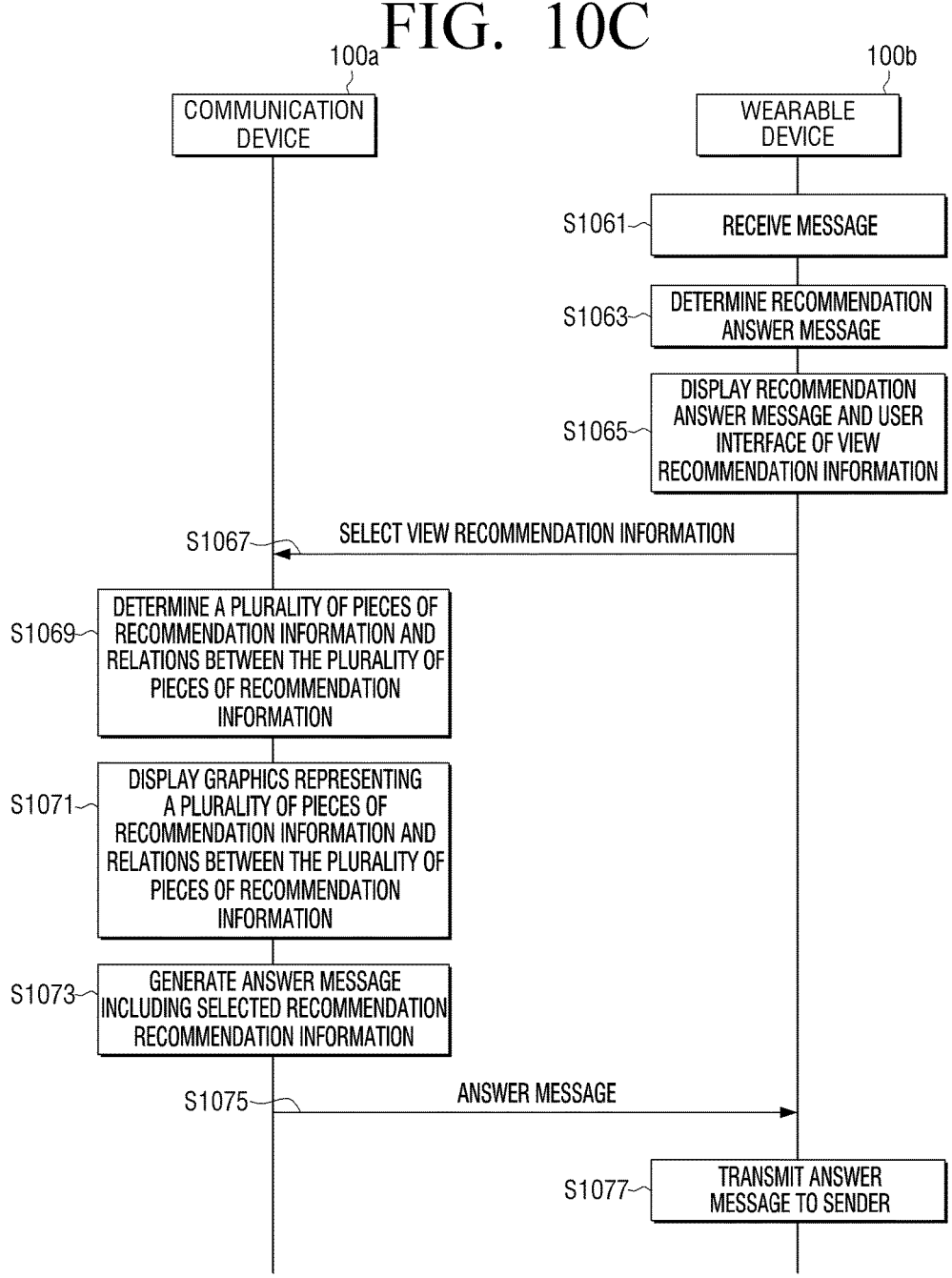

(c)

FIG. 14B
(c)                                (d)
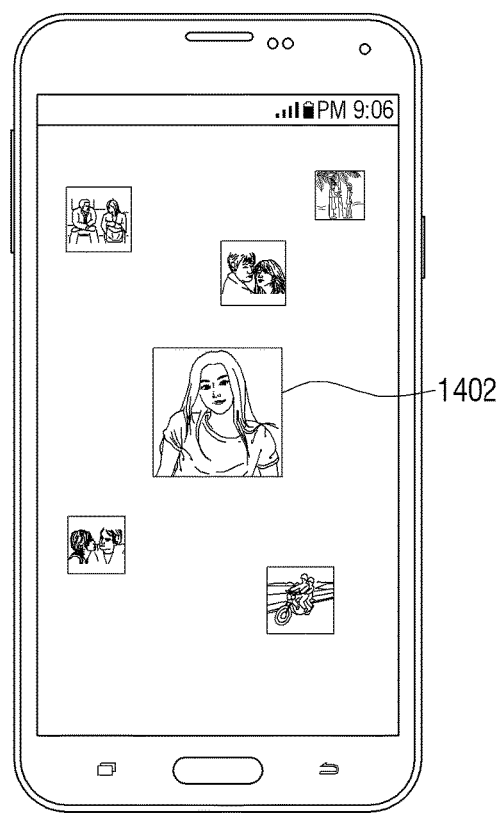
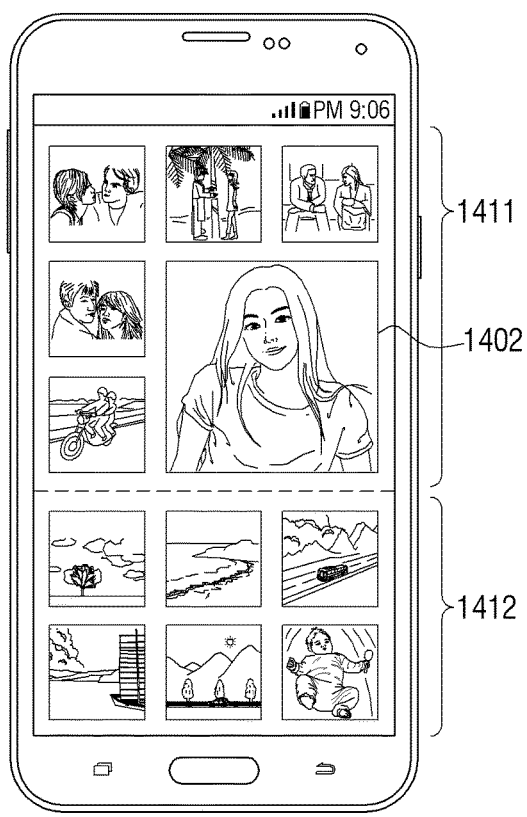

(e)

100

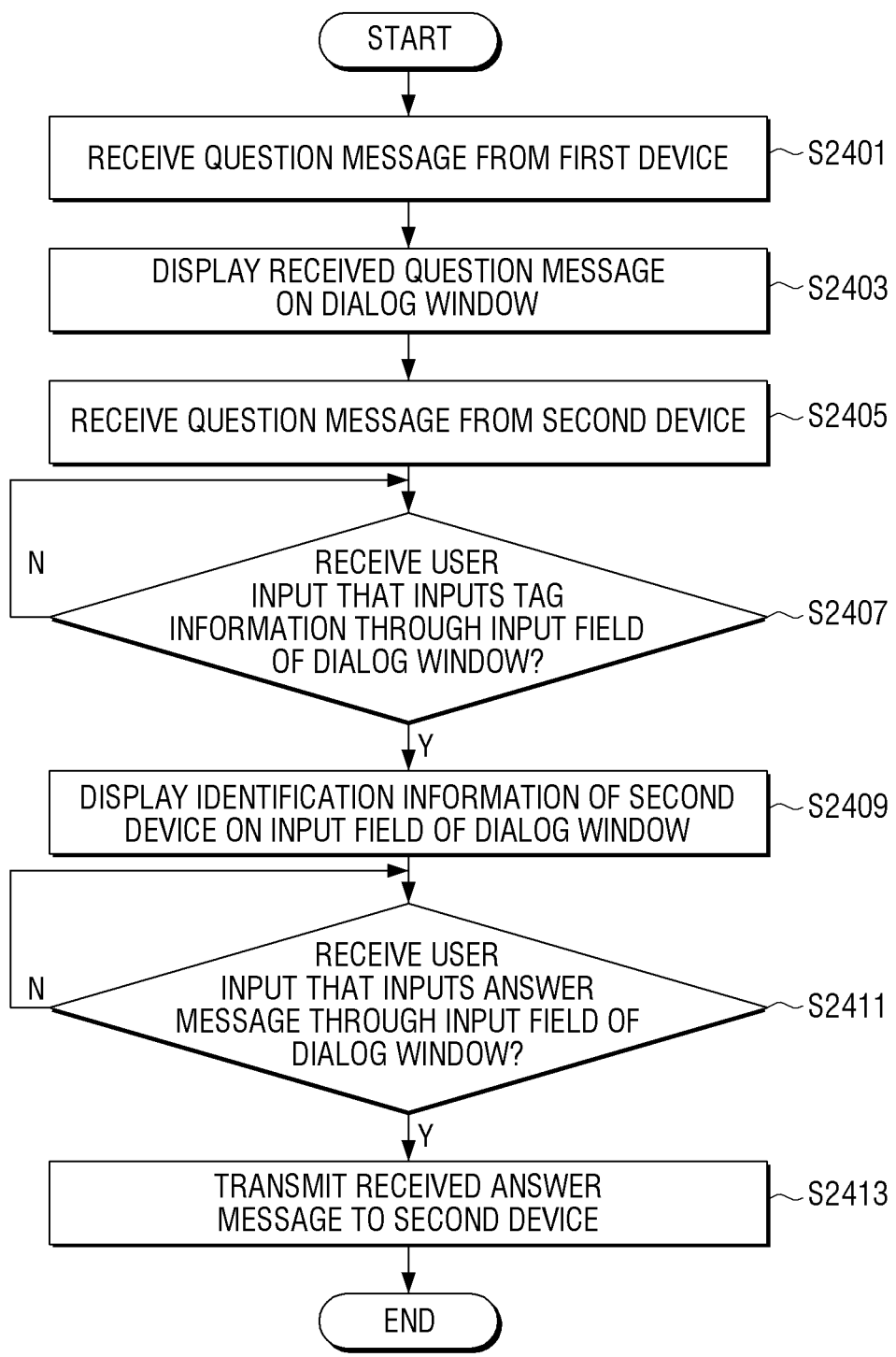

ANSWER MESSAGE RECOMMENDATION METHOD AND DEVICE THEREFOR

This application is the U.S. national phase of International Application No. PCT/KR2016/009796 filed Sep. 1, 2016 which designated the U.S. and claims priority to KR Patent Application No. 10-2015-0123491 filed Sep. 1, 2015 and KR Patent Application No. 10-2016-0103550 filed Aug. 16, 2016, the entire contents of each of which are hereby incorporated by reference.

FIELD OF THE INVENTION

Devices and methods consistent with what is disclosed herein relate to a method for providing user interface for analyzing a received message and creating an answer message based the analyzed message or a recommendation answer message and a device thereof.

DESCRIPTION OF THE RELATED ART

With the development of natural language processing technology, a device analyzes the meaning of a message exchanged between users. The natural language processing technology includes a technique that allows a computer to understand human language, or a technique that expresses information processed by a computer in human language for communication.

Following a trend for mobilization and slimming of a device, a use may easily carry around a device, but it becomes increasingly difficult for the user to input letters into a device. Therefore, there is an increasing need to send a correct answer message in response to a received message with minimal input.

SUMMARY

An aspect of the embodiments relates to a user interface required for creating an answer message and an answer message recommendation method.

According to an embodiment, there is provided a device for transmitting an answer message including a display configured to display information, a communicator configured to receive a question message from another device, a processor configured to control the display to display graphics representing a plurality of pieces of recommendation information which are includable in an answer message for the received question message and relations between the plurality of pieces of recommendation information, and a user input unit configured to receive a user input that selects at least one of the plurality of pieces of recommendation information, wherein the communicator is further configured to transmit an answer message including the selected recommendation information to the another device according to the user input.

The graphics representing the relations between the plurality of pieces of recommendation information may have a tree structure or a radial structure.

The plurality of pieces of recommendation information may be connected to one another based on weight values regarding at least one attribute among preference, importance, location, time and atmosphere of the plurality of pieces of recommendation information.

The plurality of pieces of recommendation information may be generated based on a content registered by a user.

The plurality of pieces of recommendation information may be generated based on tag information and importance of the registered content.

The plurality of pieces of recommendation information may be generated based on data retrieved, captured, photographed or noted by a user.

In response to the plurality of pieces of recommendation information being images, the answer message may include a keyword obtained from at least one image selected from the images.

In response to the plurality of pieces of recommendation information being images, the answer message may include at least one image selected from the images.

In response to receiving a second question message from yet another device while the question message received from the another device is displayed on a dialog window, the processor may be further configured to control the display to automatically display identification information of the yet another device on an input field of the dialog window according to a user input that inputs tag information on the input field of the dialog window.

In response to receiving a second question message from yet another device while the question message received from the another device is displayed on a dialog window, the communicator may be further configured to transmit a second answer message to the yet another device according to an user input that inputs tag information, identification information of the yet another device, and the second answer message for the second question message on an input field of the dialog window.

According to an embodiment, there is provided a method for transmitting an answer message of a device that transmits an answer message including receiving a question message from another device, displaying graphics representing a plurality of pieces of recommendation information which are includable in an answer message for the received question message and relations between the plurality of pieces of recommendation information, and in response to a user input that selects at least one of the plurality of pieces of recommendation information, transmitting an answer message including the selected recommendation information to the another device.

According to an embodiment, a device provides a user interface for inputting an answer message as receiving a message from another device.

BRIEF DESCRIPTION OF THE DRAWINGS

FIGS. 9A and 9B are views illustrating relations between recommendation information according to an embodiment of the present disclosure;

FIGS. 10A, 10B, and 10C are flowcharts provided to explain a method for providing a recommendation answer message by using a communication device and a wearable device according to an embodiment of the present disclosure;

FIGS. 14A, 14B, 14C, 14D, 15A, 15B, 15C and 15D are views illustrating screens for providing images as recommendation information according to another embodiment of the present disclosure;

FIGS. 21, 22, 23, and 24 are flowcharts provided to explain a method for providing recommendation information which is includable in an answer message by a device according to an embodiment of the present disclosure.

DETAILED DESCRIPTION OF EXEMPLARY EMBODIMENTS

Figure 1A:
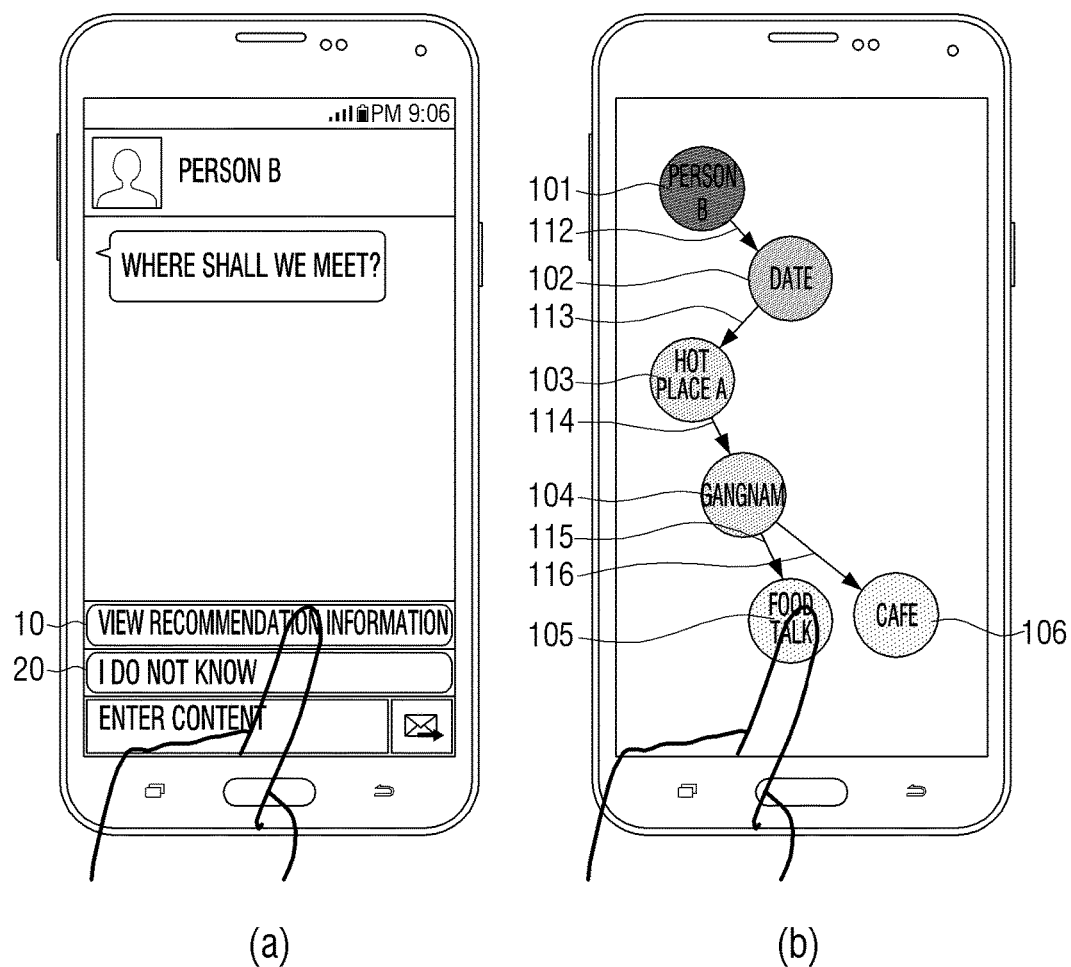
FIGS. 1A and 1B are views provided to explain a method for providing necessary information for a user to input an answer message by a device in response to receiving a message according to an embodiment of the present disclosure.

Hereinafter, various embodiments of the present disclosure will be described with reference to the accompanying drawings. It should be understood, however, that it is not intended to limit the techniques described in this disclosure to the specific embodiments, but includes various modifications, equivalents, and/or alternatives of the embodiments of the present disclosure. Like reference numerals in the drawings denote like elements.

It will be further understood that terms such as "including", "including", "including", "having," etc., are intended to indicate the existence of the features (e.g. numbers, function, operations, components, or the like) disclosed in the specification, and are not intended to preclude the possibility that one or more other features may exist or may be added.

In an embodiment, the expressions "A or B," "at least one of A and/or B," or "one or more of A and/or B," and the like include all possible combinations of the listed components. For example, "A or B," "at least one of A and B," or "at least one of A or B" includes (1) at least one A, (2) at least one B, and (3) at least one A and at least one B.

The term such as "first" and "second" used in various example embodiments may modify various elements regardless of an order and/or importance of the corresponding elements, and does not limit the corresponding elements.

When it is mentioned that any element (e.g., a first element) may be "operatively or communicatively coupled with/to" another element (e.g., a second element), it is to be understood that any such element may be directly connected to the other element or may be connected via another element (e.g., a third element) . On the other hand, when it is mentioned that an element (e.g., a first element) is "directly connected" or "directly contacted" to another element (e.g., a second element), it can be understood that there is no other element (e.g., a third element) between the element and another element.

The phrase "configured to" as used in an embodiment can be replaced by "suitable for", "having the capacity to", "designed to", "adapted to", "made to" or "capable of ". The "configured to" may not necessarily mean "specifically designed to" in hardware. Instead, in some circumstances, the expression "a device configured to" may mean that the device is "capable of ~" with other devices or components. For example, the expression "a sub-processor configured to execute A, B, and C" may be implemented as a processor dedicated to performing the operation (e.g., an embedded processor), or a generic-purpose processor (e.g., a CPU or an application processor) that perform the corresponding operations by executing one or more software programs stored in a memory device.

The terms used in an embodiment are used only to describe certain embodiments and may not be intended to limit the scope of other embodiments. The singular expressions may include plural expressions unless the context clearly dictates otherwise. Terms used herein, including technical or scientific terms, may have the same meaning as commonly understood by one of ordinary skill in the art having the benefit of the present disclosure. General predefined terms used in the present disclosure may be interpreted in the same or similar sense as the contextual meanings of the related art and, unless explicitly defined in the present disclosure, include ideally or in excessively formal sense. Optionally, terms defined in the present disclosure cannot be construed to exclude embodiments of the present disclosure.

Figure 1B:
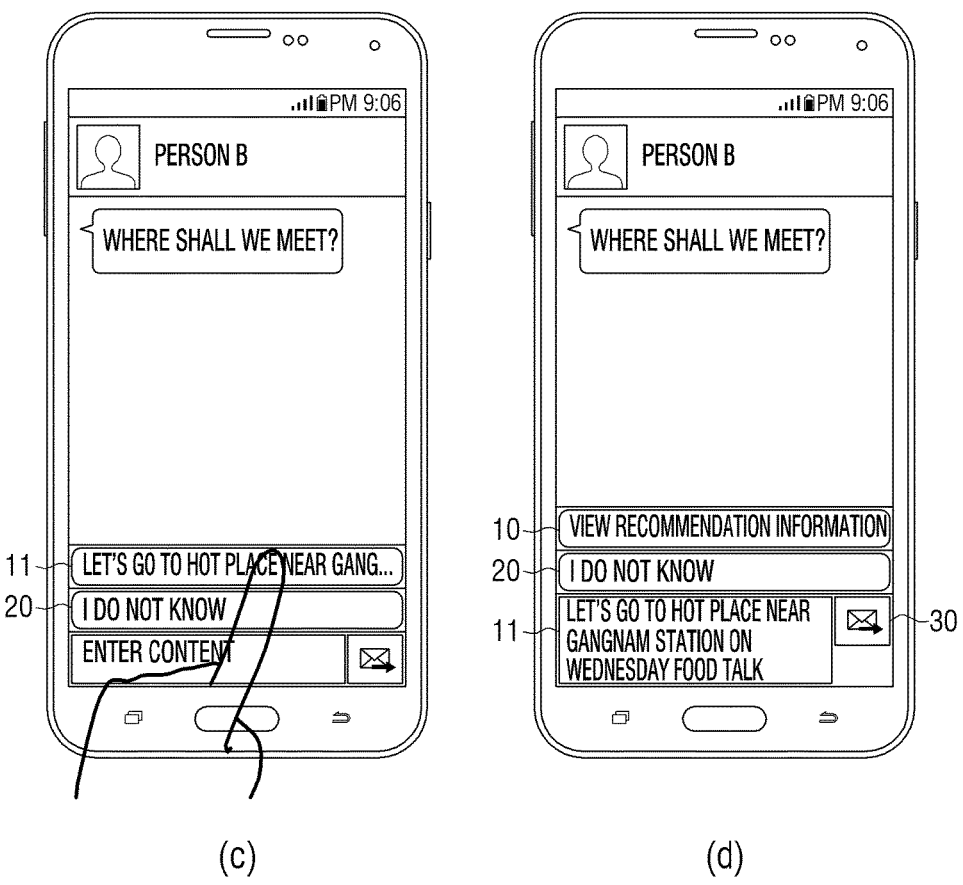

FIGS. 1A and 1B are views provided to explain a method for providing necessary information for a user to input an answer message by a device 100 in response to receiving a message according to an embodiment of the present disclosure.

Referring to (a) of FIG. 1A, the device 100 may provide a user interface required for inputting an answer message in response to receiving a message from another device.

For example, in response to receiving a message "where shall we meet?", the device 100 may display an answer message for the received message. For example, in response to receiving the message "where shall we meet?", the device 100 may analyze that a sender intends to ask about a place to meet and recommend candidate messages for answering such as "I do not know 102", "well", "why?", "anywhere", or the like.

The device 100 may provide a user interface 10 "view recommendation information" for providing recommendation information to be included in an answer message. The device 100 may receive a user input that selects the user interface 10 "view recommendation information".

As shown in (b) of FIG. 1A, according to the user input that selects the user interface 10, the device 100 may display graphics 112,113,114,115 and 116 representing a plurality of pieces of recommendation information 101,102,103,104, 105 and 106 which are includable in an answer message and relations between the plurality of pieces of recommendation information. The graphics may have a tree structure, and the examples of the tree structure include a node structure, a hierarchy structure, and the like.

According to a user input that selects a recommendation information "food talk" 105 as one of the plurality of pieces of recommendation information 101 to 106, As shown in (c) of FIG. 1B, the device 100 may generate an answer message "let's go to a hot place near Gangnam station on the Wednesday food talk 11" including the recommendation information 105 selected by the user. For another example, the device 100 may generate an answer message including part of the recommendation information 105 selected by the user. For example, the device 100 may generate an answer message including "Wednesfood", "Wednesday food", etc. which are abbreviations of "Wednesday food talk".

According to a user input that selects the answer message 11, as shown in (d) of FIG. 1B, the device 100 may display the answer message 11 on a message input window.

According to a user input that selects a send button 30, the device 100 may transmit the answer message 11 displayed on the message input window to another device.

Displaying graphics representing the recommendation information and the relations between the recommendation information may enhance visibility of a user that generates an answer message and the ease of retrieval may be enhanced.

Figure 2:
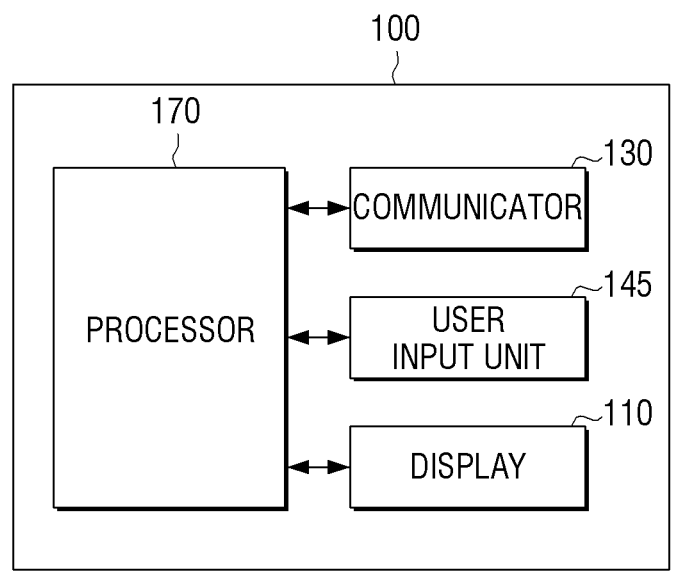
FIG. 2 is a schematic block diagram illustrating a device according to an embodiment of the present disclosure.

FIG. 2 is a schematic block diagram illustrating a device according to an embodiment of the present disclosure.

As shown in FIG. 2, the device 100 according to an embodiment may include a communicator 130, a user input unit 145, a display 110 and a processor 170. However, all the illustrated elements are not essential. The device 100 may be embodied with more or less than the illustrated elements.

Figure 3:
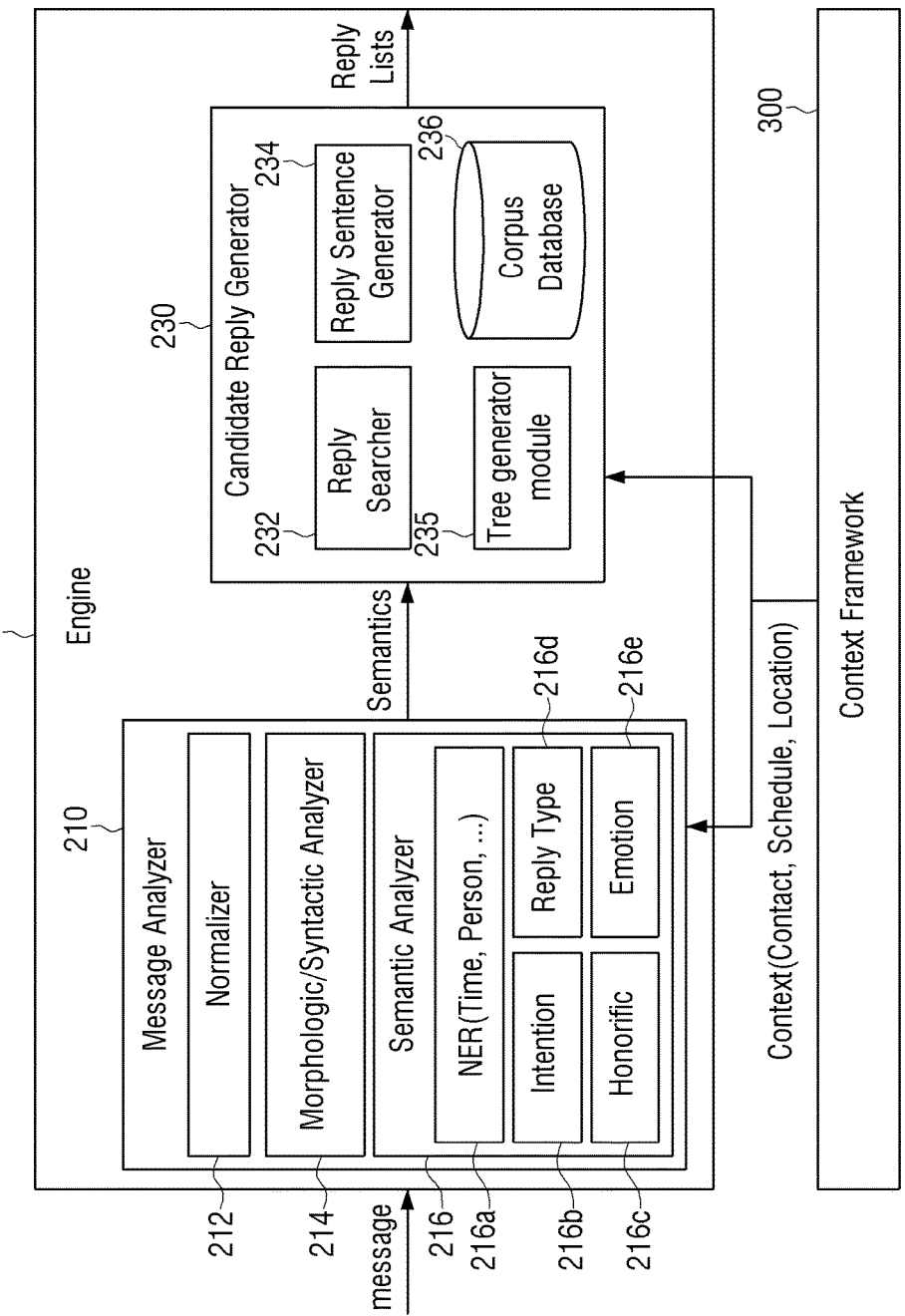
FIG. 3 is a view illustrating an engine that generates an answer message according to an embodiment of the present disclosure.

In addition, an engine 200 shown in FIG. 3 may be embodied with the elements shown in FIG. 2. For example, the engine 200 shown in FIG. 3 may be embodied when a program stored in a memory (not shown) is executed by the processor 170.

The communicator 130 may receive a message from another device. The communicator 130 may transmit an answer message to another device.

The processor 170 may determine a plurality of pieces of recommendation information which are includable in an answer message for the received question message and relations between the plurality of pieces of recommendation information.

The display 110 may display the plurality of pieces of recommendation information to be included in the answer message for the received question message, which are determined by the processor 170, and the relations between the plurality of pieces of recommendation information.

The user input unit 145 may receive a user input that selects information to be included in an answer message. The user input unit 145 may receive a user input that selects a menu. According to the user input that selects the menu, the processor 170 may execute a function corresponding to the selected menu.

FIG. 3 is a view illustrating an engine that generates an answer message according to an embodiment of the present disclosure.

The device 100 may include the engine 200 that generates an answer message.

Referring to FIG. 3, the engine 200 that generates an answer message may include a message analyzer module 210 for determining the sender's intention of the received message and a candidate reply generator module 230 for generating a recommendation answer message based on the analyzed sender's intention.

The message analyzer module 210 may determine the sender's intention of the received message. The message analyzer module 210 may include a normalize module 121, a morphologic/syntactic analyzer module 214 and a semantic analyzer module 216.

The normalize module 212 may restore slangs or abbreviations included in the received message into standard words.

The normalize module 212 may restore slangs or abbreviations into standard words based on a predetermined formula. Based on the dictionary containing the slangs or abbreviations matched with the standard words, the normalize module 212 may restore the slangs or abbreviations included in the message into the standard words. The dictionary containing the slangs or abbreviations matched with the standard words may be shown as table 1 below.

TABLE 1

| Slang/abbreviation - standard word | standard word | frequency |
| --- | --- | --- |
| 낼 | 내일 | 87 |
| ~거 | ~것 | 81 |
| 걍 | 그냥 | 77 |
| 웅 | 응 | 71 |
| 넵 | 네 | 53 |
| 머 | 뭐 | 52 |
| 넘 | 너무 | 47 |
| 마니 | 많이 | 42 |
| 어케 | 어떻게 | 37 |
| 금욜 | 금요일 | 35 |
| 행님 | 형님 | 33 |
| 빙 | 네 | 30 |
| 담주 | 다음주 | 28 |
| 젤 | 제일 | 27 |
| 담에 | 다음에 | 23 |
| 꺼 | 거 | 22 |
| ㅇㅇ | 응 | 21 |
| 엉 | 웅 | 21 |
| 겁나 | 엄청 | 20 |
| 잇는 | 있는 | 20 |
| 잇어 | 있어 | 20 |

For example, in response to receiving a message "lol it is freaking funny", the normalize module 212 may determine "lol" and "freaking" as slang and change the "lol" into an exclamation "ah" and the "freaking" into "really". For example, in response to receiving a message "Gil-dong, where shall we meet for dinner L8ER? lol", the normalize module 212 may determine "L8ER" as a non-grammatical word and change the "L8ER" to "later".

In addition, the device 100 may store the words, the expressions, or the way of talking in the messages exchanged between the message sender and the user corresponding to the message sender. Accordingly, the normalize module 212 may restore the slangs and abbreviations included in the received message into the standard words based on the words, the expressions, or the way of talking included in the messages exchanged between the message sender and the user.

In addition, the normalize module 212 may analyze conversations the user had with an acquaintance in the past and store the words, the way of talking, the expressions of the acquaintance. Accordingly, the normalize module 212 may restore the slangs and abbreviations included in the text message sent from a message sender into the standard words based on the words, the expressions, or the way of talking of the message sender.

The morphologic/syntactic analyzer module 214 may determine morphemes contained in a message and sentence components of the determined morphemes.

For example, the morphologic/syntactic analyzer module 214 may determine morphemes "meeting" "now" "come to" "please" included in a message "please come to the meeting now". The morphologic/syntactic analyzer module 214 may determine sentence component "now" as adverb, "come" as descriptive word, and "please" as honorific form.

The morphologic/syntactic analyzer module 214 may determine the verb, the sender's intention of the received message and the presence of the honorific form in the message based on the determined sentence components. For example, the morphologic/syntactic analyzer module 214 may determine "come to" as the verb contained in the message "please come to the meeting now", the sender's intention of the received message as an order to come to the meeting, and the received message as the message in the honorific form.

The semantic analyzer module 216 may determine the named entity, the sender's intention, the presence of the honorific form and the emotion of the sender based on the morphemes and sentence components analyzed by the morphologic/syntactic analyzer module 214 and determine a response type.

The semantic analyzer module 216 may include a named entity recognizer module 216A, an intention recognizer module 216B, a honorific recognizer 216C, an emotion recognizer 216D, and a reply type determiner 216E.

The named entity recognizer module 216A may recognize the named entity contained in the received message. The named entity may refer to a noun or a number that has a unique meaning in the document. The named entity name may be categorized into name expression such as a person name, a place name, an organization name, etc., time expression such as date or time and numeral expression such as amount or percentage. The named entity recognition may refer to recognizing the named entity included in the message and determining the type of recognized named entity.

For example, in response to receiving a message "Mr. Gil-dong, where shall we meet for dinner later?", the named entity recognizer module 216A may recognize "Mr. Gil-dong" and "dinner" as named entities and recognize the "Mr. Gil-dong" as a person name and the "dinner" as a meal in the evening. For example, the named entity recognizer module 216A may determine "Mr. Gil-dong" as a person name based on the phone book stored in the device 100 and if the relationship with the "Mr. Gil-dong" is listed in the phone book, obtain the relationship between the "Mr. Gil-dong" and the user. The named entity recognizer module 216A may determine "dinner" as a meal in the evening based on the pre-stored named entity dictionary.

The intention recognizer module 216B may determine the sender's intention expressed in the message. The sender's intention may include greetings, questions, commands, requests, suggestions, emotional expressions or information delivery, but the present disclosure is not limited thereto.

The intention recognizer module 216B may determine the sender's intention of the received message based on the analyzed morpheme, entity name, sentence component, or type of word.

For example, the intention recognizer module 216B may determine that the sender's intention of the received message is an order if the message is in English and the first word of the message is a "Be" verb or a verb prototype. Also, if the message is in English and the first word of the message includes a word for asking a favor such as "would you" or "please", the intention recognizer module 216B may determine that the sender's intention is a request.

If the sender' intention of the received message is a question, the intention recognizer module 216B may determine whether the intention of the received message is a yes or no question, a question for asking to select at least one of a plurality of choices, a question to agree or disagree, or a question for asking one of the Five W's and One H rules (5W1H). For example, if the received message is "Mr. Gil-dong, where shall we meet for a dinner today?", the intention recognizer module 216B may determine that the message is a question for asking about a place in the Five W's and One H rules based on the sentence component "where" of the morphemes of the message and the question mark "?".

The intention recognizer module 216B may categorize the sender's intention of the message into a plurality of categories as shown in Table 2, and may classify the categories into a plurality of lower categories.

TABLE 2

| The sender's intention | |
| --- | --- |
| Level1 | Level2 |
| greeting | meet |
| | farewell |
| | new year |
| | christmas |
| | morning |
| | night |
| | ask after |
| question | location |
| | time |
| | age |
| | price |
| | count |
| | person |
| | activity |
| | confirm |
| | reason |
| simple answer | yes_no |
| | agreement |
| command/request/suggest/help | move |
| | work |
| | meet |
| | invite |
| express emotion | irritated |
| | happy |
| | surprised |
| | worried |
| | sad |
| | angry |
| inform | location |
| | time |
| | age |
| | price |
| | count |
| | person |
| | activity |
| | confirm |
| | reason |

TABLE 2-continued

| The sender's intention | |
|---|---|
| Level1 | Level2 |
| thanks | to user |
|  | to third person |
| appologies | to user |
|  | to third person |
| sympathy | condolences |
|  | congratulations |
|  | compliment |
| blame | to user |
|  | to third person |
| complaint | to user |
|  | to third person |
| call | to user |
|  | to third person |

For example, if it is determined that the sender's intention of the received message is a question, the intention recognizer module 216B may determine which is questioned among of location, time, age, price, the number of times, person, activity, reason by the received message.

The honorific recognizer module 216C may determine whether a message is in the honorific form. For example, if the message includes the morpheme in the honorific form such as "please", "would", "could" or the like, the honorific recognizer 216C may determine that the received message is in the honorific form.

The emotion recognizer module 216D may recognize the emotion of the sender expressed in the message. The sender's feelings may include happiness, fun, sadness, fear, surprise, anger, or the like, but the present disclosure is not limited thereto.

The emotion recognizer module 216D may recognize the emotion of the sender based on the exclamation, slang, or emoticon included in the message. For example, if the received message is "I am late -.,-;" and the emoticon "-.,-" indicates unhappy, the emotion recognizer module 216D may determine that the emotion of the sender is unhappy.

The reply type determiner module 216E may determine the type of received message. For example, the reply type determiner module 216E may determine the type of message based on the sender's intention of the message determined by the intention recognizer module 216B. For example, if the intention of the received message is a yes or no question, an instruction, a request, or a suggestion, the reply type determiner module 216E may determine the type of message as the yes or no question. Further, when the sender's intention of the received message is a question for asking data belonging to a specific category, the reply type determiner module 216E may determine the type of message as a short answer type. The question for asking the data belonging to a specific category may include, for example, a question for asking specific information (e.g. "What is the Hae Jun's number?"), and a question for asking what the sender and the user want to do together, time, place, and way (e.g. "what time shall we meet at night?"). The reply type determiner module 216E may classify the message type into a plurality of categories as shown in Table 3.

TABLE 3

| Message type | | |
|---|---|---|
| Level1 | Level2 | Level3 |
| yes no | yes | n/a |
|  | no | n/a |

TABLE 3-continued

| Message type | | |
|---|---|---|
| Level1 | Level2 | Level3 |
| short answer | person | relation |
|  |  | phone number |
|  |  | job |
|  |  | age |
|  | location | home |
|  |  | office |
|  |  | school |
|  |  | subway |
|  |  | gps value |
|  | date/time | relative |
|  |  | day of week |
|  |  | hour |
|  | number | count |
|  |  | date |
|  | activity | exercising |
|  |  | size |
|  |  | price |
|  |  | age |
|  |  | studying |
|  |  | working |
|  |  | relaxing |
|  |  | cooking |
|  |  | cleaning |
|  |  | traveling |
|  |  | car driving |
|  |  | watching tv |
|  |  | breakfast |
|  |  | lunch |
|  |  | dinner |
|  |  | snack |
|  | food | bibimbap |
|  |  | bulgogi |
|  |  | spaghetti |
|  |  | risotto |
|  |  | pizza |
|  |  | sushi |
|  |  | ramen |
| choose one | A or B | n/a |
|  | A or B or C | n/a |
|  | a plurality of X | n/a |
| custom | greeting | How_are_you |
|  |  | How_are_you_doing |
|  |  | What_are_you_doing |
|  | weather | Nice_weather |
|  | good-bye | Have_a_nice_day |
|  |  | Have_a_nice_dinner |
|  |  | Have_a_nice_weekend |
|  |  | Good_night |

As shown in Table 3, the message type may include a yes or no type, a short answer type, a type for selecting one of a plurality of given items, etc., and one message type may be classified into a plurality of lower categories. For example, in the case of the short answer type, the short answer type may be classified into a specific person-based answer type, a specific location-based answer type, a specific number-based answer type, and the like. Table 3 is merely an example of an answer type, and the answer type may be designated corresponding to the sender's intention of each received message.

The candidate reply generator module 230 may generate at least one recommendation answer message to be provided to the user. The candidate reply generator module 230 may include a reply searcher module 232, a reply sentence generator module 234, and a corpus database 236.

The corpus database 236 may store a response intention corresponding to the sender's intention. For example, the corpus database 236 may store positive, negative, and unknown answers as a response intention to the yes or no question. For example, the corpus database 236 may store a suggestion or an advice based on data selected by the user as a response to a question (HOW_WILL_WE_DO_QUESTION) asking about what the sender and the user want to do together, time, place, way, etc.

TABLE 4

| The sender's intention | The response intention |
|---|---|
| YES_OR_NO_QUESTION | ANSWER_POSITIVE |
|  | ANSWER_NEGATIVE |
|  | ANSWER_NOT_SURE |
| INFORMATION_QUESTION | ANSWER_XX |
|  | ANSER_DO_NOT_KNOW |
| HOW_WILL_WE_DO_QUESTION | SUGGEST_XX |
|  | LETS_XX |
|  | ANSER_DO_NOT_KNOW |
| SUGGESTION | ANSWER_AGREE |
|  | ANSWER_DISAGREE |
|  | ANSER_DO_NOT_KNOW |
| congratulations | ANSWER_THANKYOU |
| HAVE_A_NICE_WEEDEND | HAVE_A_NICE_WEEDEND |

The corpus database 236 may store a recommendation answer message corresponding to a response intention. For example, referring to Table 5, the corpus database 236 may be store "have a nice dinner," "enjoy your dinner," and "enjoy your meal" corresponding to the response intention to have a nice dinner (HAVE_A_NICE_DINNER).

TABLE 5

| Response intention (Corpus ID) | The presence of honorific form | Recommendation answer message (Corpus) |
|---|---|---|
| HAVE_A_NICE_DINNER | Non-honorific form | 저녁 맛있게 먹어 |
|  |  | 즐거운 식사시간 되길 |
|  | Honorific form | 저녁 맛있게드세요 |
| HAVE_A_NICE_WEEDEND | Honorific form | 주말 잘 내세요 |
|  |  | 행복한주말 되세요 |
|  | Non-honorific form | 주말 잘 보내 |
|  |  | 주말 잘 보나 |
| ASK_WHO | Non-honorific form | 누구 |
|  |  | 누구야 |
|  | Honorific form | 누구세요 |
| ANSWER_LOCATION_XX | Honorific form | XX입니다 |
|  | Non-honorific form | XX에 있습니다 |
|  |  | X 에 있어 |
| SUGGEST_XX | Honorific form | XX 어때세요 |
|  | Non-honorific form | XX괜찮아 |

The reply searcher module 232 may determine a response intention based on the sender's intention of the received message. For example, the reply searcher module 232 may obtain a response intention corresponding to the sender's intention from the corpus database 236.

The reply searcher module 232 may determine the recommendation information selected by the user as the response intention. For example, in response to a receiving a simple question for asking about a place, the reply searcher module 232 may provide a plurality of pieces of selectable recommendation information and determine recommendation information selected by the user as the response intention.

For example, when the received message is "Mr. Gil-dong, where shall we meet for a dinner today?", the semantic analyzer module 216 may determine that the sender's intention of the received message is for asking about a place to meet for dinner. When the sender's intention of the message is for asking about a place to meet for dinner, the reply searcher module 232 may display a plurality of places or a map and in response to receiving a user input that selects at least one of the plurality of places or a point of the map, determine a suggestion to meet at the selected place as a response intention.

In response to determining at least one response intention, the reply searcher module 232 may obtain a recommendation answer message corresponding to the determined response intention from the corpus database 236. The reply searcher module 232 may determine whether to use the honorific form to the answer message based on the presence of the honorific form in the received message and the relationships between the sender and the user, and if the honorific form is used, the reply searcher module 232 may obtain other recommendation information.

The reply sentence generator module 234 may change the obtained recommendation information into the words, the expressions, or the way of talking in the message exchanged between the user and the sender. The device 100 may store the words, the expressions, or the way of talking in the message exchanged between the user and the sender corresponding to the sender. Accordingly, the reply sentence generator module 234 may obtain at least one message corresponding to the response intention and change the words, the expressions, or the way of talking in the obtained message into the words, the expressions, or the way of talking corresponding to the sender.

For example, if the user used to add "ooo" to the end of the sentence of the message to be addressed to the sender, and the obtained recommendation answer message is "how about Garosu-gil?", the reply sentence generator module 234 may change "how about the Garosu-gil ?" to "Hooow about the Garosu-gil?".

The device 10 may analyze the conversations exchanged between the user and an acquaintance and store the words, the way of talking, and the expression used by the acquaintance. The reply sentence generator module 234 may generate a recommendation answer message according to the words, the way of talking or the expressions of the sender.

Accordingly, the device 100 may automatically generate an answer message reflecting intimacy with the sender.

A tree generation module 235 may determine a plurality of pieces of recommendation information based on the obtained data and generate relations between the plurality of pieces of recommendation information. For example, the tree generation module 235 may provide a tree structure that represents the relations between the plurality of pieces of recommendation information to the user and transmit at least one of recommendation information selected from the plurality of pieces of recommendation information by the user to the reply searcher module 232. The reply searcher module 232 may determine at least one of recommendation information obtained from the tree generation module 235 as a response intention. In the tree structure, the plurality of pieces of recommendation information may be arranged or grouped based on the information, use frequency, similarity between words of the recommendation information.

The tree generation module 235 may collect data required for generating the recommendation information. For example, the tree generation module 235 may collect data from the corpus database 236. The tree generation module 235 may obtain user context from a context framework 300. The tree generation module 235 may collect data from a camera, an application that stores images, a memo application, a web paging application, a message application, etc.

The tree generation module 235 may be necessary for generating a plurality of pieces of recommendation information and use data registered by the user. For example, the user may execute a data registration mode (or, an auto thinking mode). In response to the data registration mode being executed, the data retrieved, captured, and noted by the user may be determined to be necessary for generating recommendation information having a high priority. In response to a content is being provided, the user may select a data registration menu and register the content being provided as data necessary for generating recommendation information. The user may register the tag and importance of the content. The example of the case of determining data to be used for recommendation information by a user through a data registration mode will be described in detail with reference to FIGS. 11A and FIG. 11B.

Figure 4:
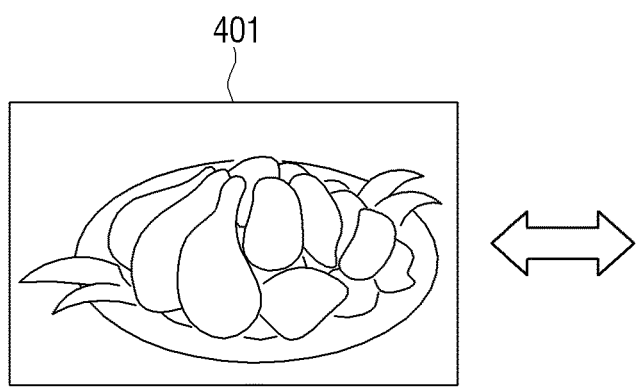
FIG. 4 is a view provided to explain a process of generating keywords from an image according to an embodiment of the present disclosure.

The tree generation module 235 may generate keywords based on the collected data. For example, the tree generation module 235 may extract texts from the content, the link information, and the like to generate keywords. The tree generation module 235 may generate keywords using the metadata, the tag or the importance of the content input by the user. When the content is an image or a video, the tree generation module 235 may analyze the image or the video to generate keywords. For example, from an image 401 of FIG. 4, the tree generation module 235 may generate keywords such as the "chicken", "Hongdae area", "outchicken", "chips", "hot place", "spicy chicken", "beer", "chicken and beer", and the like The tree generation module 235 may categorize the generated keywords. The plurality of keywords may be included in the group of a representative keyword. For example, "spicy chicken", "outchicken" and "chicken" may be included a representative keyword group of "chicken".

The tree generation module 235 may determine keywords or a representative keyword as recommendation information corresponding to a response intention and provide the recommendation information in a tree structure to the user. For example, a plurality of pieces of recommendation information may correspond to respective nodes in a node structure.

Figure 5A:
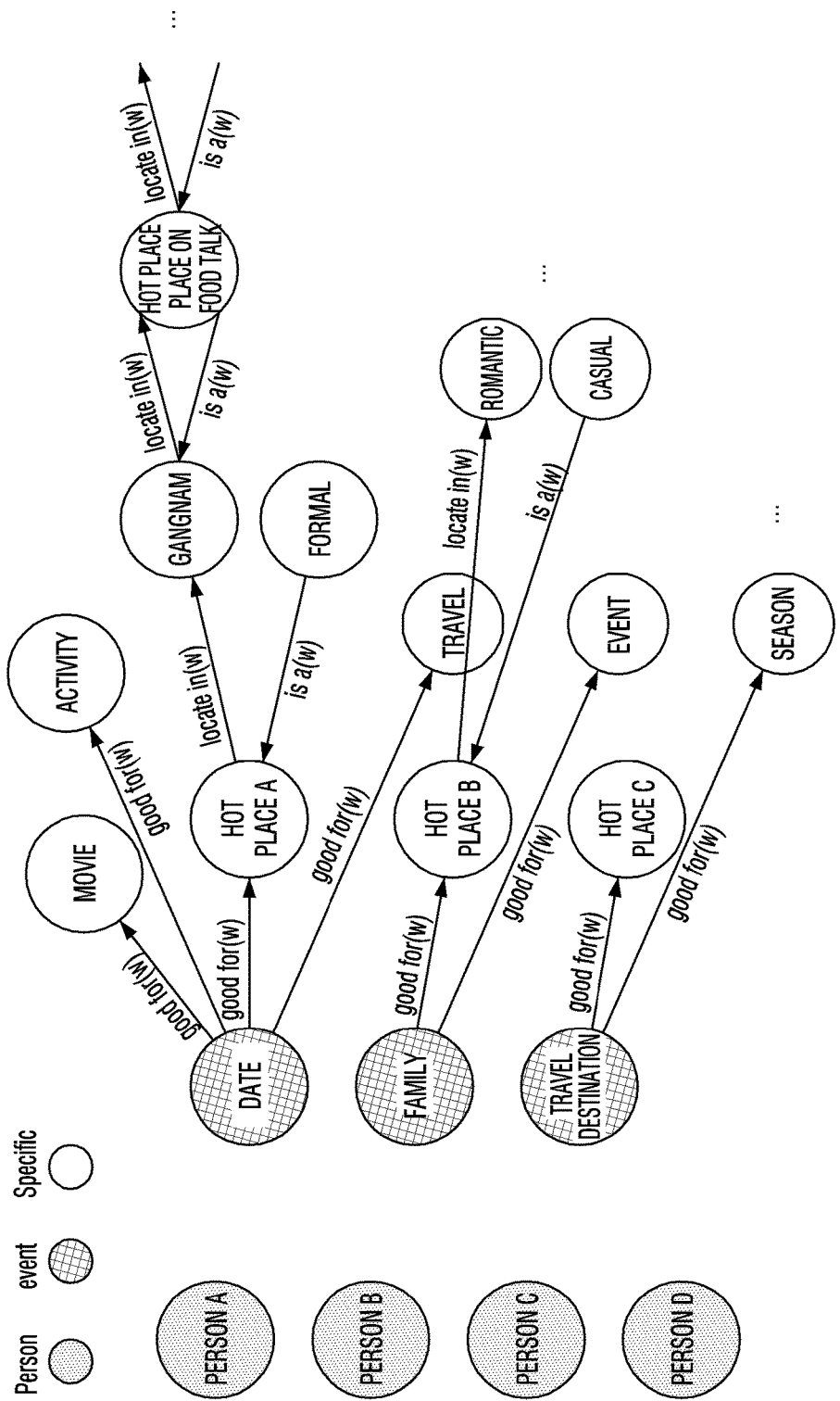
FIGS. 5A, 5B, and 5C are views illustrating recommendation information and relations between the recommendation information according to an embodiment of the present disclosure.
Figure 5B:
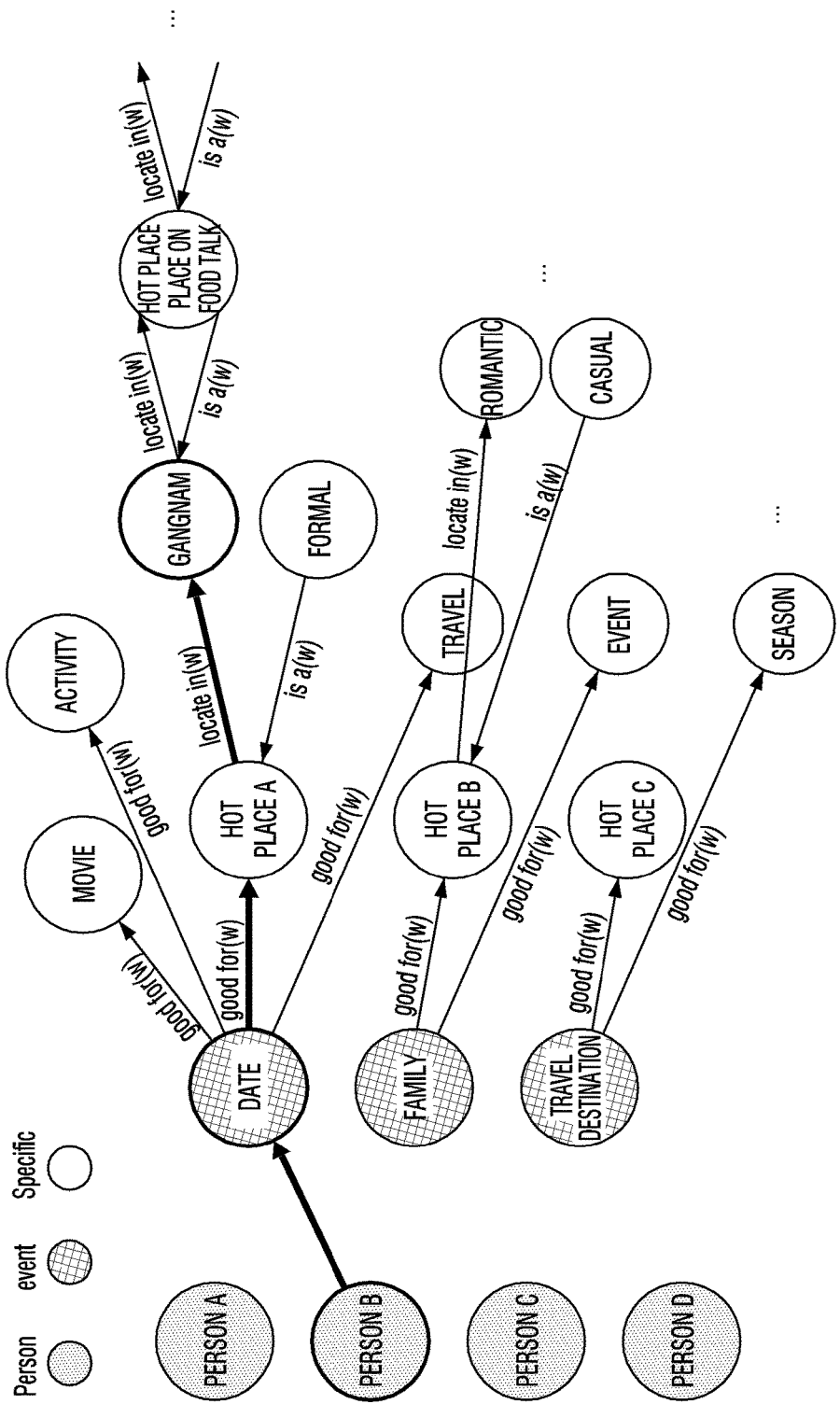
Figure 5C:
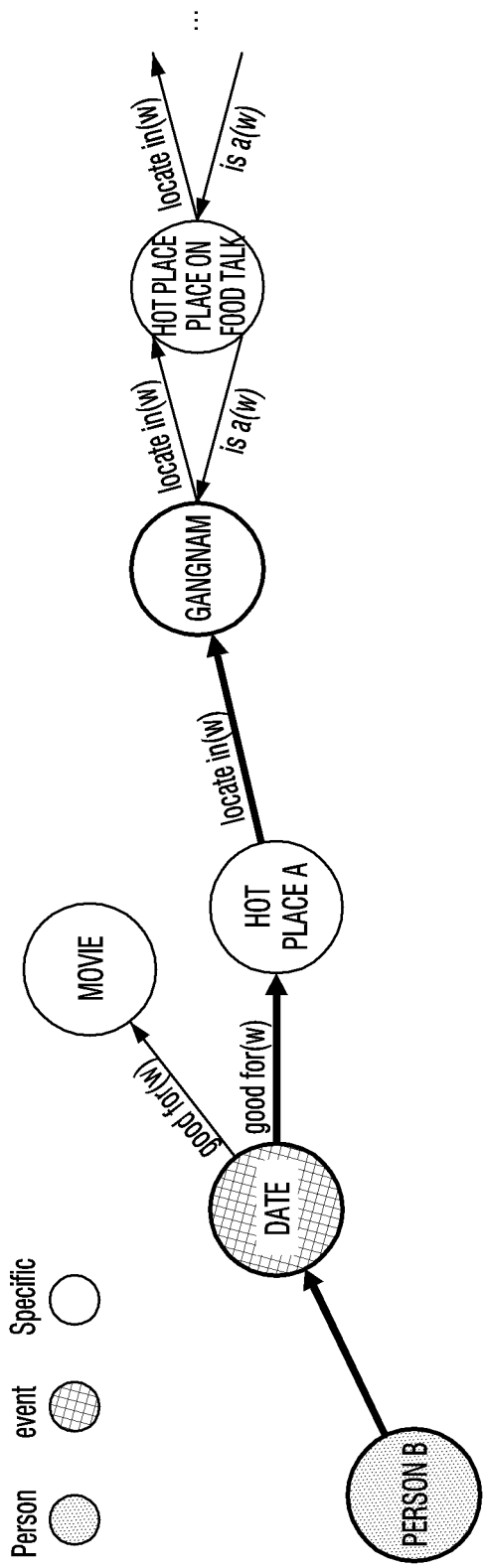

FIGS. 5A to 5C are views illustrating recommendation information and relations between the recommendation information according to an embodiment of the present disclosure.

Referring to FIG. 5A, the tree generation module 235 may classify recommendation information according to specific objects or conditions required for an event and a purpose and define relations between the recommendation information. For example, the recommendation information may be classified into categories of "date", "family", or "travel destination" depending on the purpose. In this case, the recommendation information related to "date" may be, for example, "movie", "activity" and "hot place". The "hot place' may relate to other recommendation information such as "Gangnam", "formal', or the like. In addition, other recommendation information may continue to relate to another recommendation information. For example, "Gangnam" may further have a relationship with "food talk hot place".

The plurality of pieces of recommendation information may be linked to one another based on weight values regarding various attributes such as at least one of preference, importance, location, time, and atmosphere of the plurality of pieces of recommendation information. For example, "movie", "hot place A", and "travel" associated with "date" may be connected to one another based on a preference weight (e.g. good for (w)). In addition, the "hot place A" may be connected to the "Gangnam" based on a location weight (e.g. located in (w)). In addition, the "formal" may be connected to the "hot place A" based on an equality/inclusion weight (e.g. is a (w)). In addition, the "food talk hot place" may be connected to the "Gangnam" based on the location weight and the equality/inclusion weight.

The recommendation information may be grouped by category, and the representative recommendation information may be defined as a node of the tree structure. For example, the representative recommendation information may be a "hot place", which is the representative of "hot place A", " hot place B" and "hot place C". The representative recommendation information may be "movie", "sports", and "travel", which are representative keywords in the specific field.

The tree generation module 235 may determine recommendation information having a high weight relating to the sender based on the sender's intention of the received message.

For example, in FIG. 5B, when the sender is "person B", the tree generation module 235 may obtain "date" as recommendation information having a high weight relating to the "person B". The tree generation module 235 may obtain "hot place A" as recommendation information having a high weight relating to the "date" and obtain "Gangnam" as recommendation information having a high weight relating to the "hot place A".

Referring to FIG. 5C, the recommendation information based on the sender's intention of the "person B" may be provided in the form of tree structure. For example, the recommendation information and the relations between the recommendation information may be indicated by nodes and arrows connecting the nodes as shown in FIG. 5C, but the present disclosure is not limited thereto. The relations between the recommendation information may be provided in various structures.

Based on the recommendation information and the relations between the recommendation information, when a user determine at least one recommendation information, the tree generation module 235 may transmit the determined recommendation information to the reply searcher module 232. The reply searcher module 232 may determine the received recommendation information as a response intention.

Referring to FIG. 3, the device 100 may include the context framework 300.

The context framework 300 may obtain the context of the user at the particular period of time. Examples of the context of the user may include the time, day, date, schedule of the user, location of the user, activity of the user, but the present disclosure is not limited thereto. For example, the context framework 300 may obtain the schedule information of the user at the particular period of time based on the schedule information of the user which is stored in the device 100. The context framework 300 may obtain the location information of the user by using a location sensor (e.g. GPS) provided in the device 100. The context framework 300 may detect the activity of the user by using a camera, a position sensor or a motion sensor provided in the device 100.

The candidate reply generator module 230 may determine a recommendation answer message based on the sender's intention of the received message and the context of the user obtained through the context framework 300.

For example, the reply searcher module 232 may obtain the context of the user from the context framework 300. The reply searcher module 232 may determine a recommendation answer message based on the sender's intention and the obtained context of the user.

The corpus database 236 may store the sender's intention and a response intention corresponding to the context. For example, as shown in FIG. 6, at least on answer intonation corresponding to the sender's intention and the context may be stored.

TABLE 6

Type of the received message

| Sender's intention (lv1) | Sender's intention (lv2) | Message type (lv1) | Message type (lv2) | The presence of honorific form | Context | | | Response intention |
|---|---|---|---|---|---|---|---|---|
| | | | | | Time | Date | Contact registration | |
| Greeting | Night | custom | Good_night | Honorific form | Evening | Monday | Registered | HAVE_A_NICE_DINNER |
| Greeting | Night | custom | Good_night | Non-honorific form | Evening | Friday | Registered | HAVE_A_NICE_WEEKEND |
| Greeting | Night | custom | Good_night | Non-honorific form | Evening | Tuesday | Non-registered | ASK_WHOHAVE_A_NICE_DINNER |
| Question | Location | Short Answer | Location | Honorific form | Noon/afternoon | Wednesday | Registered | ANSWER_LOCATION_OFFICEANSWER_LOCATION_HOME |
| Question | Location | Short Answer | Location | Non-honorific form | Night | Thursday | Registered | ANSWER_LOCATION_HOMEANSWER_LOCATION_OFFICE |

Accordingly, the reply searcher module 232 may obtain a response intention corresponding to the sender's intention and the context.

For example, in response to receiving a message "good evening" at night, the reply searcher module 232 may determine whether the time when the message was received, the day when the message was received, and the contact information of the sender are stored in the device 100. The reply searcher module 232 may determine that the intention of the message "good evening" as a greeting at night, the time when the message was received as evening, the day when the message was received as Wednesday, and the contact information of the sender as being stored in the device 100. Accordingly, the reply searcher module 232 may obtain a response intention to have a nice dinner (HAVE_A_NICE_DINNER) from the corpus database 236 corresponding to the case where the intention of the sender is a greeting at night, the context is Wednesday evening, and the contact information of the sender is stored in the device 100.

Accordingly, the device 100 may provide a different recommendation answer message depending on the context of the user although the same message is received.

The corpus database 236 may store a different recommendation answer message depending on whether the horrific form is used and whether the contact information of the sender is stored in the device 100 in addition to the sender's intention and the context of the user.

The reply searcher module 232 may determine a relationship between the sender and the user based on the presence of the telephone number of the sender in the device 100 and the name corresponding to the telephone number of the sender. For example, when the name corresponding to the telephone number stored in the device 100 is "mommy" or "mom", the reply searcher module 232 may determine that the sender is the user's mother. The reply searcher module 232 may determine the relationship between the sender and the user based on the contact information group including the telephone number of the sender. The examples of the contact information group may include family, company, school, social club, and the like.

The reply searcher module 232 may determine whether to use the horrific form in the answer message based on the relationship between the sender and the user. Accordingly, the reply searcher module 232 may determine a recommendation answer message based on the relationship between the sender and the user in addition to the sender's intention and the context of the user.

For example, the device 100 may receive a message "what are you doing?" at 9:30 am, on March 30, 2015 from the user's mother. In response to the message, the device 100 may determine one of the messages "why?", "I am working", "I am busy right now", "what happened?" and "I don't know" in the honorific form as a recommendation answer message.

In response to receiving the same message at the same time from a guy at the blind date, the reply searcher module 232 may determine one of the messages "why?", "I am working", "I am busy right now", "what happened?" and "I don't know", as a recommendation answer message.

Figure 6A:
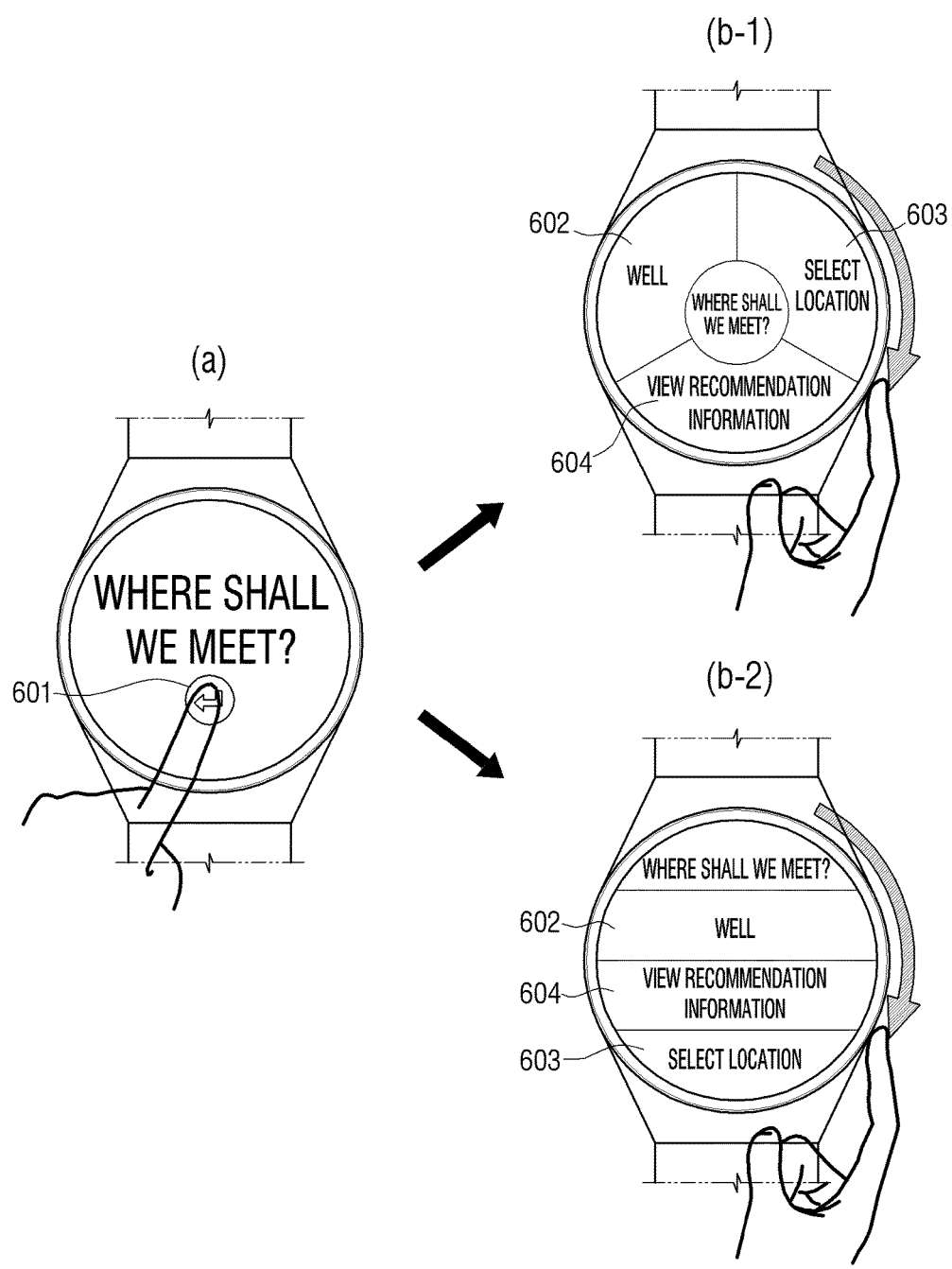
FIGS. 6A and 6B are views illustrating recommendation information for an answer message according to an embodiment of the present disclosure.
Figure 6B:
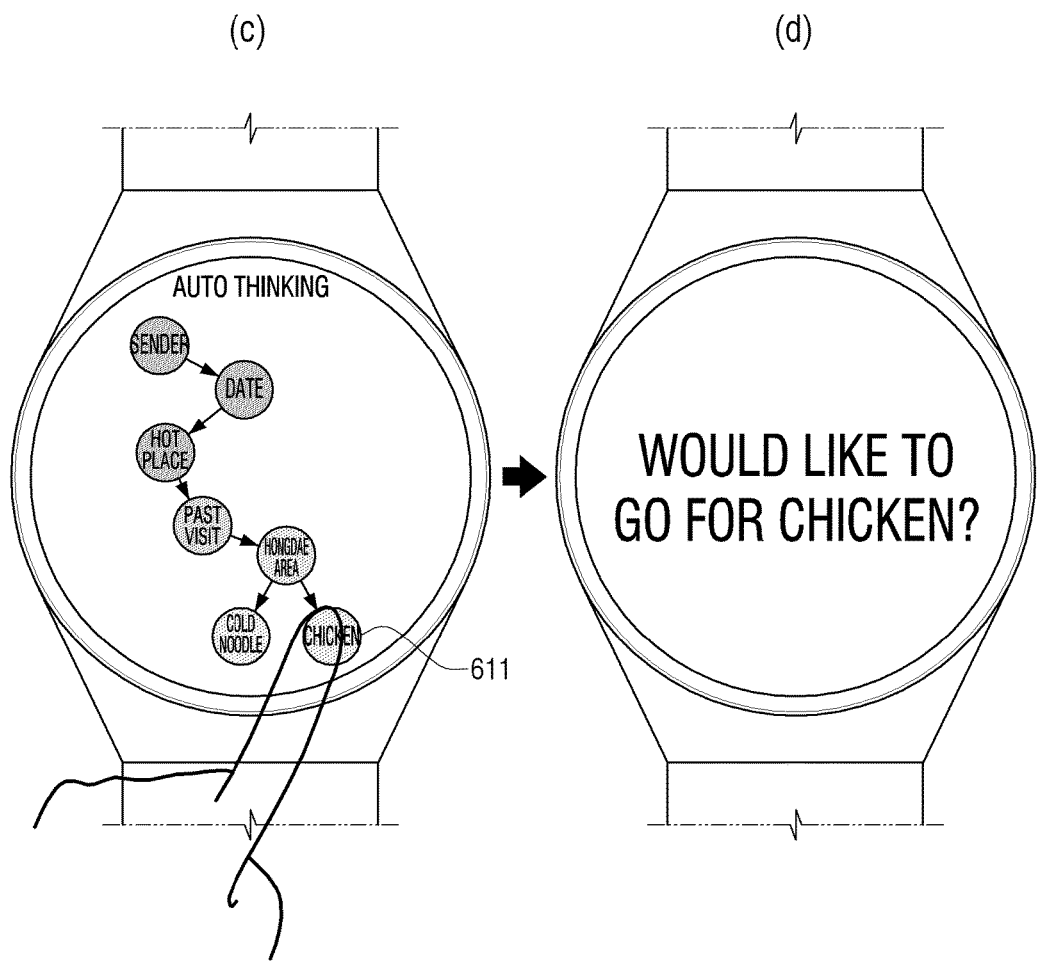

FIGS. 6A and 6B are views illustrating recommendation information for an answer message according to an embodiment of the present disclosure.

Referring to (a) of FIG. 6A, the device 100 may be a wearable watch. The communicator 130 may receive a message "where shall we meet?". In response to the received message, the user input unit 145 may receive a user input that selects an ok button 601.

In response to receiving a user input, as shown in FIG. (b-1) or (b-2) of FIG. 6A, the processor 170 may display the display 110 to display a plurality of user interfaces 602, 603 and 604 for determining an answer message.

According to an embodiment, as shown in (b-1) of FIG. 6A, the processor 170 may divide a screen area into a central area and outer areas and control the display 110 to display the received message on the central area and the plurality of user interfaces 602, 603 and 604 on the outer areas.

The processor 170 may control the display 110 to display the user interface 602 "well" as a recommendation answer message for the received message.

When the sender's intention of the message is to ask about a place, the processor 170 may control the display 110 to display the user interface 603 for the user to select a place.

The processor 170 may control the display 110 to display the user interface 604 to show the recommendation information.

A whirl may be provided in a bezel area of the device 100. The processor 170 may control the display 110 to display the user interface selected by the user to be differentiated from the interface of another user. For example, the processor 170 may control the display 110 so that the selected user interface has a different color or pattern from another area.

In response to a user input that rolls the whirl of the device 100, the processor 170 may sequentially select the user interfaces 602,603 and 604 in a direction of rolling the whirl. In response to receiving a user input that rolls the whirl at a predetermined angle or more, the processor 170 may control the display 110 to remove the displayed user interface and display a new user interface.

According to another embodiment, as shown in (b-2) of FIG. 6A, the processor 170 may display the display 110 so that a screen is divided into a plurality of areas by lines or colors, the received message is displayed on the top area of the plurality of areas, and the plurality of interfaces 602,603 and 604 are displayed on the bottom area.

In response to receiving a user input that rolls the whirl, the processor 170 may sequentially select the user interfaces 602,603 and 604 in the direction of rolling the whirl. In response to a user input that rolls a whirl at a predetermined angle or more, the processor 170 may control the display to remove the displayed user interface and to display a new user interface while being scrolled.

In (b-1) or (b-2) of FIG. 6A, the user input unit 145 may receive a user input that selects the user interface 604 for showing the recommendation information.

As shown in (b-1) or (b-2) of FIG. 6A, according to the user input that selects the user interface 604 for showing recommendation information, as shown in (c) of FIG. 6B, the processor 170 may control the display 110 to display graphics representing recommendation information and relations between the recommendation information. In this case, the recommendation information may be indicated by the nodes, and the relations between the recommendation information may be indicated by arrows connecting the nodes. Specifically, when a sending message is "where shall we meet?", the processor 170 may generate recommendation information based on the sender's intention of the sending message. The recommendation information may be linked in the order of "sender", "date", "hot place", "ever been", "Hongdae area", "chicken" and "cold noodle". The user may select one of recommendation information from the plurality of pieces of recommendation information. In (c) of FIG. 6, the user input unit 145 may receive a user input that selects "chicken 611".

Receiving a user input, as shown in (d) of FIG. 6B, the processor 170 may generate an answer message including recommendation information and control the display 110 to display the generated answer message. For example, the processor 170 may generate a sending message "Do you want to eat chicken?" using recommendation information "chicken". The processor 170 may generate an answer message using not only the recommendation information selected by the user but also other recommendation information linked to the recommendation information. For example, various types of answer messages having a response intention corresponding to the sender's intention may be generated by the operation of each module of the engine 200 of FIG. 3.

Although not shown, various types of answer messages using the recommendation information may be generated and displayed. In response to a user input that selects one of a plurality of answer messages, the processor 170 may determine the selected answer message as a message to be transmitted to the sender.

Figure 7:
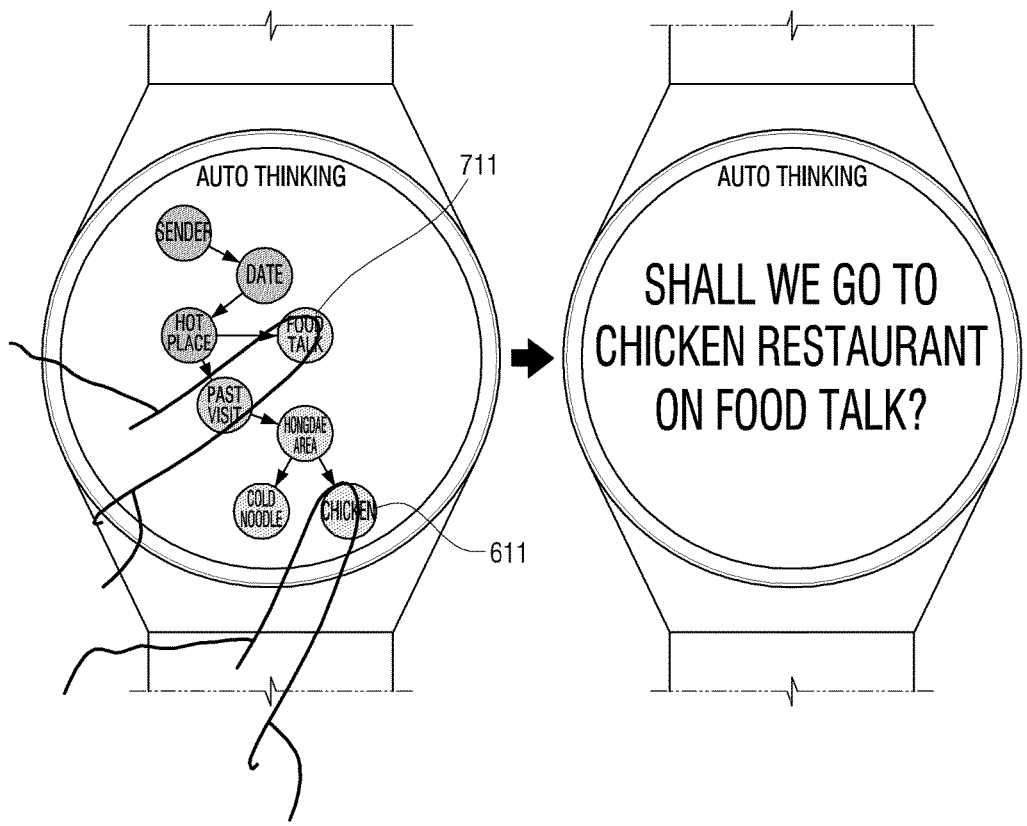
FIG. 7 is a view illustrating recommendation information for an answer message according to another embodiment of the present disclosure.

FIG. 7 is a view illustrating recommendation information for an answer message according to another embodiment of the present disclosure.

In (b-1) or (b-2) of FIG. 6A, in response to a user input that selects the user interface 604 for showing the recommendation information, as shown in (a) of FIG. 7, the processor 170 may control the display 110 to display graphics representing recommendation information and relations between the recommendation information. The user input unit 145 may receive a user input that selects plural recommend information "food talk 711" and "chicken 611". The user input that selects the plurality of pieces of recommendation information may be made sequentially, simultaneously or within a predetermined time (e.g. within a one second) using multi-touch gesture, etc.

As shown in (b) of FIG. 7, according to a user input, the processor 170 may generate an answer message including the plurality of pieces of recommendation information and control the display 110 to display the generated answer message. For example, the processor 170 may generate an answer message "shall we go to the chicken restaurant on the food talk?" based on the recommendation information "chicken 611" and "food talk 711". The processor 170 may generate an answer message by using not only the recommendation information selected by the user but also other recommendation information linked to the recommendation information. For example, various types of the answer messages having a response intention corresponding to the sender's intention may be generated by the operation of each module of the engine 200 of FIG. 3.

Although not shown, various types of answer messages using the plurality of pieces of recommendation information may be generated and displayed. According to the user input that selects one of the plurality of answer messages, the processor 170 may determine the selected answer message as a message to be transmitted to the sender.

Figure 8A:
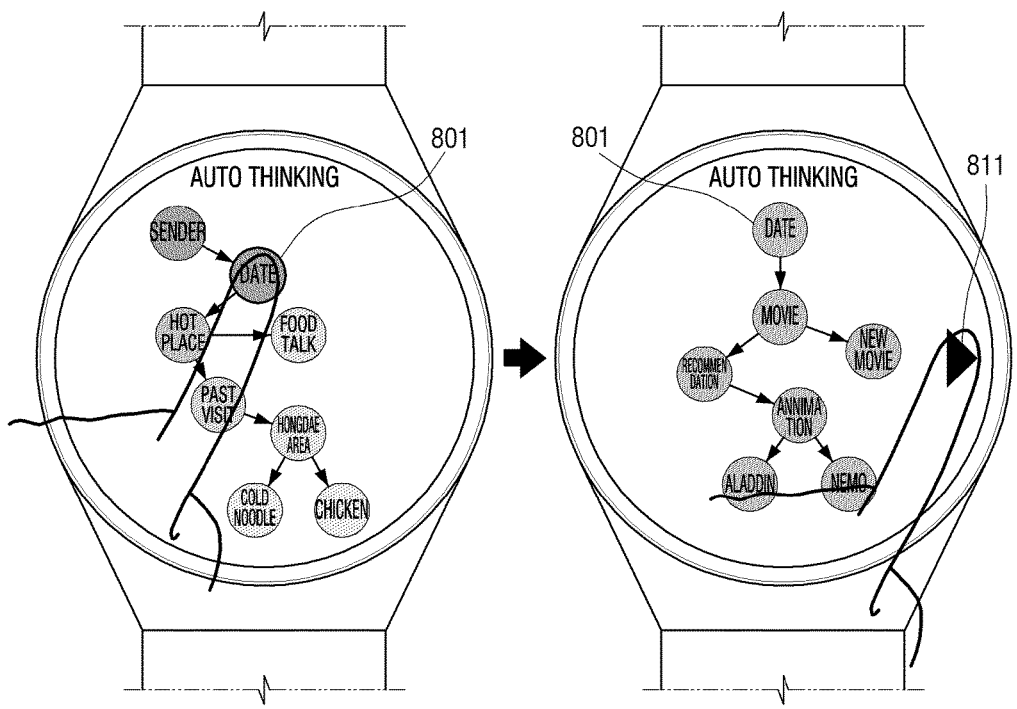
FIGS. 8A and 8B are views illustrating recommendation information for an answer message according to another embodiment of the present disclosure.
Figure 8B:
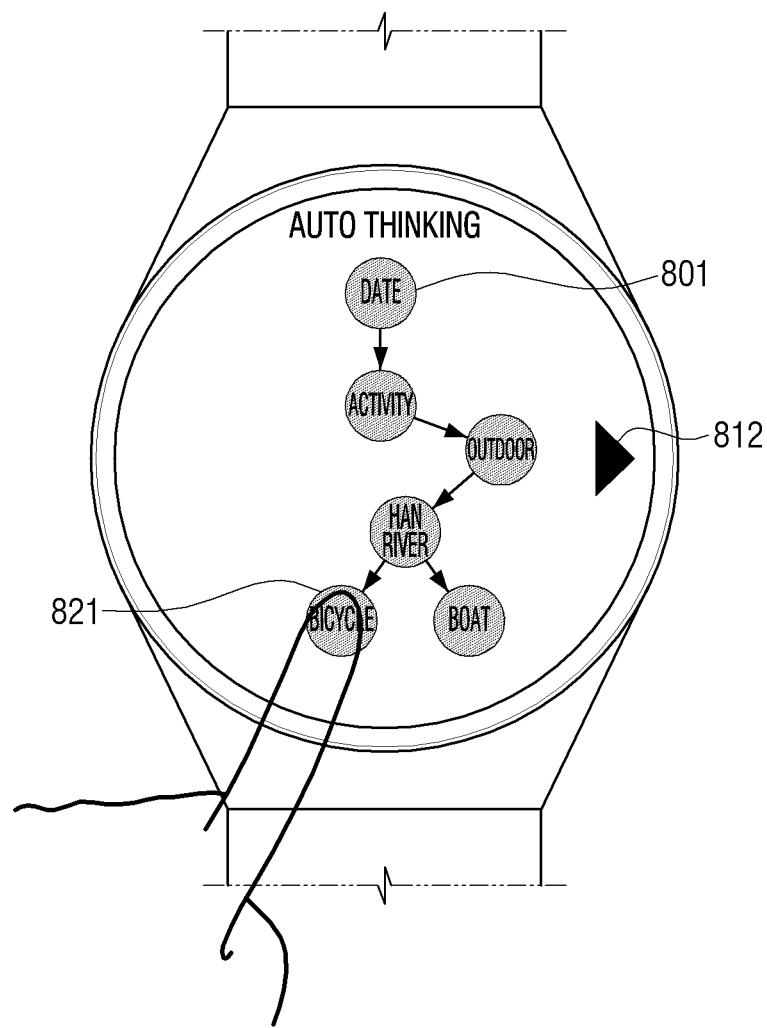

FIGS. 8A and 8B are views illustrating recommendation information for an answer message according to another embodiment of the present disclosure.

As shown in (b-1) or (b-2) of FIG. 6A, in response to a user input that selects the user interface 604 for showing the recommendation information, as shown in (a) of FIG. 8A, the processor 170 may control the display 110 to display graphics representing recommendation information and relations between the recommendation information. The user input unit 145 may receive a user input that selects "date 801". The user input may be for different recommendation information connected to the "date 801". Accordingly, a user input that determines the "date 801" as the recommendation information and a user input that represents other recommendation information connected to the "date 801" may be different from each other. For example, a user input that determines the "date 801" as recommendation information may be a tab gesture, and a user input that represents other recommendation information connected to the "date 801" may be a touch and hold gesture.

Referring to (b) of FIG. 8A, according to a user input, the processor 170 may control the display 110 to display first recommendation information connected to the "date 801" and relations between the first recommendation information on the basis of the "date 801". In response that there are other pieces of recommendation information on the basis of the "date 801", the processor 170 may control the display 110 to display a user interface 811 for showing another recommendation information. The processor 170 may receive a user input that selects the user interface 811.

Referring to (c) of FIG. 8B, according to a user input, the processor 170 may control the display 110 to display graphics representing second recommendation information connected to the "date 801" and relations between the second recommendation information on the basis of the "date 801". The user input unit 145 may receive a user input that selects "bicycle 821" as one of the second recommendation information.

According to a user input, the processor 170 may generate an answer message including the "bicycle 821" and control the display 110 to display the generated answer message.

Referring to (c) of FIG. 8B, according to a user input that selects a user interface 812, the processor 170 may control the display 110 to display graphics representing other recommendation information and relations between the other recommendation information on the basis of the "date 801". When other recommendation information based on "date 801" is not longer present, the processor 170 may control the display 110 to display the screen that reverts to the screen of (b) of FIG. 8A.

Figure 9B:
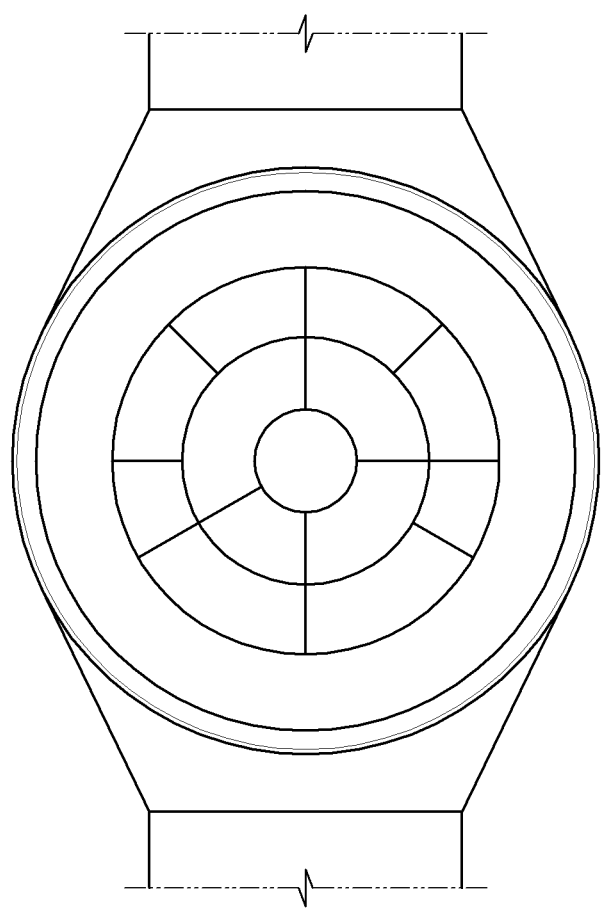

FIGS. 9A and 9B are views illustrating relations between recommendation information according to an embodiment of the present disclosure.

The recommendation information and the relations between the recommendation information may be displayed in various forms. For example, the recommendation information and the relations between the recommendation information may be displayed in the form of a tree structure including nodes and arrows as described above. Alternatively, as shown in FIGS. 9A and 9B, other recommendation information linked to one recommendation information may be displayed in a radial form around the center of the one recommendation information. The relations between the recommendation information may be indicated by arrows or lines as shown in (a) of FIG. 9A, or alternatively, the relations between recommendation information may be displayed by positions where the pieces of recommendation information are displayed without arrows or lines. For example, in (b) of FIG. 9AB, the plural pieces of recommendation information adjacent to one piece of the recommendation information may be regarded to be relevant to the one piece of recommendation information.

Alternatively, recommendation information and the relations between the recommendation information may be defined with reference to the positions of the divided areas as shown in (c) of FIG. 9. For example, when the screen is divided into a plurality of areas, the information at the center of the screen may become a reference information as being toward the central area of the screen, and a recommendation information having relations with a plurality of pieces of recommendation information may be displayed. Other recommendation information branched from the recommendation information at the center of the screen may be displayed as being toward the outer area of the screen.

FIGS. 10A to 10C are flowcharts provided to explain a method for providing a recommendation answer message by using a communication device and a wearable device according to an embodiment of the present disclosure.

A communication device 100A and a wearable device 100B may include at least one element of the engine 200 of FIG. 2. For example, the elements of the engine 200 of FIG. 2 may belong to either the communication device 100A or the wearable device 100B. The wearable device 100B may be disposed outside the communication device 100A and refer to the device 100 attached to part of the body of the user. The wearable device 100B may perform long-distance wireless communication in addition to short-distance wireless communication. The communication device 100A and the wearable device 100B may be connected via short-distance wireless communication. For example, the communication device 100A and the wearable device 100B may be paired via Bluetooth. Accordingly, when the wearable device 100B and the communication device 100A are located within a reference distance, the communication device 100A and the wearable device 100B may be automatically connected via short-distance wireless communication.

According to an embodiment, at step S1001 of FIG. 10A, the communication device 100A may receive a message.

As step S1003, the communication device 100A may determine a sender's intention of the received message or a message type, and based on the determined sender's intention or the message type, determine at least one recommendation answer message. The communication device 100A may store the elements shown in FIG. 2.

At step S1005, the communication device 100A may transmit at least one determined recommendation answer message to the wearable device 100B.

At step S1007, the wearable device 100B may display the received recommendation answer message. The wearable device 100B may display a user interface for showing recommendation information necessary for generating an answer message.

At step S1009, in response to the user interface for showing the recommendation information being selected by a user, the wearable device 100B may transmit information indicating that the user interface for showing the recommendation information is selected to the communication device 100A.

At step S1011, the communication device 100A may determine a plurality of piece of recommendation information and relations between the plurality of piece of recommendation information.

At step S1013, the communication device 100A may transmit information indicating the plurality of piece of recommendation information and the relations between the plurality of piece of recommendation information to the wearable device 100B.

At step S1015, the wearable device 100B may display graphics representing the plurality of piece of recommendation information and the relations between the plurality of piece of recommendation information.

As step S1017, in response to one of the plurality of piece of recommendation information being selected by the user, the wearable device 100B may transmit the selected recommendation information to the communication device 100A.

At step S1019, the communication device 100A may generate an answer message including recommendation information based on the selected recommendation information, the sender's intention and the message type.

At step S1021, the communication device 100A may transmit the generated answer message to the sender. The communication device 100A may transmit the generated answer message to the wearable device 100B, and upon user confirmation, transmit the generated answer message to the sender.

According to another embodiment, at step S1031 of FIG. 10B, the wearable device 100B may receive a message.

At step S1033, the wearable device 100B may transmit the received message to the communication device 100A.

At step S1035, the communication device 100A may determine at least one recommendation answer message based on the sender's intention or the message type.

At step S1037, the communication device 100A may transmit at least one determined recommendation answer message to the wearable device 100B.

At step S1039, the wearable device 100B may display the received recommendation answer message. The wearable device 100B may display a user interface for showing recommendation information necessary for generating an answer message.

At step S1041, in response to the user interface for showing the recommendation information being selected by the user, the wearable device 100B may transmit the information indicating that the user interface for showing the recommendation information is selected to the communication device 100A.

At step S1043, the communication device 100A may determine the plurality of piece of recommendation information and relations between the plurality of piece of recommendation information.

At step S1045, the communication device 100A may display graphics representing the plurality of piece of recommendation information and the relations between the plurality of piece of recommendation information.

At step S1047, in response to one of the plurality of piece of recommendation information being selected by the user, the communication device 100A may generate an answer message including recommendation information based on the selected recommendation information, the sender's intention, and the message type.

At step S1049, the communication device 100A may transmit the generated answer message to the wearable device 100B.

At step S1051, the wearable device 100B may transmit the received answer message to the sender.

According to another embodiment, as step S1061 of FIG. 10C, the wearable device 100B may receive a message.

At step S1063, the wearable device 100B may determine at least one recommendation answer message based on the sender's intention or the message type.

At step S1065, the wearable device 100B may display the received recommendation answer message. The wearable device 100B may display a user interface for showing the recommendation information for generating an answer message.

At step S1067, in response to the user interface for showing the recommendation information being selected by the user, the wearable device 100B may transmit the information indicating that the user interface for showing the recommendation information is selected to the communication device 100A.

At steps S1069 to S1077, the wearable device 100B may transmit the answer message generated based on the plurality of piece of recommendation information selected by the user to the sender. Steps S1069 to S1077 correspond to steps S1043 to S1051 of FIG. 10B, respectively. Therefore, the detailed description will be omitted.

Figure 11A:
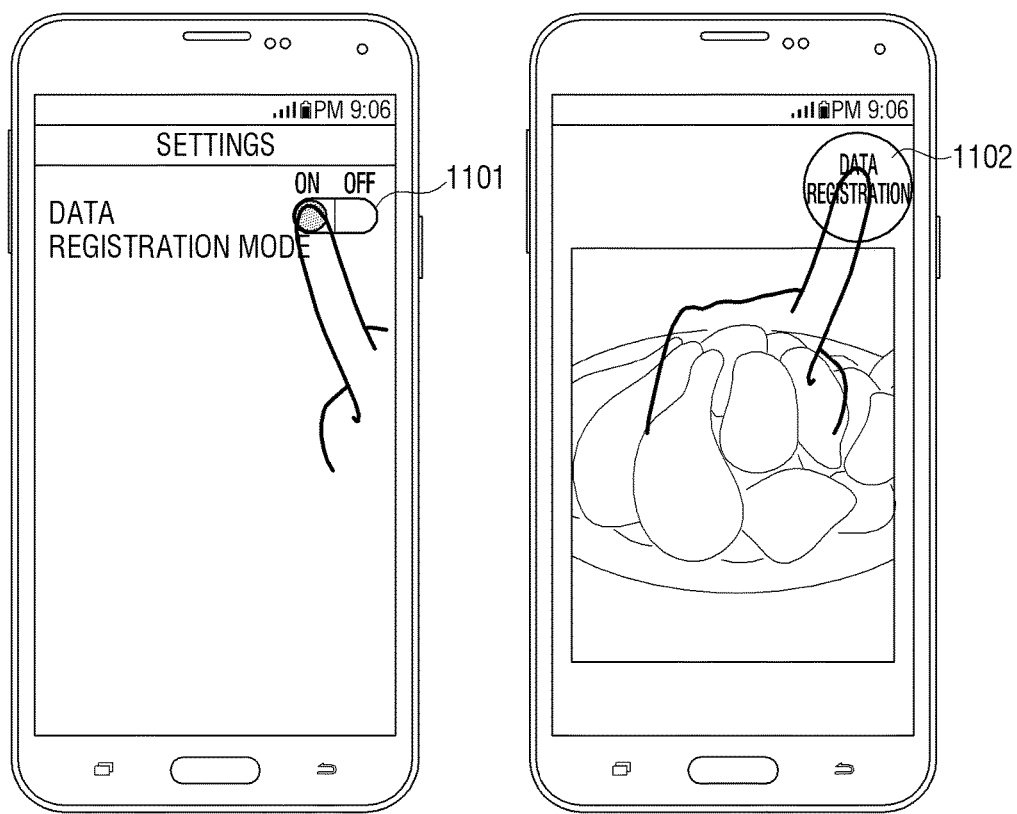
FIGS. 11A and 11B are views illustrating a process of determining data to be used for generating an answer message according to an embodiment of the present disclosure.
Figure 11B:
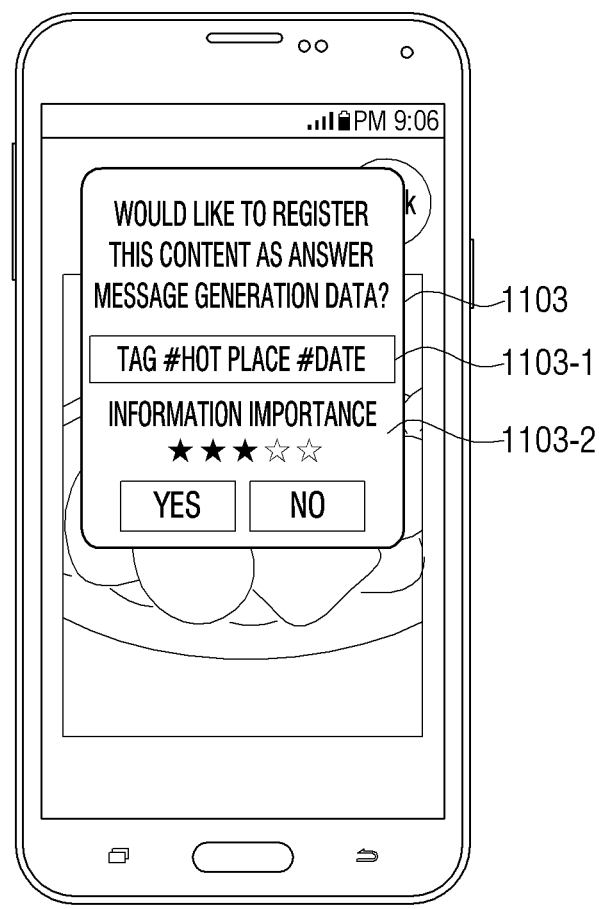

FIGS. 11A and 11B are views illustrating a process of determining data to be used for generating an answer message according to an embodiment of the present disclosure.

Referring to (a) of FIG. 11A, in response to a user input switching a data registration mode to an on-state through a data registration mode user interface 1101 on a setup screen, the processor 170 may execute a data registration mode.

Accordingly, when a content is provided or displayed as an example of data, the processor 170, as shown in (b) of FIG. 11A, may control the display 110 to display a data registration menu 1102 for registering the content as data to be used for generating an answer message. The content may include various types of information such as video, image, text, audio or webpage.

The user input unit 145 may receive a user input for selecting the data registration menu 1102 to register the content being provided as data to be used for generating an answer message.

According to a user input, as shown in (c) of FIG. 11, the processor 170 may control the display 110 to display a pop-up screen 1103 confirming that the content being provided is registered as data to be used for generating an answer message. The pop-up screen 1103 may include a tag input screen 1103-1 and an importance selection user interface 1103-2. According to a user input provided through the tag input screen 1103-1, the processor 170 may receive tag information of the content being provided. The tag information, for example, may be the description of the content, the availability of the content or the source of the content. According to a user input provided through the importance selection user interface 1103-2, the processor 170 may receive the importance of the content. The importance of the content may be one of very important, moderate important, and slightly important.

The processor 170 may generate recommendation information or an answer message based on the metadata, tag information and importance of a registered content and registered content as related information of the registered content.

For example, the processor 170 may store the registered content and the content related information in a user registration data area of the context framework 300. In response to a recommendation answer message or recommendation information to be used for the recommendation answer message being generated, the processor 170 may preferentially use the content and the content related information stored in the user registration data area.

As a recommendation answer message or recommendation information is generated using data directly registered by a user, satisfaction and convenience of a user who uses a message function may be enhanced.

Figure 12A:
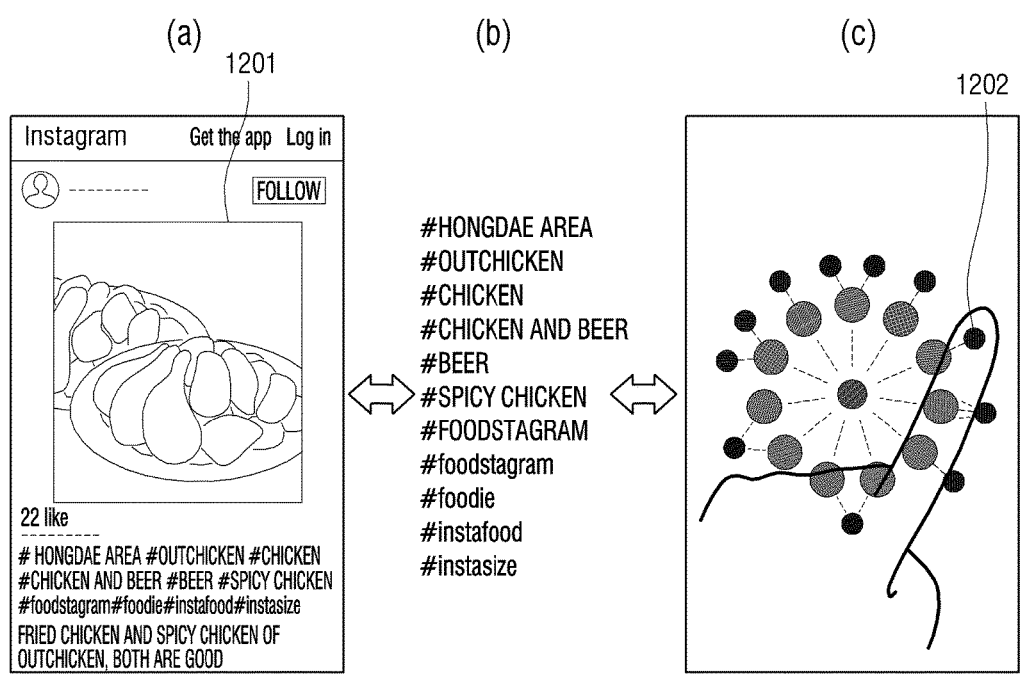
FIGS. 12A, 12B, 13A, and 13B are concept views provided to explain a process of providing an answer message according to another embodiment of the present disclosure.
Figure 13A:
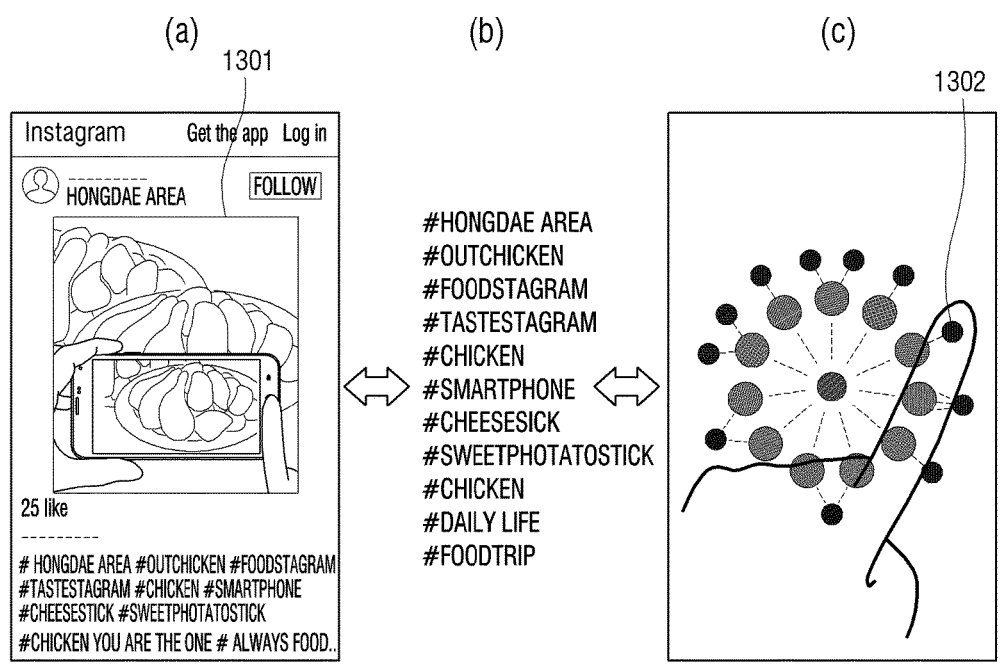
Figure 13B:
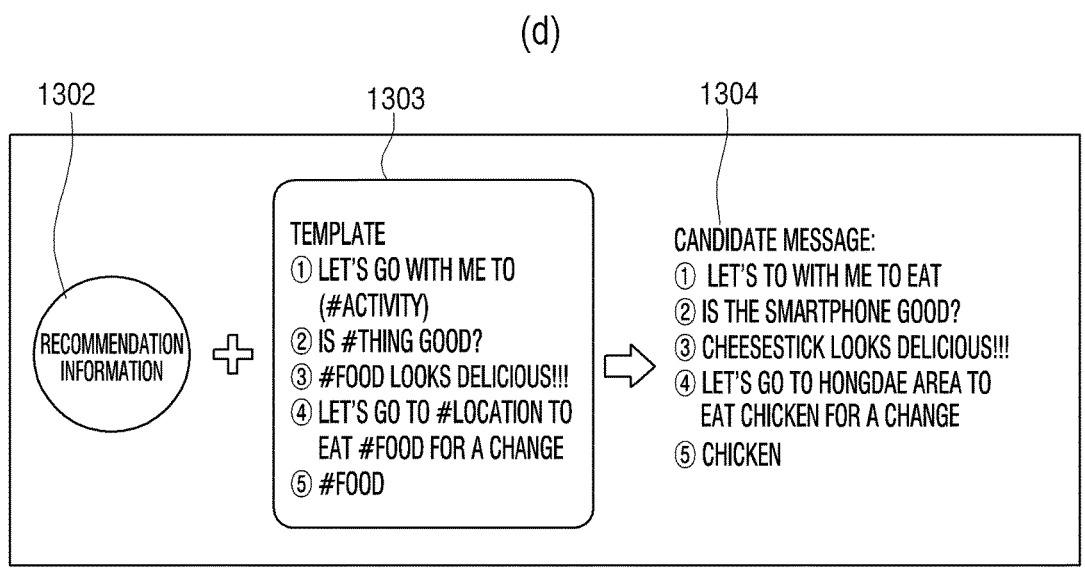

FIGS. 12A and 13B are concept views provided to explain a process of providing an answer message according to another embodiment of the present disclosure.

Referring to (a) of FIG. 12A, the processor 170 may control the display 110 to display a content 1201 registered at a social server. For example, when a user accesses the social server and retrieve a content registered by a third person, the processor 170 may control the display 110 to display the content 1201. The user input unit 145 may receive a user input for registering an answer message (e.g. comments, etc.) for the content 1201 registered at the social server.

The processor 170 may generate keywords from the content 1201 registered by the third party. As shown in (b) of FIG. 12A, the processor 170 may generate keywords such as "Hongdae area", "outchicken" "chicken", "chick and beer" "beer" "spicy chicken", "foodstagram", "instrafood", "instasize", and the like. Generating keywords from a content by the processor 170 may include obtaining keywords from the tags registered by the third person or the metadata of the content in addition to generating keywords by analyzing an image itself. The processor 170 may obtain keywords related to an image by using a search engine of an external server. For example, when the image is a food image, the processor 170 may retrieve restaurants offering food images, latest issues related to the food images, target customer of the food images from the external server and obtain a keyword accordingly.

As shown in (C) of FIG. 12A, the processor 170 may determine keywords or processed or categorized keywords as recommendation information and control the display 110 to display graphics representing the determined recommendation information and the relations between the recommendation information. The user input unit 145 may receive a user input that selects at least one recommendation information 1202 among the plurality of recommendation information.

Figure 12B:
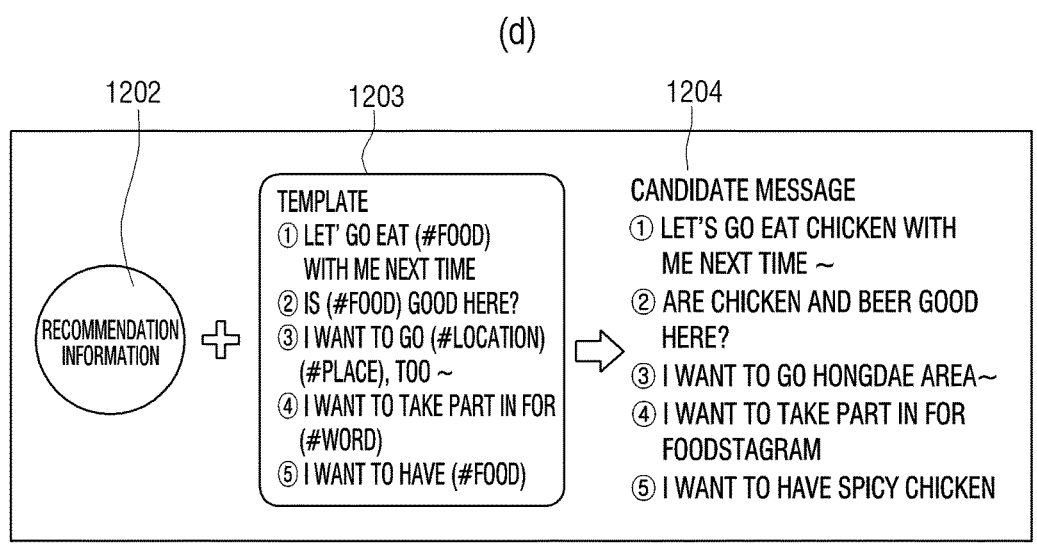

According to a user input, as shown in (d) of FIG. 12B, the processor 170 may generate candidate answer messages 1204 based on the recommendation information 1202 selected by the user and a template 1203 available for an answer message. The processor 170 may determine a template according to an attribute of the recommendation information 1202 selected by the user. For example, when the attribute of the recommendation information 1202 selected by the user is food, the processor 170 may select a template for generating an answer message including the food image and generate an answer message based on the template. For example, the processor 170 may generate an answer message "let's go eat chicken with me next time" by combing recommendation information "chicken" and a template "let's go eat #food with me next time". When "chicken" and "beer" are selected as plural pieces of recommendation information, the processor 170 may generate an answer message "the chicken and beer here are really great" by combining the plurality of pieces of recommendation information and a template "#food here is really great".

In response to a plurality of candidate answer messages being generated, the processor 170 may control the display 110 to display a user interface for a user to select one of the plurality of candidate answer messages. Accordingly, in response to one answer message being selected by the user, the processor 170 may register one selected answer message at a social server. For example, the processor 170 may register the selected answer message selected as a comment to the content registered by the third person at the social server.

According to another embodiment, as shown in (a) of FIG. 13A, the processor 170 may control the display 110 to display a content 1301 registered at the social server. The user input unit 145 may receive a user input for registering an answer message for the content 1301 registered at the social server.

As shown in (b) of FIG. 13A, the processor 170 may generate keywords such as "Hongdae area", "outchicken", "foodstagram", "chicken", "smartphone", "cheesestick", "sweetphotatostick", "daily life", "foodtrip", etc.

As shown in (c) of FIG. 13A, the processor 170 may determine recommendation information based on the generated keywords and control the display 110 to display graphics representing the determined recommendation information and the relations between the recommendation information. The user input unit 145 may receive a user input for selecting a recommendation information 1302 from the recommendation information.

According to a user input, as shown in (d) of FIG. 13B, the processor 170 may generate candidate answer messages 1304 based on the recommendation information 1302 selected by the user and a template 1303 available for an answer message. The processor 170 may determine a template according to an attribute of the recommendation information 1302 selected by the user. For example, when the attribute of the selected recommendation information is an activity, the processor 170 may select a template for generating an answer message including the activity and generate an answer message based on the template. For example, the processor 170 may generate an answer message "let's go grab a bite with me" by combining recommendation information "go grab a bite" with a template "let's #activity with me". When the plurality of recommendation information are selected and attributes of respective recommendation information are different, the processor 170 may select a template for generating an answer message by using the plurality of recommendation information with different attributes. For example, when "chicken" and "Hongdae area" are selected as the plurality of recommendation information with different attributes, the processor 170 may generate an answer message "let's go to the Hongdae area to eat chicken for a change" by combining the plurality of recommendation information with a template "let's go to #place to eat #food for a change".

FIGS. 14A to 15D are views illustrating screens for providing images as recommendation information according to another embodiment of the present disclosure.

When the device 100 provides an image or a video, the image or video may be used for recommendation information to be included in an answer message. The device 100 may understand a dialog intention of a sender or a user based on message history between the sender and the user and automatically provide an image or a video to be included in an answer message based on the dialog intention. As an image or a video which is to be included in an answer message is provided, a user may create an answer message more conveniently.

Figure 14A:
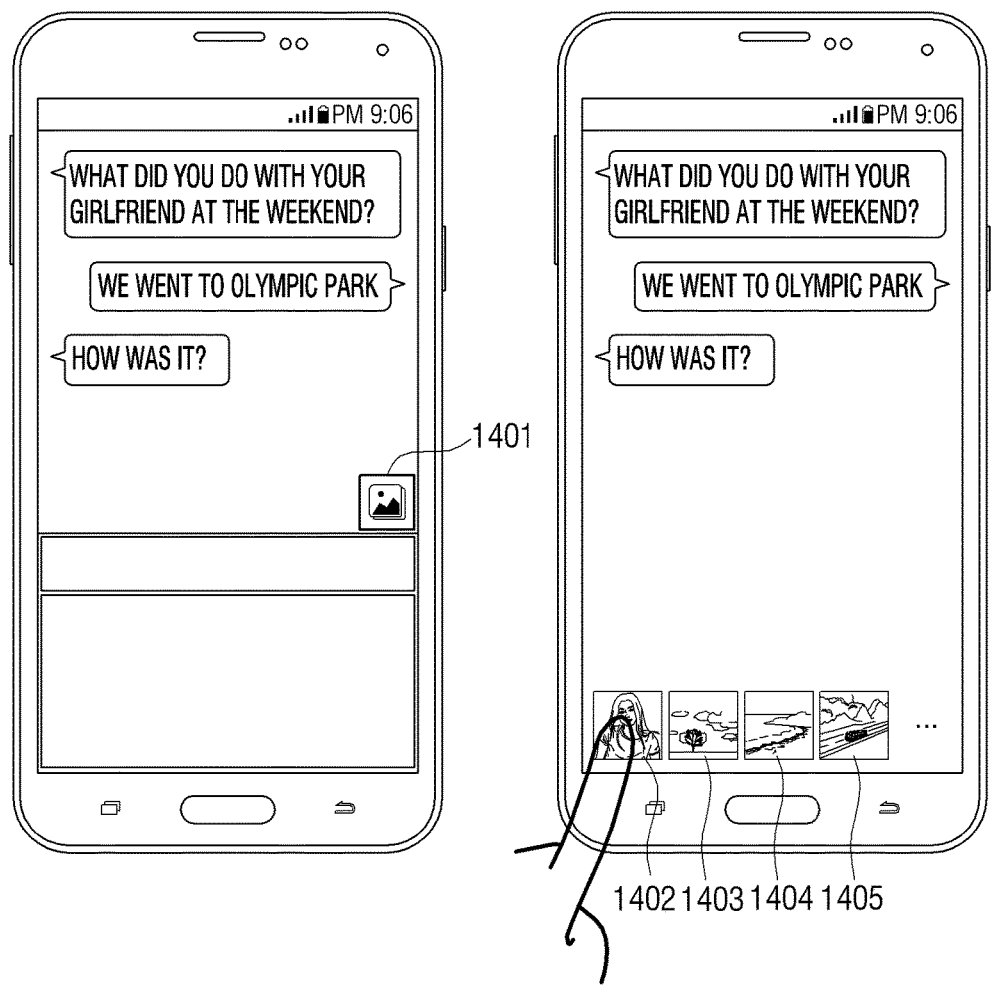

According to an embodiment, referring to (a) of FIG. 14A, in response to receiving a message from a device of a sender, the processor 170 may control the display 110 to display a message between the sender and user on a screen. For example,
the processor 170 may control the display 110 to display messages "what did you with your girlfriend over the weekend?" received from the device of the sender, "we went to the Olympic park" input by the user as a response, and "how was it?" received from the device of the sender as a response. The processor 170 may control the display 110 to display a user interface 1401 for providing recommendation information to be included in an answer message.

According to a user input that selects the user interface 1401, as shown in (b) of FIG. 14A, the processor 170 may control the display 110 to display representative images 1402,1403,1404 and 1405 as recommendation information.

The processor 170 may obtain at least one keyword from the messages between the sender and user and determine images to be recommended based on the obtained keyword. For example, as shown in (b) of FIG. 14A, the processor 170 may obtain keywords "girlfriend" and "weekend" from the message "what did you do with your girlfriend over the weekend?' from the sender and obtain a keyword "Olympic park" from the message "we went to the Olympic park" of the user. The processor 170 may generate a search keyword to retrieve an image to be recommended based on the combination of the obtained keywords. For example, the processor 170 may define images retrieved by using the keywords "girlfriend", "weekend" and "Olympic park" as a first image group. The processor 170 may define images retrieved based on the keywords "girlfriend" and "Olympic park" as a second image group. The processor 170 may define images retrieved based on the keywords "girlfriend" and "weekend" as a third image group. As shown in (b) of FIG. 12A, the processor 170 may control the display 110 to display the representative images 1402 to 1405 of respective image groups. The user input unit 145 may receive a user input that selects the representative image 1402 among the representative images 1402 to 1405.

According to a user input, the processor 170 may obtain the representative image 1402 and other images included in the group of the representative image 1402 and control the display 110 to display the obtained images as in (d) of FIG. 14B. As shown in (c) of FIG. 14B, the processor 170 may control the display 110 to display a visual effect in which images included in the group of the representative image 1402 are retrieved or collected around the representative image 1402.

As shown in (d) of FIG. 14B, the processor 170 may control the display 110 to display the retrieved images to be arranged (according to the order of relevance with keywords, the order of image generation time, the order of image size) in one area 1411 of the screen (e.g. a top screen). The processor 170 may control the display 110 to display the images which are not included in the representative image group to be arranged (e.g. the order of image generation time, the order of image size, etc.) in another area (e.g. a bottom screen) 1412.

Figure 14C:
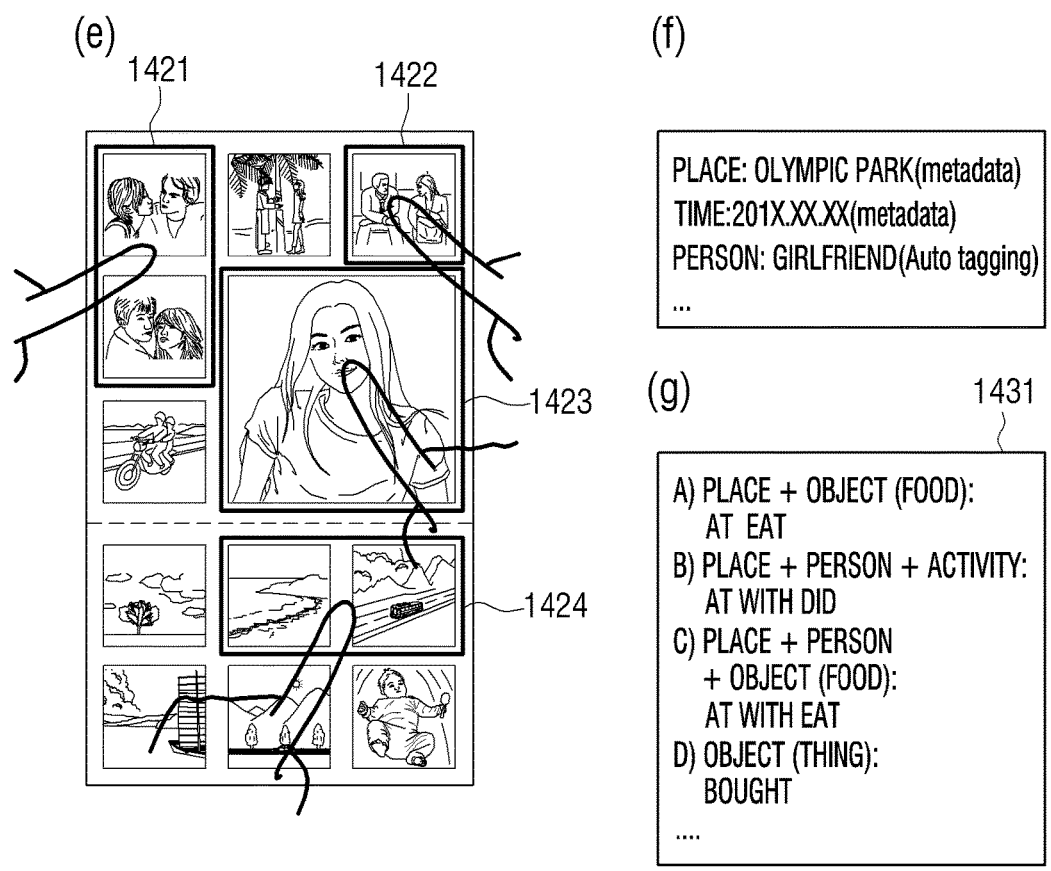

As shown in (e) of FIG. 14C, the user input unit 145 may receive a user input that selects at least one of first, second, third and fourth images 1421,1422,1423 and 1424 to be used for an answer message among the retrieved images. In response to the user input, the processor 170 may control the display 110 to display the first to fourth images 1421 to 1424 selected by the user so that the first to fourth images 1421 to 1424 selected by the user are highlighted to be distinguished from the other images.

As shown in (f) of FIG. 14C, the processor 170 may obtain keywords from the first to fourth images 1421 to 1424 selected by the user. For example, the processor 170 may generate keywords by analyzing the first to fourth images 1421 to 1424 selected by the user. The processor 170 may generate keywords by analyzing the first to fourth images 1421 to 1424 selected by the user using a Natural Language Generation (NLG) function.

The processor 170 may obtain keywords from metadata, tag, user log of the first to fourth images 1421 to 1424 selected by the user. For example, the processor 170 may obtain a place keyword "Olympic park" from the first image 1421, a date keyword "Aug. 10, 2015" from the second image 1422, and a person keyword "girlfriend' from the third image 1423.

As shown in (g) of FIG. 14C, the processor 170 may determine a template available for an answer message from a plurality of templates based on the obtained keywords. For example, when attributes of the keywords corresponding to the selected image relate to place and person, the processor 170 may determine a template 1431 including place and person as a template for generating an answer message.

Figure 14D:
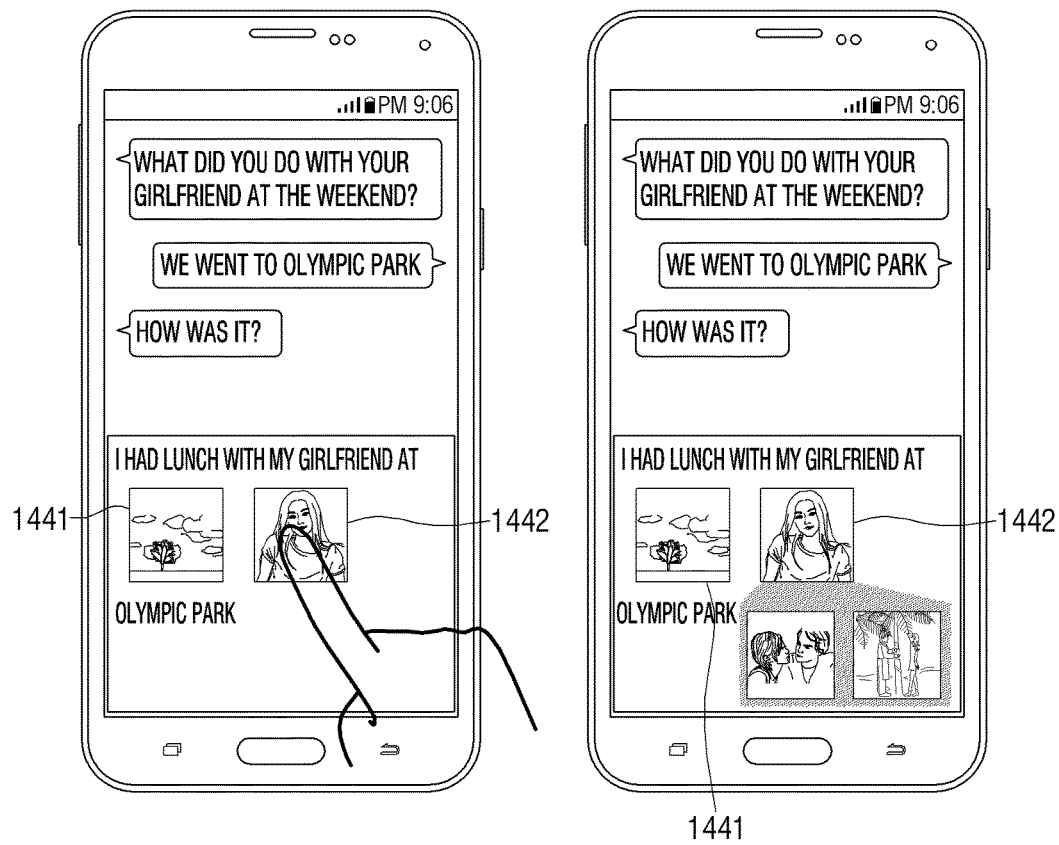

As shown in (h) of FIG. 14D, the processor 170 may control the display 110 to display an answer message including a text-based answer message containing a keyword according to the determined template and images 1441 and 1442 related to the generated keyword. The images 1441 and 1442 related to the obtained keyword may be images selected by the user in (e) of FIG. 14C, or representative images of the images retrieved again related to the keyword obtained in (f) of FIG. 14C.

As shown in (h) of FIG. 14D, when an answer message includes the images 1441 and 1442 of "Olympic park" and "girlfriend", the user input unit 145 may receive user a input that selects the image 1442 of "girlfriend" between the images 1441 and 1442.

According to a user input, as shown in (i) of FIG. 14D, the processor 170 may control the display 110 to display other images related to the image 1442 selected by the user. The other images may be images retrieved again by using the keyword related to the image 1442 selected by the user, and when the image 1442 selected by the user is a representative image, may be images included in the group of the representative image. The other images related to the image 1442 selected by the user may be images by newly retrieved using the newly obtained keyword from the image 1442 selected by the user. Such images may be provided in the form of thumbnail, image list, or album to slide over time. Alternatively, only the specific number of images may be displayed, and the other images may be sequentially displayed according to a user input of selecting left/right buttons or up/down buttons.

Figure 15A:
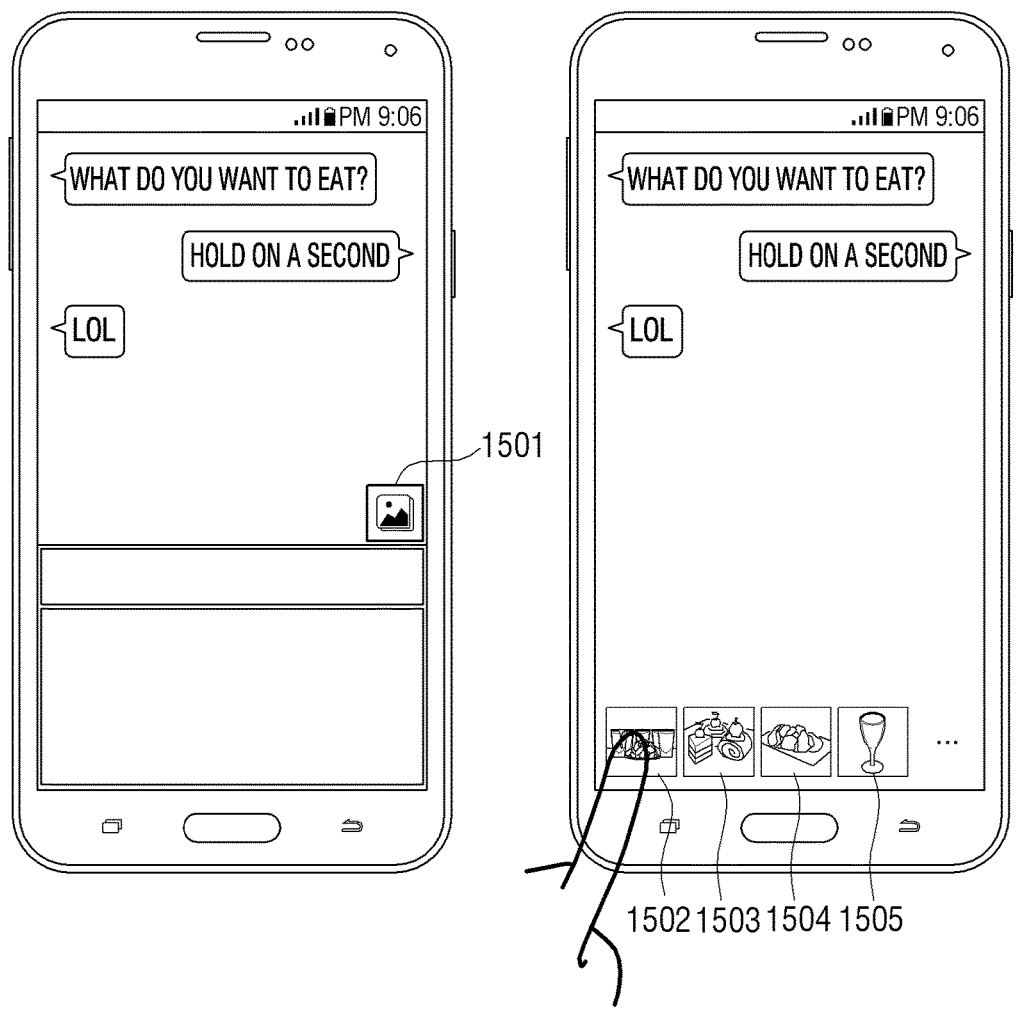
Figure 15B:
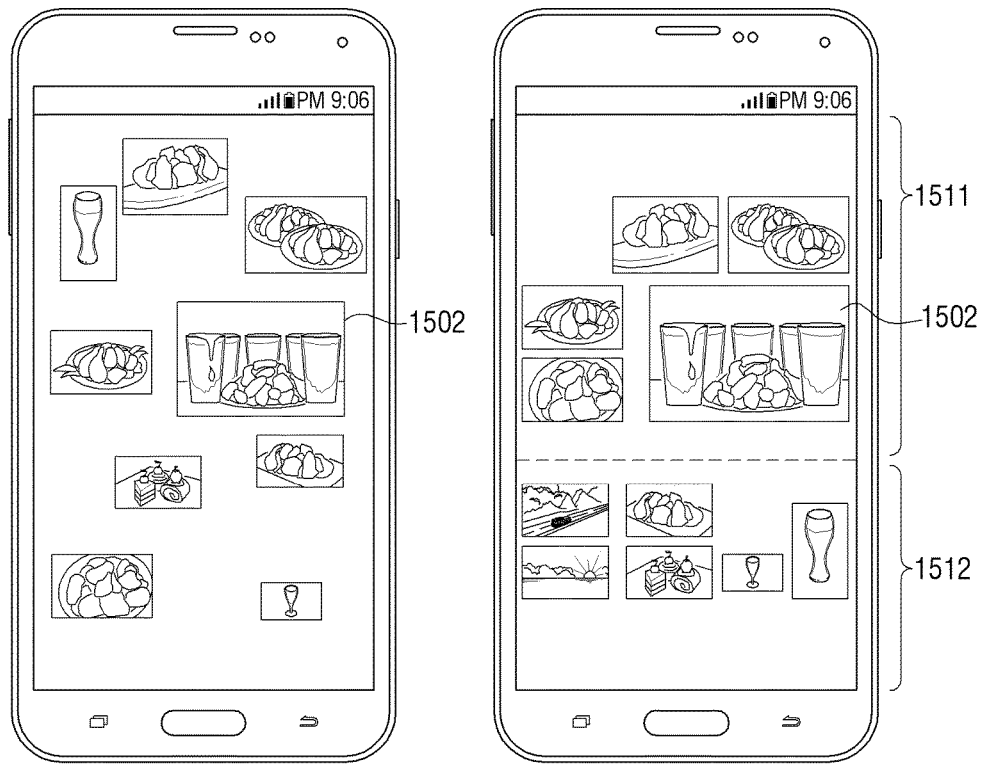

According to another embodiment, referring to (a) of FIG. 15A, in response to receiving a message from a device of a sender, the processor 170 may control the display 110 to display a message between the sender and the user on a screen. For example, the processor 170 may control the display 110 to display a message "what do you want to eat?" received from the device of the sender. The processor 170 may control the display 110 to display a user interface 1501 for selecting recommendation information to be included in an answer message input by the user.

According to a user input that selects the user interface 1501, as shown in (b) of FIG. 15A, the processor 170 may control the display 110 to display representative images 1501,1502,1503 and 1504 as recommendation information. The processor 170 may obtain at least one keyword from the messages between the sender and the user and determine images to be recommended based on the obtained keyword. For example, the processor 170 may obtain keywords "what", "eat" and "want to" from the message "what do you want to eat?" from the sender in (b) of FIG. 15A. The processor 170 may generate a search keyword for retrieving images to be recommended based on the combination of the obtained keywords. For example, the processor 170 may determine that the sender intends to ask about food and generate new keywords related to food based on dialog history between the sender and the user, search history of the user and images stored in the device 100. The combination of newly generated keywords may be, for example, "roll cake", "soju", "beef", "chicken", and "beer". The processor 170 may retrieve and group images related to the combination of keywords obtained from the images which are stored in the device 100 or a server linked to the device 100. As shown in (b) of FIG. 15A, the processor 170 may control the display 110 to display representative images 1502, 1503, 1504, and 1505 of respective image groups. The user input unit 145 may receive a user input for selecting the representative image 1502 from the plurality of representative images 1502 to 1505.

According to a user input, the processor 170 may obtain the representative image 1502 selected by the user and other images included in the group of the representative image 1502 selected by the user and control the display 110 to display the obtained images. Referring to (c) of FIG. 15B, the processor 170 may control the display 110 to display a visual effect where images included in the group of the representative image 1502 are retrieved or collected around the representative image 1502. As shown in (d) of FIG. 15B, the processor 170 may control the display 110 to display the retrieved images to be arranged and displayed in one area (e.g. a top screen) 1511 of the screen. In addition, the processor 170 may control the display 110 to display images which are not included in the group of the representative image to be arranged an displayed in another area (e.g. a bottom screen) 1512 of the screen.

Figure 15C:
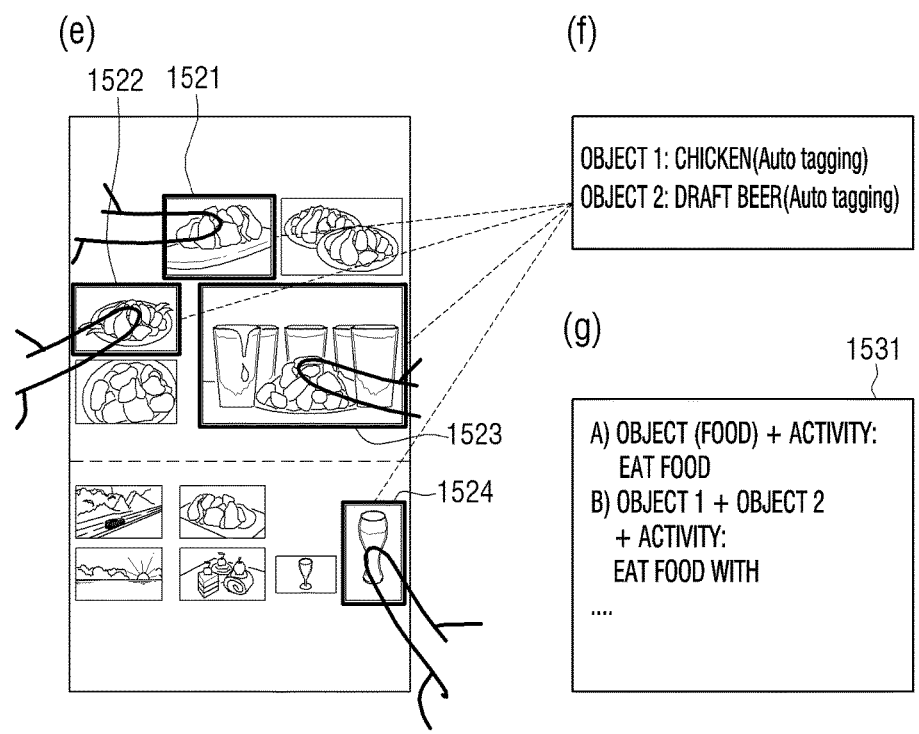

As shown in (e) of FIG. 15C, the user input unit 145 may receive a user input for selecting at least one of first, second, third and fourth images 1521, 1522, 1523 and 1524 to be used for an answer message among the retrieved images. In response to a user input, the processor 170 may control the display 110 to display the first to fourth images 1521 to 1524 selected by the user so that the first to fourth images 1521 to 1524 selected by the user are highlighted to be distinguished from the other images.

As shown in (f) of FIG. 15C, the processor 170 may obtain keywords from the first to fourth images 1521 to 1524 selected by the user. For example, the processor 170 may analyze the first to fourth images 1521 to 1524 selected by the user to generate keywords. The processor 170 may obtain keywords from metadata, tag, and user log of the first to fourth images 1521 to 1524 selected by the user. For example, the processor 170 may obtain a food keyword "chicken" from the first image 1521, the second image 1522 and the third image 1523 and obtain a keyword "draft beer" from the fourth image 1524.

As shown in (g) of FIG. 15C, the processor 170 may determine a template available for an answer message from a plurality of templates based on the obtained keyword. For example, when the attribute of keywords corresponding to the selected image is food, the processor 170 may determine a template 1531 including a plurality of food images as a template for generating an answer message.

Figure 15D:
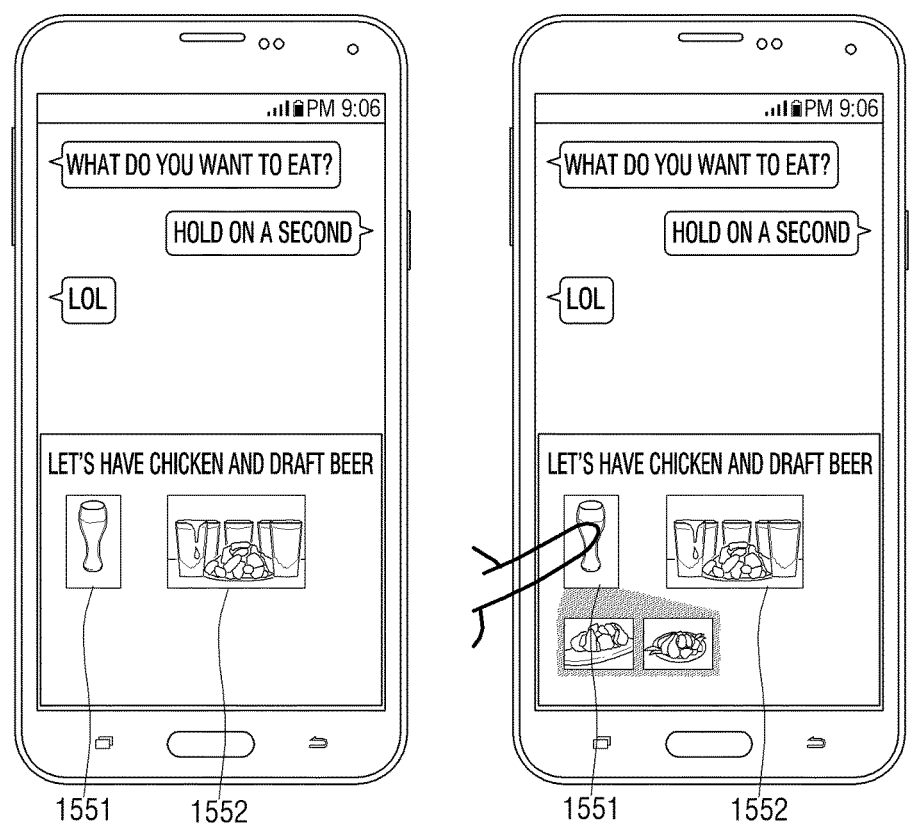

As shown in (h) of FIG. 15D, the processor 170 may control the display 110 to display a text-based answer message including a keyword according to the determined template and images 1551 and 1552 related to the generated keyword. The images 1551 and 1552 related to the obtained keyword may be the images selected by the user in (e) of FIG. 15C, or may be representative images retrieved again in relation to the obtained keyword in (f) of FIG. 15C.

As to (h) of FIG. 15D, when the answer message includes the images 1551 and 1552 of "chicken" and "draft beer", the user input unit 145 may receive a user input for selecting the image 1552 of "chicken" as one of the images.

According to a user input, as shown in (i) of FIG. 15D, the processor 170 may control the display 110 to display other images related to the image 1552 of "chicken" selected by the user. The other images may be images retrieved again using the keyword related to the image 1552 selected by the user or, when the image 1552 selected by the user is a representative image, the other images may be images included in the group of the representative image. The other images may be images newly retrieved by using the newly obtained keyword from the image 1552 selected by the user. The other images may be provided in the form of a thumbnail image, an image list, or an album to slide over time. Alternatively, only the certain number of images may be displayed, and the other images may be sequentially displayed according to a user input that selects left/right buttons or up/down buttons.

Figure 16A:
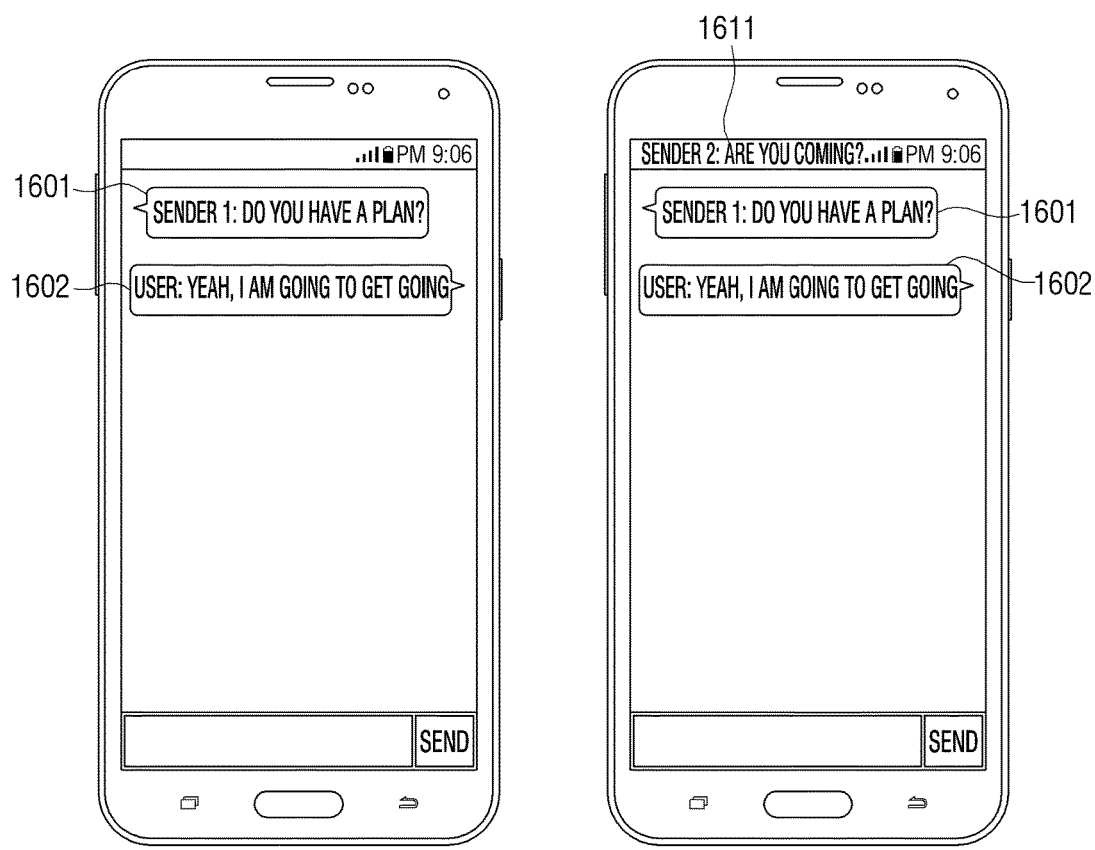
FIGS. 16A, 16B, and 16C are views illustrating screens for providing an answer message to a plurality of devices according to another embodiment of the present disclosure.
Figure 16B:
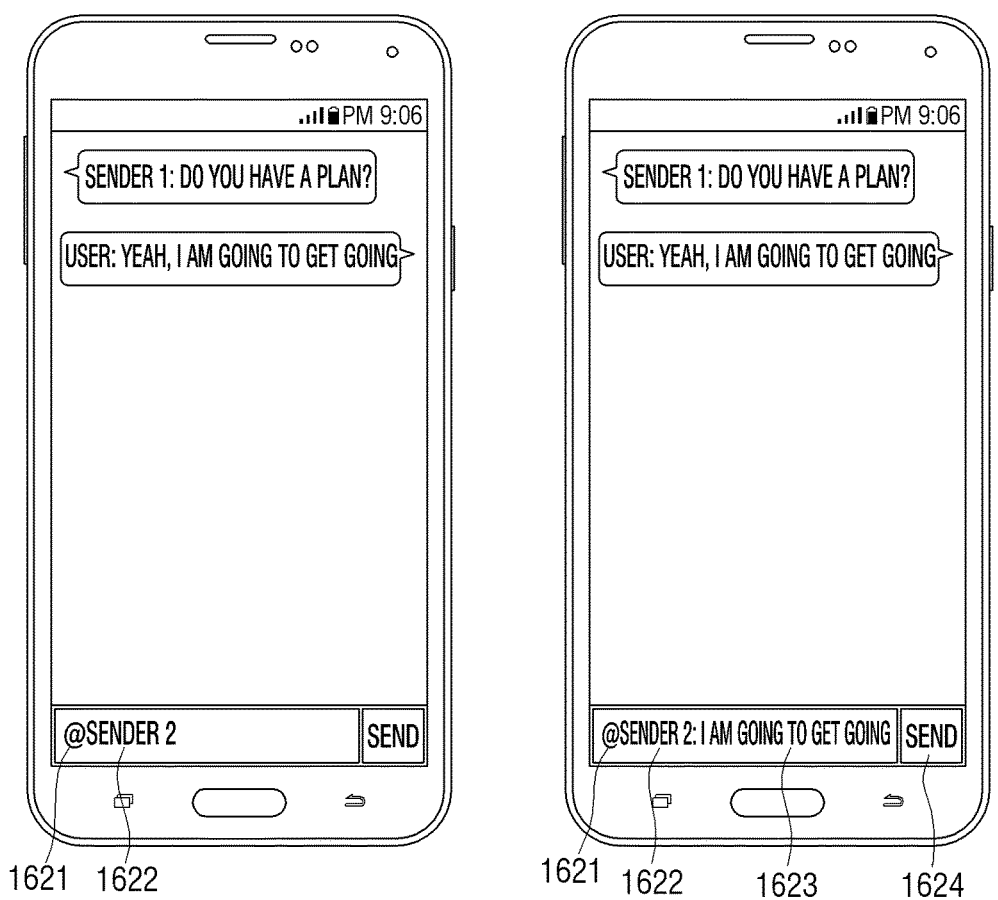
Figure 16C:
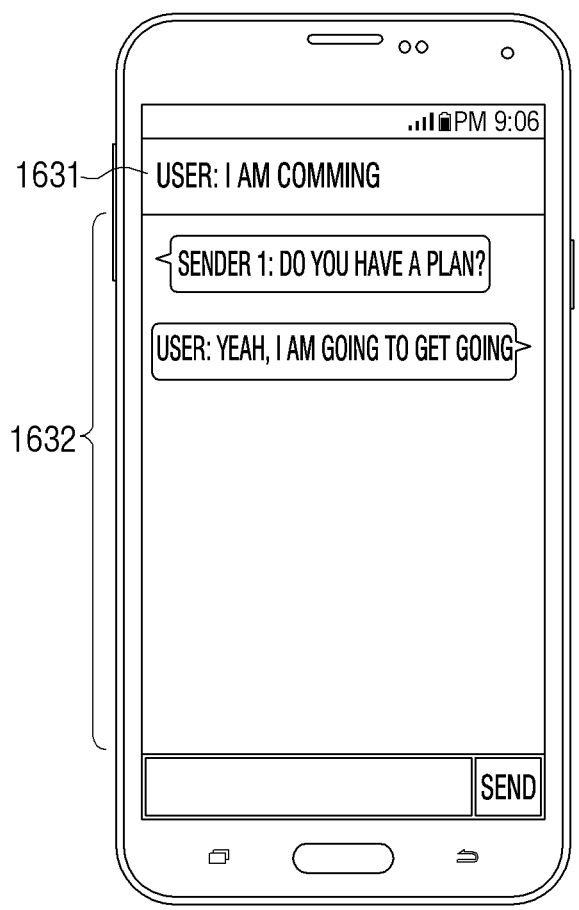

FIGS. 16A, 16B, and 16C are views illustrating screens for providing an answer message to a plurality of devices according to another embodiment of the present disclosure.

When a user receives and transmits a message from and to a plurality of senders through a plurality of dialog windows, it is inconvenient for user to frequently come in and out of the dialog window. Accordingly, a technique for receiving and transmitting a message from and to a second user without changing a dialog window while receiving and transmitting a message from and to a first sender in high demand to reduce inconvenience of the user.

Referring to (a) of FIG. 16A, the processor 170 may control the display 110 to display a first question message 1601 received from a first device of a first sender and a first answer message 1602 of a user on the dialog window.

As shown in (b) of FIG. 16A, in response to receiving a second question message 1611 from a second device of a second sender, the processor 170 may control the display 110 to display at least part of the second question message 1611 on a screen.

The user input unit 145 may receive a user input that inputs tag information 1621 through an input filed of the dialog window. In response to a user input that inputs the tag information 1621, as shown in (c) of FIG. 16B, the processor 170 may control the display 110 to display the tag information 1621 on the input field of the dialog window and automatically display identification information 1622 of the second device. The identification information 1622 of the second device may be obtained from additional information or header information which is transmitted along with the second question message 1611. The examples of the identification information 1622 of the second device may include ID, phone number, or nickname of the second sender.

In response to the tag information 1621 and the identification information 1622 of the second device being displayed, the user input unit 145 may receive a user input that inputs a second answer message 1623 for the second question message 1601. According to a user input that inputs the second answer message 1623, as shown in (d) of FIG. 16B, the processor 170 may control the display 110 to display the tag information 1621, the identification information 1622 of the second device and the second answer message 1623 on the input field of the dialog window.

Referring to (b) of FIG. 16A, the user input unit 145 may directly receive the tag information 1621, the identification information 1622 of the second device and the second question message 1623 through the input field of the dialog window. As shown in (d) of FIG. 16B, the processor 170 may control the display 110 to display the tag information 1621, the identification information 1622 of the second device and the second answer message 1623 on the input field of the dialog window.

According to a user input that selects a send button 1624, the processor 170 may control the communicator 130 so that the second question message 1623 may be transmitted to the second device. As shown in (e) of FIG. 16C, the processor 170 may control the display 110 to display the second answer message 1623 transmitted to the second device on the dialog window. For example, the processor 170 may control the display 110 to make an area of the dialog window to be divided into areas 1631 and 1632 by colors or lines, an answer message transmitted to the second device may be displayed on the area 16331 and an answer message transmitted to the first device may be displayed on the area 1632. According to another embodiment, the processor 170 may control the display 110 to display the answer message transmitted to the second device at a state bar of the screen or at an outside of the dialog window.

Figure 17:
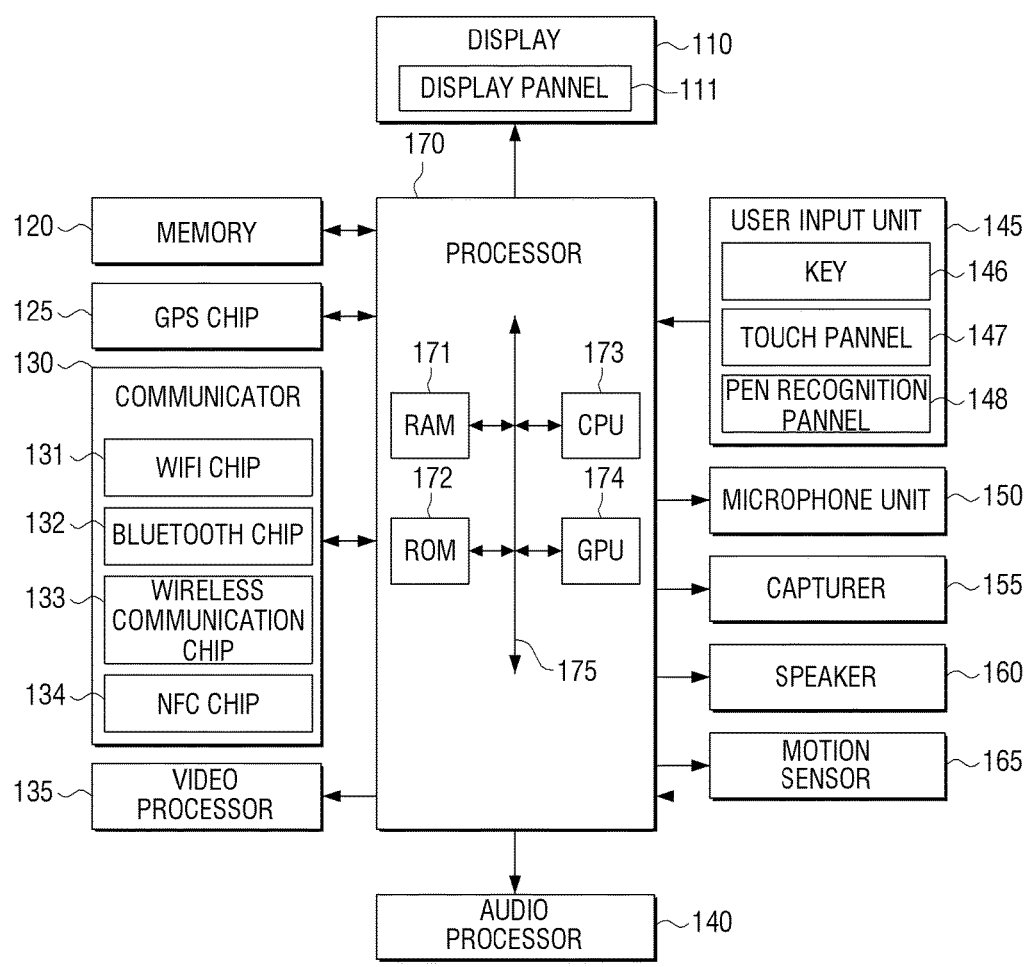
FIG. 17 is a block diagram illustrating configuration of a device according to another embodiment of the present disclosure.

FIG. 17 is a block diagram illustrating configuration of a device according to another embodiment of the present disclosure.

As shown in FIG. 17, examples of the device 100 may include a mobile phone, a tablet PC, a PDA, an MP3 player, a kiosk, an electronic frame, a navigation device, a digital TV, a smart watch, a wrist watch, and a wearable device such as a smart glass, a Head-Mounted Display (HMD), etc.

Referring to FIG. 17, the device 100 may include at least one of a display 110, a processor 170, a memory 120, a GPS chip 125, a communicator 130, a video processor 135, an audio processor 140, a user input unit 145, a microphone unit 150, a capturer 155, a speaker 160 and a motion detector 165.

The display 110 may include a display panel 111 and a controller (not shown) for controlling the display panel 111. The display panel 111 may be embodied with various types of displays such as a Liquid Crystal Display (LCD), an Organic Light Emitting Diodes (OLED) display, an Active-Matrix Organic Light-Emitting Diode (AM-OLED), a Plasma Display Panel, etc. The display panel 111 may be flexible, transparent or wearable. The display 110 may be connected to a touch panel 147 of the user input unit 145 and provided as a touch screen (not shown). For example, the touch screen (not shown) may include a unitary module in which the display panel 111 and the touch panel 147 are stacked.

The memory 120 may include at least one of an internal memory (not shown) and an external memory (not shown).

The internal memory may include at least one of a volatile memory (e.g. a Dynamic RAM) (DRAM), a Static RAM (SRAM), a Synchronous Dynamic RAM (SDRAM)), a non-volatile memory (e.g. One Time Programmable ROM (OTPROM), Programmable ROM (PROM), Erasable and Programmable ROM (EPROM), Electrically Erasable and Programmable ROM (EEPROM), Mask ROM, Flash ROM, etc.), a Hard Disk Drive (HDD), or a Solid State Drive (SSD). According to an embodiment, the processor 170 may load and process instructions or data received from at least one of the non-volatile memory or other components into the volatile memory. In addition, the processor 170 may retain data received or generated from other components in the non-volatile memory.

The external memory may include at least one of Compact Flash (CF), Secure Digital (SD), Micro Secure Digital (Micro-SD), a Mini Secure Digital (Mini-SD), extreme Digital (xD), and Memory Stick.

The memory 120 may store various programs and data for operations of the device 100.

The processor 170 may control the display 110 to display graphics representing a plurality of piece of recommendation information which are includable in an answer message for the received message and relations between the plurality of piece of recommendation information on the display 110. The processor 170 may display part of the contents stored in the memory 120 on the display 110. The processor 170 may perform a control operation corresponding to a user input in response to a user input being received in one area.

The processor 170 may include at least one of a RAM 171, a ROM 172, a CPU 173, a Graphic Processing Unit (GPU) 174 and a bus 175. The RAM 171, the ROM 172, the CPU 173, and the GPU 174 may be interconnected via the bus 175.

The CPU 173 may access the memory 120 and perform booting by using an operation system (O/S) stored in the memory 120. The CPU 173 may perform various operations by using various programs, contents, data stored in the memory 120.

The ROM 172 may store a command set for booting a system. For example, when a turn-on command is input and power is supplied to the device 100, the CPU 173 may copy the operation system stored in the memory 120 to the RAM 171 according to the command stored the ROM 172 and perform booting of the system by executing the operation system. When the booting is completed, the CPU 173 may copy various programs stored in the memory 120 to the RAM 171, execute the program copied to the RAM 171 and perform various operations. When the booting of the device 100 is completed, the GPU 174 may display a UI screen on an area of the display 110. Specifically, the GPU 174 may generate a screen displaying an electronic document including various objects such as contents, icons, menus, and the like. The GPU 174 may calculate attribute values such as coordinate values, shapes, sizes, and colors of respective objects according to the layout of the screen. The GPU 174 may then generate the screens of various layouts including the objects based on the calculated attribute values. The screens generated by the GPU 174 may be provided to the display 110 and displayed in respective areas of the display 110.

The GPS chip 125 may receive a GPS signal from a Global Positioning System (GPS) satellite and calculate the current position of the device 100. The processor 170 may calculate a user location using the GPS chip 125 when a navigation program is used or otherwise the current location of the user is required.

The communicator 130 may perform communication with various types of external devices according to various types of communication methods. The communicator 130 may include at least one of a Wi-Fi chip 131, a Bluetooth chip 132, a wireless communication chip 133, and an NFC chip 134. The processor 170 may communicate with various external devices using the communicator 130. The communicator 130 may receive a question message from another device or may transmit an answer message for the received question message to another device.

The Wi-Fi chip 131 and the Bluetooth chip 132 may perform communication using a WiFi method and a Bluetooth method, respectively. When the WiFi chip 131 or the Bluetooth chip 132 is used, various connection information such as an SSID and a session key may be transmitted and received first, communication connection may be established, and communication information may be transmitted and received. The wireless communication chip 133 may refer to a chip that performs communication according to various communication standards such as IEEE, ZigBee, 3rd Generation (3G), 3rd Generation Partnership Project (3GPP), Long Term Evolution (LTE), and the like. The NFC chip 134 may refer to a chip operating in an Near Field Communication (NFC) mode using 13.56 MHz band among various RF-ID frequency bands such as 135 kHz, 13.56 MHz, 433 MHz, 860 to 960 MHz and 2.45 GHz.

The video processor 135 may process video data include in contents received through the communicator 130 or contents stored in the memory 120. The video processor 135 may perform various image processing such as decoding, scaling, noise filtering, frame rate conversion, resolution conversion, etc. of the video data.

The audio processor 140 may process audio data included in the contents received through the communicator 130 or the contents stored in the memory 120. The audio processor 140 may perform various operations such as decoding, amplification, or noise filtering of the audio data.

The processor 170 may reply contents by deriving the video processor 135 and the audio processor 140 in response to a replay program for multimedia contents being executed. The speaker 160 may output audio data generated by the audio processor 140.

The user input unit 145 may receive various commands from a user. The user input unit 145 may include at least one of a key 146, a touch panel 147 and a pen recognition panel 148.

The key 146 may include various types of keys such as mechanical buttons, whirl, etc. formed in various areas such as the front surface, the side surface, or the rear surface of the device 100.

The touch panel 147 may sense a touch input of the user and output a touch event value corresponding to the sensed touch signal. When a touch screen (not shown) is embodied with the touch panel 147 and the display panel 111, the touch screen may be embodied as various types of touch sensors such as a capacitive touch sensor, a resistive touch sensor, a piezoelectric touch sensor, etc. The capacitive touch sensor may calculate touch coordinates by sensing micro electricity generated when part of the user's body touches the surface of the touch screen using a dielectric coated on the surface of the touch screen. The resistive touch sensor may include two electrode substrates provided in the touch screen and calculate touch coordinates by sensing that the upper and lower substrates at the touched point contact to each other and a current flows when the user touches the screen. A touch event may occur on a touch screen when the touch screen is touched by a finger, but may also be generated by an object formed of a conductive material that applies a variation in capacitance.

The pen recognition panel 148 may detect a proximity input or a touch input of a touch pen (e.g. a stylus pen, a digitizer pen, etc.) when the user uses the pen and output the detected pen proximity event or the detected pen touch event. The pen recognition panel 148 may be implemented in an EMR manner and may detect a touch input or a proximity input according to change of the intensity of an electromagnetic field due to the approach or touch of the pen. More specifically, the pen recognition panel 148 may include an electromagnetic induction coil sensor (not shown) having a grid structure and an electronic signal processor (not shown) for sequentially providing AC signals having a predetermined frequency to respective loop coils of the electromagnetic induction coil sensor. In response to a pen containing a resonant circuit in the vicinity of the loop coil of the pen recognition panel 148, a magnetic field transmitted from the loop coil may generate a current to the resonant circuit of the pen based on mutual electromagnetic induction. Based on this current, an induction magnetic field may be generated from the coil that forms the resonance circuit in the pen, and the pen recognition panel 148 may detect the induction magnetic field from the loop coil in a signal reception state, so that the proximity position or the touch position of the pen may be sensed. The pen recognition panel 148 may be provided under the display panel 111 in a predetermined area, for example, an area that covers the display area of the display panel 111.

The microphone unit 150 may receive user voice or other sounds and convert the user voice or other sounds into audio data. The processor 170 may use the user voice input through the microphone unit 150 in a call operation or convert the user voice into audio data and store the audio data in the memory 120.

The capturer 155 may capture a still image or a video according to a control of the user. The capturer 155 may be embodied with a plurality of cameras including a front camera and a rear camera.

When the capturer 155 and the microphone unit 150 are provided, the processor 170 may perform a control operation according to the user voice input through the microphone unit 150 and user motion recognized by the capturer 155. For example, the device 100 may operate in a motion control mode or a voice control mode. When the device 100 operates in the motion control mode, the processor 170 may activate the capturer 155 and capture a user, trace the change of user motion and perform a control operation accordingly. When the device 100 operates in the voice control mode, the processor 170 may analyze the user voice input through the microphone unit 150 and operate in the voice recognition mode for performing a control operation according to the analyzed user voice.

The motion sensor 165 may sense motion of the main body of the device 100. The device 100 may be rotated or tilted in various directions. The motion sensor 165 may sense motion characteristics such as direction and angle of rotation, slope, etc. using at least one of various sensors such as a geomagnetism sensor, a gyro sensor, an acceleration sensor, and the like.

Although not shown in FIG. 17, according to an embodiment, a USB port to which a USB connector is connected to the device 100, various external input ports for connecting to various external terminals such as headset, mouse, LAN, etc., a DMB chip for receiving and processing a Digital Multimedia Broadcasting (DMB) signal, and various sensors may be further provided.

Figure 18:
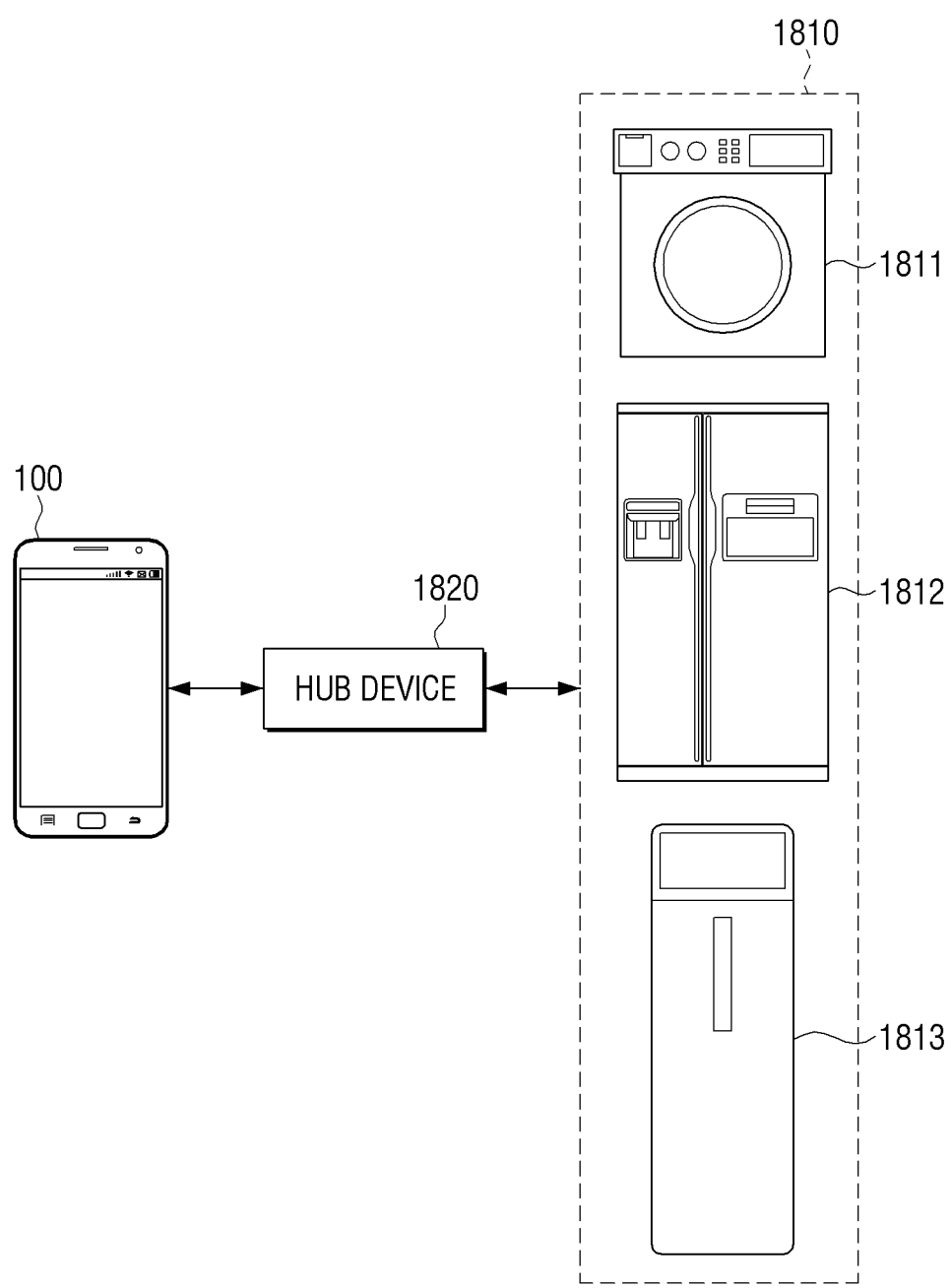
FIG. 18 is a view illustrating a system for controlling an external device by using recommendation information according to another embodiment of the present disclosure.

FIG. 18 is a view illustrating a system for controlling an external device by using recommendation information according to another embodiment of the present disclosure.

Referring to FIG. 18, a system 1800 may include a device 100, an external device 1810 and a hub device 1820.

The external device 1810 may be, for example, an IoT device. The IoT device may be various kinds of home appliances. The home appliances may include at least one of a washing machine 1811, a refrigerator 1812, an air conditioner 1813, a smart TV, a digital video disk (DVD) player, an audio device, a vacuum cleaner, an oven, a microwave oven, an air conditioner, a set-top box, a home automation control panel, a security control panel, a TV box (e.g. HomeSync™ of Samsung, Apple TV™, or Google TV™), a game console (e.g. Xbox™ and PlayStation™), an electronic dictionary, an electronic key, a camcorder, or an electronic frame. In addition, the IoT device may be a sensor for detecting a state in the home. The sensor may be embodied as various sensors such as a motion sensor, a temperature sensor, a humidity sensor, an illuminance sensor, and the like.

The hub device 1820 may be an additional device such as a home gateway, a home server, etc. and one of the IoT devices described above may operate as the hub device 1820.

When a user inputs a message for controlling the external device 1810 on a message screen provided by the device 100, the device 100 may obtain a plurality of piece of recommendation information corresponding to the input message and relations between the plurality of pieces of recommendation information.

The tree generation module 235 may generate relation information indicating the plurality of pieces of recommendation information and the relations between the plurality of pieces of recommendation information. The tree generation module 235 may be included in the device 100, the external device 1810, or the hub device 1820. The recommendation information and the relation information may be selected and generated based on the use history of the external device 1810 and the preset information.

According to an embodiment, when the tree generation module 235 is provided in the hub device 1820, the hub device 1820 may receive the message input by the user from the device 100. The hub device 1820 that receives the message may analyze the input message, select recommendation information having a higher weight value in connection with the external device 1810 and generate relation information representing the relations between the recommendation information. The hub device 1820 may transmit the generated recommendation information and relation information to the device 100.

According to another embodiment, when the tree generation module 325 is included in the external device 1810, the external device 1810 may receive the message input by the user via the hub device 1820 or directly receive the message. The external device 1810 may analyze the received message and generate recommendation information and the relation information between the recommendation information. The external device 1810 may transmit the generated recommendation information and relation information to the device 100 via the hub device 1820 or directly transmit the information to the device 100.

In response to the device 100 obtaining relation information indicating the plurality of pieces of recommendation information and the relations between the plurality of pieced of recommendation information, the device 100 may display graphics representing the plurality of pieces of recommendation information and the relations between the plurality of pieces of recommendation information.

A user may select one of the plurality of piece of recommendation information based on the graphics representing the plurality of pieces of recommendation information and the relations between the plurality of pieces of recommendation information.

According to a user input, the device 100 may transmit a control command related to the selected recommendation information to the external device 1810 via the hub device 1820 or directly transmit the control command to the external device 1810.

The external device 1810 may perform an operation according to the received control command.

Figure 19:
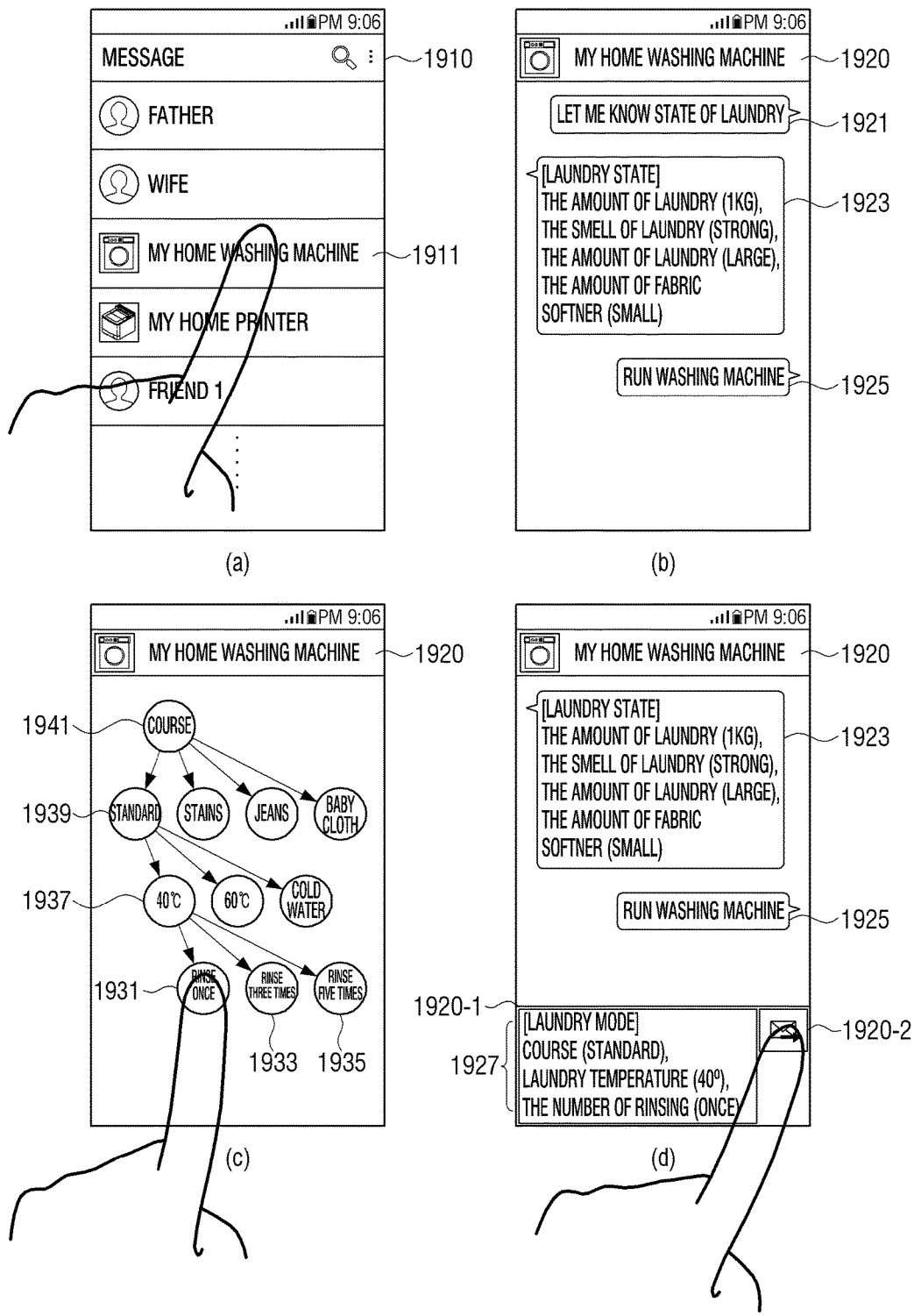
FIGS. 19 and 20 are in-use views provided to explain a method for controlling an external device by using recommendation information according to an embodiment of the present disclosure.

FIG. 19 is an in-use view provided to explain a method for controlling an external device by using recommendation information according to an embodiment of the present disclosure.

Referring to (a) of FIG. 19, a user may select identification information 1911 of the external device 1810 to which a message is transmitted from a contact information list 1910 for the shake of control, and the identification information of the external device 1810 may be, for example, identification information of a washing machine 1811.

In response to the identification information of the external device 1810 being selected, as shown in (b) of FIG. 19, the device 100 may provide a message screen 1920 for displaying a message related to the external device 1810 or receiving an input related to the external device 1810.

In response to the message screen 1920 being provided, the user may input a message 1920 for asking about a state of the external device 1810. For example, the user may input a message 1921 "please let me know the state of laundry".

The device 100 may directly transmit a command asking a state of the external device 1810 to the external device 1810, or transmit the command to the external device 1810 via the hub device 1820 as a result of analyzing the message 1921.

In response to the received command, the external device 1810 may directly transmit state information to the device 100, or transmit the information to the device 100 via the hub device 1820.

The state information of the external device 1810 may be, for example, at least one of an operation state of the external device 1810, a state of an object to be processed by the external device 1810, and a state of the periphery of the external device 1810. For example, when the external device 1810 is the washing machine 1811, the state information of the external device 1810 may be at least one of the amount of laundry, the smell of the laundry, the amount of detergent and fabric softener put into the external device 1810. The above information may be sensed using a camera, an odor sensor, a pressure sensor, etc. provided in the washing machine 1811.

When the state information of the external device 1810 is obtained in response to the message 1921 asking the state of the external device 1810, the device 100 may convert the state information of the external device 1810 into a message 1923 and display the message 1923 on the message screen 1920. For example, the device 100 may display the message 1923 of "the amount of laundry (1 kg), the laundry odor (strong), the amount of detergent (large) and the amount of fabric softener (small)" as the state of the laundry on the screen.

In response to the message 1923 related to the state information of the external device 1810 being displayed on the message screen 1920, a user may input a message 1925 for controlling the external device 1810 based on the state information of the external device 1810. For example, the user may input the message 1925 "please start the washing machine".

As shown in (c) of FIG. 19, the device 100 may analyze the message 1925 and display graphics representing the plurality of pieces of recommendation information and relations between the plurality of pieces of recommendation information. The graphic for connecting the plurality of pieces of recommendation information may have a tree structure, a node structure, or hierarchy structure.

When the external device 1810 is a washing machine, the graphics representing the plurality of pieces of recommendation information and the relations between the plurality of pieces of recommendation information may indicate the type of laundry course, the type of washing temperature, the number of times of rinsing and the relations therebetween.

When the user selects a recommendation information 1931 "rinse once" from a plurality of pieces of recommendation information 1931, 1933 and 1935 at the lowest nodes, the device 100 may generate a message "the course (standard), the washing temperature (40 degrees), the number of rinsing times (once)" as a message including the recommendation information 1931 selected by the user and the recommendation information at the upper nodes 1937, 1939 and 1941 related to the recommendation information 1931 selected by the user.

As shown in (d) of FIG. 19, the device 100 may display the message 1927 on a message input window 1920-1.

According to a user input for selecting a send button 1920-2, the device 100 may transmit the message 1927 displayed on the message input window 1920-1 to the external device 1810 via the hub device 1820 or directly transmit the message 1927 to the external device 1810. Transmitting the message 1927 may comprise converting the message 1927 into a control command interpreted by the external device 1810 and transmitting the control command.

As another example, when a user selects the recommendation information 1931 at the lowest node, the device 100 may transmit the message 1927 including the recommendation information at the upper nodes 1937, 1939 and 1941 related to the recommendation information 1931 at the lowest node to the external device 1810 without displaying on the message input window 1920-1. As a result of transmission, the message transmitted to the external device 1810 may be displayed on the message screen 1920.

Figure 20:
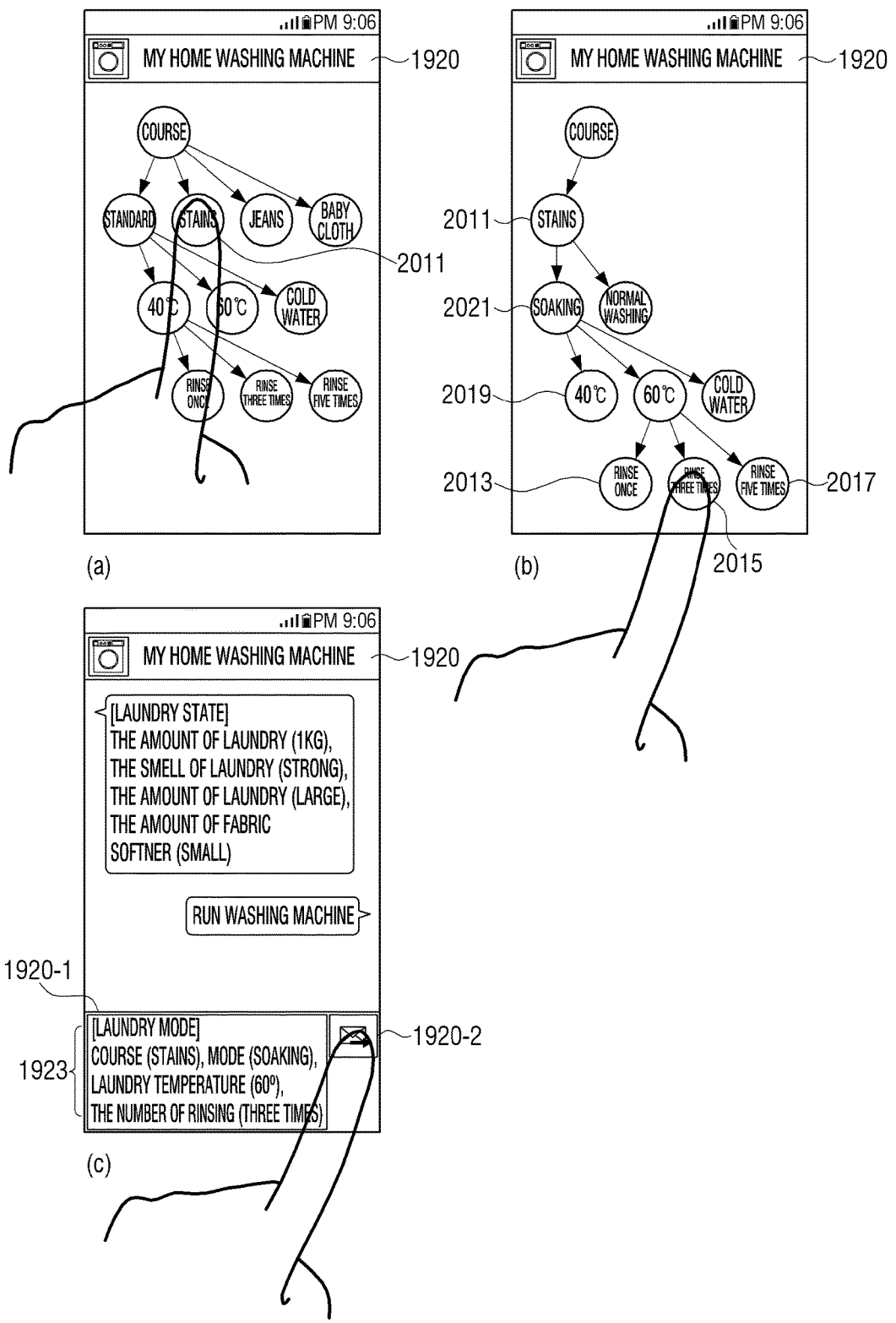

FIG. 20 is an in-use view provided to explain a method for controlling an external device by using recommendation information according to an embodiment of the present disclosure As shown in (a) of FIG. 20, graphics representing a plurality of pieces of recommendation information and relations between the plurality of pieces of recommendation information may be displayed. The example of (a) of FIG. 20 may be the same as an example of (c) of FIG. 19B.

In this case, a user wishes to change the recommendation information of one node among the plurality of pieces of recommendation information and select a recommendation information 2011 at a middle node that a user wants to change, among the plurality of pieces of recommendation information.

In response to the recommendation information 2011 at the intermediate node being selected, as shown in (b) of FIG. 20, the device 100 may display graphics representing the plurality of pieces of recommendation information and the relations between the plurality of pieces of recommendation information on the basis of the middle node.

When the user selects a recommendation information 2015 "rinse three times" as one of the plurality of pieces of recommendation information 2013, 2015 and 2017 at the lowest node, the device 100 may generate a message "the course (stains), the mode (soaking), the washing temperature (60 degrees), the number of rinsing times (three times)" as a message including the selected recommendation information 2015 and recommendation information related to the selected recommendation information 2015 at the upper nodes 2019, 2021 and 2011. As shown in (c) of FIG. 20, the device 100 may display the message 1923 on the message input window 1920-1.

According to a user input for selecting a send button 1920-2, the device 100 may transmit the message 1923 displayed on the message input window 1920-1 to the external device 1810 via the hub device 1820 or directly transmit the message 1923 to the external device 1810.

Figure 21:
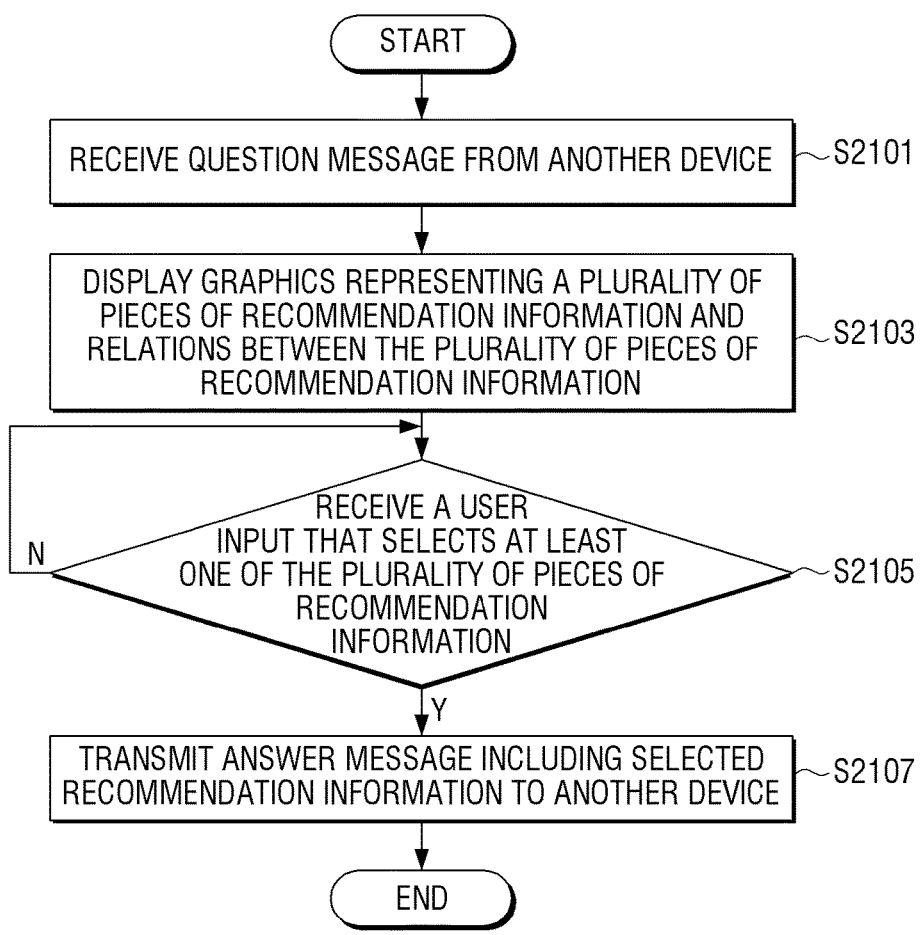

FIG. 21 is a flowchart provided to explain a method for providing recommendation information which is includable in an answer message by a device according to an embodiment of the present disclosure.

At step S2101, the device 100 may receive a question message from another device.

At step S2103, the device 100 may display graphic representing a plurality of pieces of recommendation information which are includable in an answer message for the received question message and relations between the plurality of pieces of recommendation information. The graphic representing the relations between the plurality of pieces of recommendation information may have a tree structure or a radial structure. The plurality of pieces of recommendation information may be connected to one another based on weighted values regarding attributes such as preference, importance, location, time or atmosphere of the plurality of pieces of recommendation information.

At step S2105, the device 100 may determine whether a user input that selects at least one of the plurality of pieces of recommendation information is received.

In response to the user input, at step S2107, the device 100 may generate and display an answer message including the selected recommendation information. According to the user input that selects a send button, the device 100 may transmit the answer message including the selected recommendation information to another device.

Figure 22:
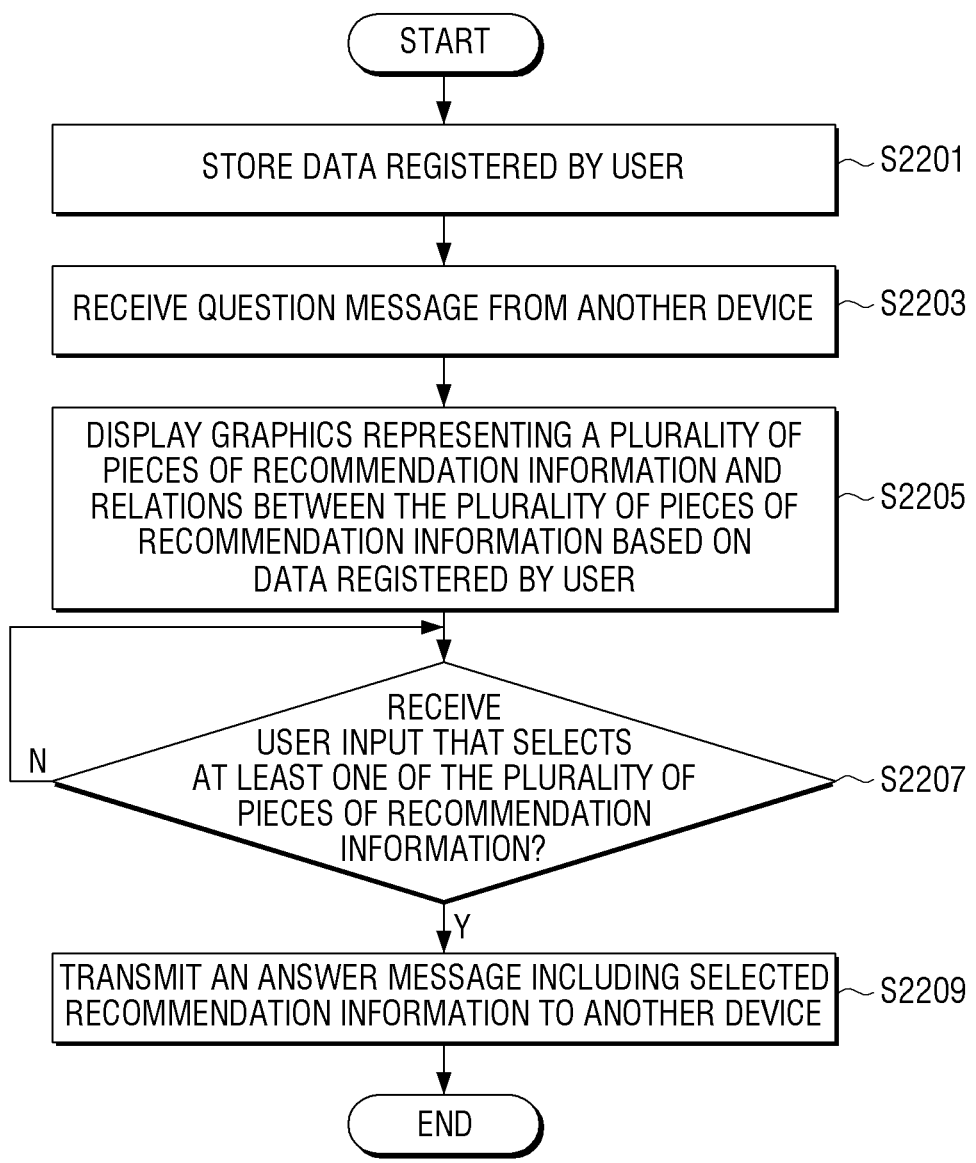

FIG. 22 is a flowchart provided to explain a method for providing recommendation information which is includable in an answer message by a device according to an embodiment of the present disclosure.

At step S2210, the device 100 may store data a user registered. The data that the user registered may be, for example, a content registered as data to be used for generating an answer message through a data registration menu by a user. The data registered by the user may be data retrieved, captured, or noted by the user.

At step S2203, the device 100 may receive a question message from another device.

At step S2205, the device 100 may display graphics representing a plurality of pieces of recommendation information included in an answer message and relations between the plurality of pieces of recommendation information based on the data registered by the user.

At step S2207, the device 100 may determine whether a user input that selects at least one of the plurality of pieces of recommendation information is received.

In response to the user input being received, at step S2209, the device 100 may generate and display an answer message including the selected recommendation information. According to the user input that selects a send button, the device 100 may transmit an answer message including the selected recommendation information to another device.

Figure 23:
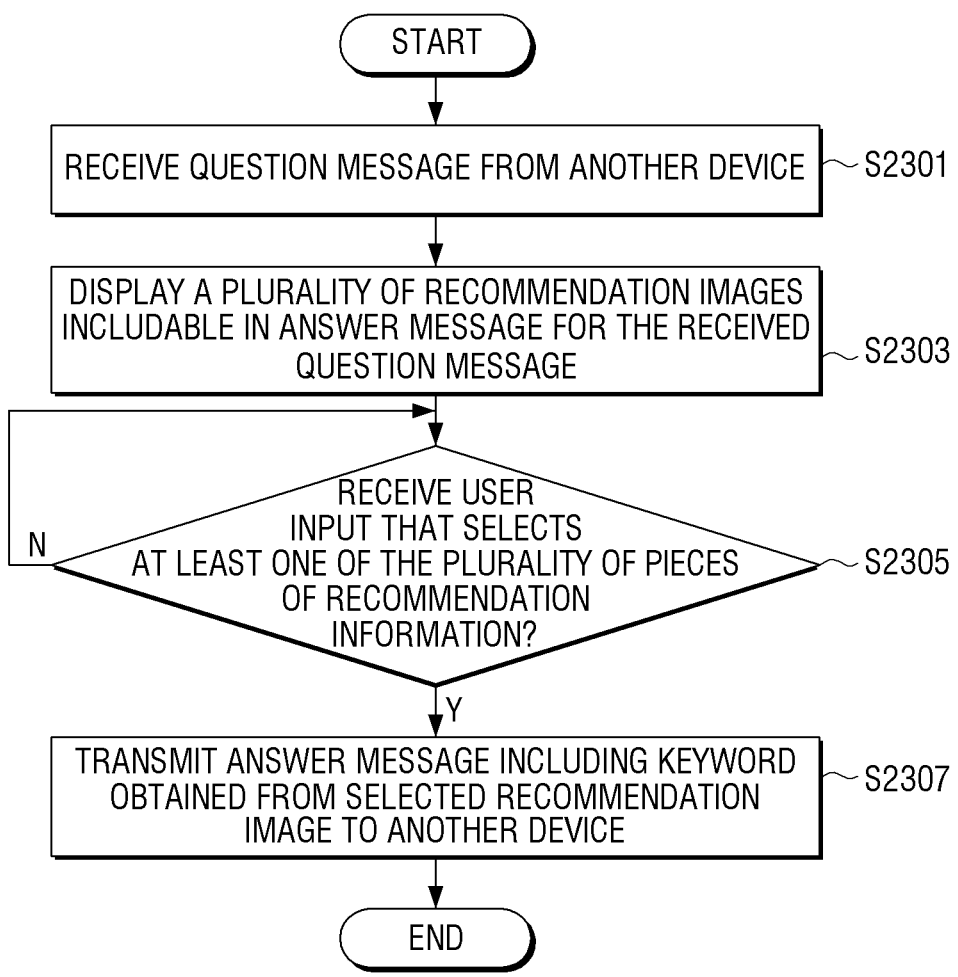

FIG. 23 is a flowchart provided to explain a method for providing recommendation information which is includable in an answer message by a device according to an embodiment of the present disclosure.

At step S2301, the device 100 may receive a question message from another device.

At step S2303, the device 100 may display a plurality of pieces of recommendation images included in the answer message for the received question message.

At step S2305, the device 100 may determine whether a user input that selects at least one of the plurality of pieces of recommendation information is received.

In response to the user input being received, at step S2307, the device 100 may obtain a keyword from the selected recommendation image, and generate and display an answer message including the obtained keyword. The device 100 may generate and display an answer message including the selected recommendation image. According to the user input that selects a send button, the device 100 may transmit an answer message including the obtained keyword to another device. The device 100 may transmit the answer message including the selected recommendation image to another device.

FIG. 24 is a flowchart provided to explain a method for providing recommendation information which is includable in an answer message by a device according to an embodiment of the present disclosure.

At step S2401, the device 100 may receive a question message from a first device.

At step S2403, the device 100 may display the received question message on a dialog window.

At step S2405, the device 100 may receive a question message from a second device.

At step S2407, the device 100 may determine whether a user input that inputs tag information is received through an input filed of the dialog window.

In response to the user input being received, at step S2409, the device 100 may display identification information of the second device on the input filed of the dialog window.

At step S2411, the device 100 may determine whether a user input that inputs an answer message is received though the input field of the dialog window.

In response to the user input being received, the device 100 may display the received answer message on the input filed of the dialog window. According to the user input that selects a send button, at step S2413, the device 100 may transmit the displayed answer message to the second device.

The components of the device 100 described above may be differently named. Further, the device 100 according to the present disclosure may include at least one of the above-described components. Some components may be omitted or other additional components may be further included.

An embodiment of the present disclosure may also be embodied in the form of a recording medium including instructions executable by a computer such as a program module executed by a computer. Computer readable medium can be any available medium that can be accessed by a computer and includes both volatile and nonvolatile media and both removable and non-removable media. The computer-readable medium may also include both computer storage medium and communication medium. Computer storage medium may include both volatile and nonvolatile media and removable and non-removable media implemented by any method or technology for storage of information such as computer readable commands, data structures, program modules or other data. Communication media may typically include computer readable commands, data structures, program modules, or other data in a modulated data signal such as a carrier wave, other transmission mechanism or arbitrary information transmission medium.

Embodiments are provided to more sincerely and fully disclose the invention and to completely transfer the spirit of the invention to those skilled in the art to which the invention pertains, and the scope of the invention should be understood by the claims of the invention. Accordingly, it will be understood by those of skill in the art that various changes in form and details may be made without departing from the spirit and scope of the invention as set forth in the following claims. For example, each component described as a single entity may be distributed and implemented, and components described as being distributed may also be implemented in a combined form.

Although embodiments have been shown and described, it will be appreciated by those skilled in the art that changes may be made to these embodiments without departing from the principles and spirit of the present disclosure. Accordingly, the scope of the present disclosure is not construed as being limited to the described embodiments, but is defined by the appended claims as well as equivalents thereto.

What is claimed is:

1. An electronic device, comprising:
   a display;
   a communication circuit;
   a user input device; and
   a processor configured to:
   control receiving, from another electronic device, via the communication circuit, information including a first question message;
   control the display to display a plurality of selectable pieces of recommendation information which are includable in an answer message for the received first question message, and relationships between the plurality of pieces of recommendation information;
   receive, via the user input device, user input for selecting at least one of the plurality of pieces of recommendation information;
   generating an answer message including the user selected recommendation information; and
   control transmitting, to the other electronic device, via the communication circuit, the answer message.

2. The electronic device as claimed in claim 1, wherein the relationships between the plurality of pieces of recommendation information comprise a tree structure or a radial structure.

3. The electronic device as claimed in claim 1, wherein the relationships between the plurality of pieces of recommendation information are connections based on weight values relating to at least one attribute among preference, importance, location, time or atmosphere of the plurality of pieces of recommendation information.

4. The electronic device as claimed in claim 1, wherein the plurality of pieces of recommendation information are generated based on content registered by a user.

5. The electronic device as claimed in claim 4, wherein the plurality of pieces of recommendation information are generated based on tag information and importance of the registered content.

6. The electronic device as claimed in claim 1, wherein the plurality of pieces of recommendation information are generated based on retrieved, captured, photographed or noted data.

7. The electronic device as claimed in claim 1, wherein, based on the plurality of pieces of recommendation information comprising images, the answer message includes a keyword obtained from at least one image selected from the images.

8. The electronic device as claimed in claim 7, wherein, based on the plurality of pieces of recommendation information comprising images, the answer message includes at least one image selected from the images.

9. The electronic device as claimed in claim 1, wherein the processor is configured to, based on receiving a second question message from a further electronic device while the first question message received from the other electronic device is displayed on a dialog window, control the display to automatically display identification information of the further electronic device on an input field of the dialog window according to a user input for tag information on the input field of the dialog window.

10. The device as claimed in claim 1, wherein the processor is configured to, based on receiving a second question message from a further electronic device while the first question message received from the other electronic device is displayed on a dialog window, control transmitting a second answer message to the further electronic device according to a user input for tag information, identification information of the further electronic device, and the second answer message for the second question message on an input field of the dialog window.

11. A method for an electronic device, the method comprising:
   receiving a question message from another electronic device;
   displaying a plurality of selectable pieces of recommendation information which are includable in an answer message for the received question message, relationships between the plurality of pieces of recommendation information;
   based on user input for selecting at least one of the plurality of pieces of recommendation information, generating an answer message including the selected recommendation information; and
   transmitting, to the other electronic device, the answer message.

12. The method as claimed in claim 11, wherein the relationships between the plurality of pieces of recommendation information comprise a tree structure or a radial structure.

13. The method as claimed in claim 11, wherein the relationships between the plurality of pieces of recommendation information are connections based on weight values regarding at least one attribute among preference, importance, location, time or atmosphere of the plurality of pieces of recommendation information.

14. The method as claimed in claim 11, wherein the plurality of pieces of recommendation information are generated based on content registered by a user.

15. The method as claimed in claim 14, wherein the plurality of pieces of recommendation information are generated based on tag information and importance of the registered content.

16. A non-transitory computer readable storage medium storing instructions which, when executed by a processor of an electronic device, cause the electronic device to perform operations comprising:

receiving a question message from another electronic device;

displaying, on a display of the electronic device, a plurality of selectable pieces of recommendation information which are includable in an answer message for the received question message, and relationships between the plurality of pieces of recommendation information;

based on user input for selecting at least one of the plurality of pieces of recommendation information, generating an answer message including the selected recommendation information; and transmitting, to the other electronic device, the answer message.

17. The electronic device as claimed in claim 1, wherein the user input device comprises a touch screen and the user input for selecting at least one of the plurality of pieces of recommendation information comprises user input received by the touchscreen.

* * * * *